(12) United States Patent
Park et al.

(10) Patent No.: US 10,856,323 B2
(45) Date of Patent: Dec. 1, 2020

(54) METHOD FOR RECEIVING DATA IN WIRELESS COMMUNICATION SYSTEM, AND APPARATUS THEREFOR

(71) Applicant: LG Electronics Inc., Seoul (KR)

(72) Inventors: Jonghyun Park, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/300,481

(22) PCT Filed: May 10, 2017

(86) PCT No.: PCT/KR2017/004810
§ 371 (c)(1),
(2) Date: Nov. 9, 2018

(87) PCT Pub. No.: WO2017/196067
PCT Pub. Date: Nov. 16, 2017

(65) Prior Publication Data
US 2019/0150187 A1    May 16, 2019

Related U.S. Application Data

(60) Provisional application No. 62/333,828, filed on May 10, 2016.

(51) Int. Cl.
*H04W 72/14* (2009.01)
*H04L 5/00* (2006.01)
*H04B 7/024* (2017.01)
*H04W 72/12* (2009.01)

(52) U.S. Cl.
CPC ............ *H04W 72/14* (2013.01); *H04B 7/024* (2013.01); *H04L 5/001* (2013.01); *H04L 5/0035* (2013.01); *H04L 5/0053* (2013.01); *H04L 5/0094* (2013.01); *H04W 72/1273* (2013.01)

(58) Field of Classification Search
CPC .. H04W 72/14; H04W 72/1273; H04B 7/024; H04L 5/001; H04L 5/0035; H04L 5/0053; H04L 5/0094
See application file for complete search history.

(56) References Cited

U.S. PATENT DOCUMENTS

2012/0170525 A1    7/2012  Sorrentino
2015/0282134 A1   10/2015  Sharp
(Continued)

FOREIGN PATENT DOCUMENTS

| EP | 2911328 A1 | 8/2015 | |
| WO | WO-2014062011 A1 * | 4/2014 | ............. H04J 11/00 |
| WO | 2014163368 A1 | 10/2014 | |

*Primary Examiner* — Eric Myers
(74) *Attorney, Agent, or Firm* — Fish & Richardson P.C.

(57) ABSTRACT

Disclosed herein is a method for receiving downlink data in a wireless communication system which includes: receiving configuration of a higher layer parameter set for at least a part of control information for receiving the downlink data from an eNB; receiving first downlink control information (DCI) including only an indicator indicating whether to grant scheduling for the higher layer parameter set; and receiving the downlink data on the basis of control information indicated by the higher layer parameter set, when the first DCI indicates a grant of scheduling for the higher layer parameter set.

13 Claims, 24 Drawing Sheets

(56) References Cited

U.S. PATENT DOCUMENTS

2015/0304994 A1 10/2015 Kim
2019/0124688 A1* 4/2019 Golitschek Edler von
 Elbwart .................... H04L 1/00

* cited by examiner

METHOD FOR RECEIVING DATA IN WIRELESS COMMUNICATION SYSTEM, AND APPARATUS THEREFOR

CROSS-REFERENCE TO RELATED APPLICATIONS

This application is a National Stage application under 35 U.S.C § 371 of International Application No. PCT/KR2017/004810, filed on May 10, 2017, which claims the benefit of U.S. Provisional Application No. 62/333,828, filed on May 10, 2016. The disclosures of the prior applications are incorporated by reference in their entirety.

TECHNICAL FIELD

The present invention relates to a wireless communication system, and more particularly, to a method for receiving, by a user equipment, data with high reliability and low latency and an apparatus therefor.

BACKGROUND ART

A mobile communication system has been developed to provide a voice service while guaranteeing user mobility. However, the mobile communication system has been extended a service range to a data service as well as a voice, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection device number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), Super wideband support, and Device Networking have been researched.

DISCLOSURE

Technical Problem

An embodiment of the present invention provides an efficient method for transmitting data with high reliability and low latency in a wireless communication system.

Furthermore, an embodiment of the present invention provides a new scaled-down DCI format for indicating control information in order to transmit data with high reliability and low latency.

Such an efficient method may be applied even to a wireless communication system that supports a vehicle to everything (V2X) service.

The technical objects of the present invention are not limited to the aforementioned technical objects, and other technical objects, which are not mentioned above, will be apparently appreciated by a person having ordinary skill in the art from the following description.

Technical Solution

According to an embodiment of the present invention, a method for receiving downlink data in a wireless communication system may include: receiving configuration of a higher layer parameter set for at least a part of control information for receiving the downlink data from an eNB; receiving first downlink control information (DCI) including only an indicator indicating whether to grant scheduling for the higher layer parameter set; and receiving the downlink data on the basis of control information indicated by the higher layer parameter set, when the first DCI indicates a grant of scheduling for the higher layer parameter set.

Furthermore, the higher layer parameter set may be configured as one set or configured as a plurality of sets.

When the higher layer parameter set is configured as one set, the first DCI may indicate only the scheduling grant of the one configured higher layer parameter as a payload size is set to 1 bit.

Furthermore, when the higher layer parameter set is configured as the plurality of sets, the first DCI may optionally indicate only the scheduling grant of a specific set among the plurality of configured higher layer parameter sets by setting the payload size to 2 bits or more.

Furthermore, when the higher layer parameter set is constituted by the plurality of sets, the specific set among the plurality of higher layer parameter sets may be optionally scheduling-granted based on a subframe type in which the first DCI is transmitted, a format of the first DCI, a control channel in which the first DCI is transmitted, or a search space in which the first DCI is transmitted additionally with respect to the first DCI.

Furthermore, the specific set may be selected among the plurality of configured higher layer parameter sets according to the subframe type in which the first DCI is transmitted, the format of the first DCI, the control channel type in which the first DCI is transmitted or the search space type in which the first DCI is transmitted, and the scheduling grant of the selected specific higher layer parameter set may be determined according to the first DCI.

Furthermore, the subframe type may include a multicast-broadcast single-frequency network (MBSFN) subframe type or a non-MBSFN subframe type.

Furthermore, the control channel type may include a physical downlink control channel (PDDCH) and an enhanced physical downlink control channel (EPDCCH).

Furthermore, the search space type in which the first DCI is transmitted may include a common search space and a UE-specific search space.

Furthermore, in the receiving of the first DCI, when energy of a threshold or more is detected by performing energy detection for a transmission resource previously allocated for the first DCI, it may be regarded that the first DCI indicating the scheduling grant for the higher layer parameter set is received.

Furthermore, when the higher layer parameter set is constituted by the plurality of sets, a specific higher layer parameter set may be optionally scheduling-granted among the plurality of configured higher layer parameter sets according to a sequence mapped to resource elements of the subframe in which the first DCI is transmitted.

Furthermore, the method for receiving downlink data may further include receiving a second DCI for assisting the first DCI, in which the payload size of the second DCI may be set to be larger than the payload size of the first DCI.

Furthermore, the second DCI may include the control information not configured as the higher layer parameter set or include change information for changing at least a part of the control information indicated by the higher layer parameter set scheduling-granted by the first DCI.

Furthermore, the control information may include carrier index related information, resource allocation information, demodulation (DM)-reference signal (RS) related information, modulation and coding scheme (MCS) information, redundancy version (RV) information, new data indicator (NDI) information, hybrid automatic repeat request (HARQ) related information, transmit power control (TPC) related information, PDSCH rate matching and Quasi-colocation indicator (PQI) related information, cluster information, positional information of a reference signal, seed value information for generating a reference signal sequence, cyclic prefix length information, RE position information to which data is mapped, service ID information of multicast/broadcast data, precoding related information, demodulation RS related information, aperiodic channel state information (CSI) request information, and/or sounding reference signal (SRS) request information.

Further, according to another embodiment of the present invention, a UE for receiving downlink data in a wireless communication system may include: a radio frequency (RF) unit transmitting and receiving a radio signal; and a processor controlling the RF unit, in which the UE may be configured to receive configuration of a higher layer parameter set for at least a part of control information for receiving the downlink data from an eNB, receive first downlink control information (DCI) including only an indicator indicating whether to grant scheduling for the higher layer parameter set, and receive the downlink data on the basis of control information indicated by the higher layer parameter set, when the first DCI indicates a grant of scheduling for the higher layer parameter set.

Advantageous Effects

The present invention has an advantage in that data can be transmitted and received with high reliability and low latency.

Furthermore, the present invention has an advantage in that overhead for DCI signaling is reduced by simplifying a DCI.

Advantages which can be obtained in the present invention are not limited to the aforementioned effects and other unmentioned advantages will be clearly understood by those skilled in the art from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

MODE FOR INVENTION

Figure 1:
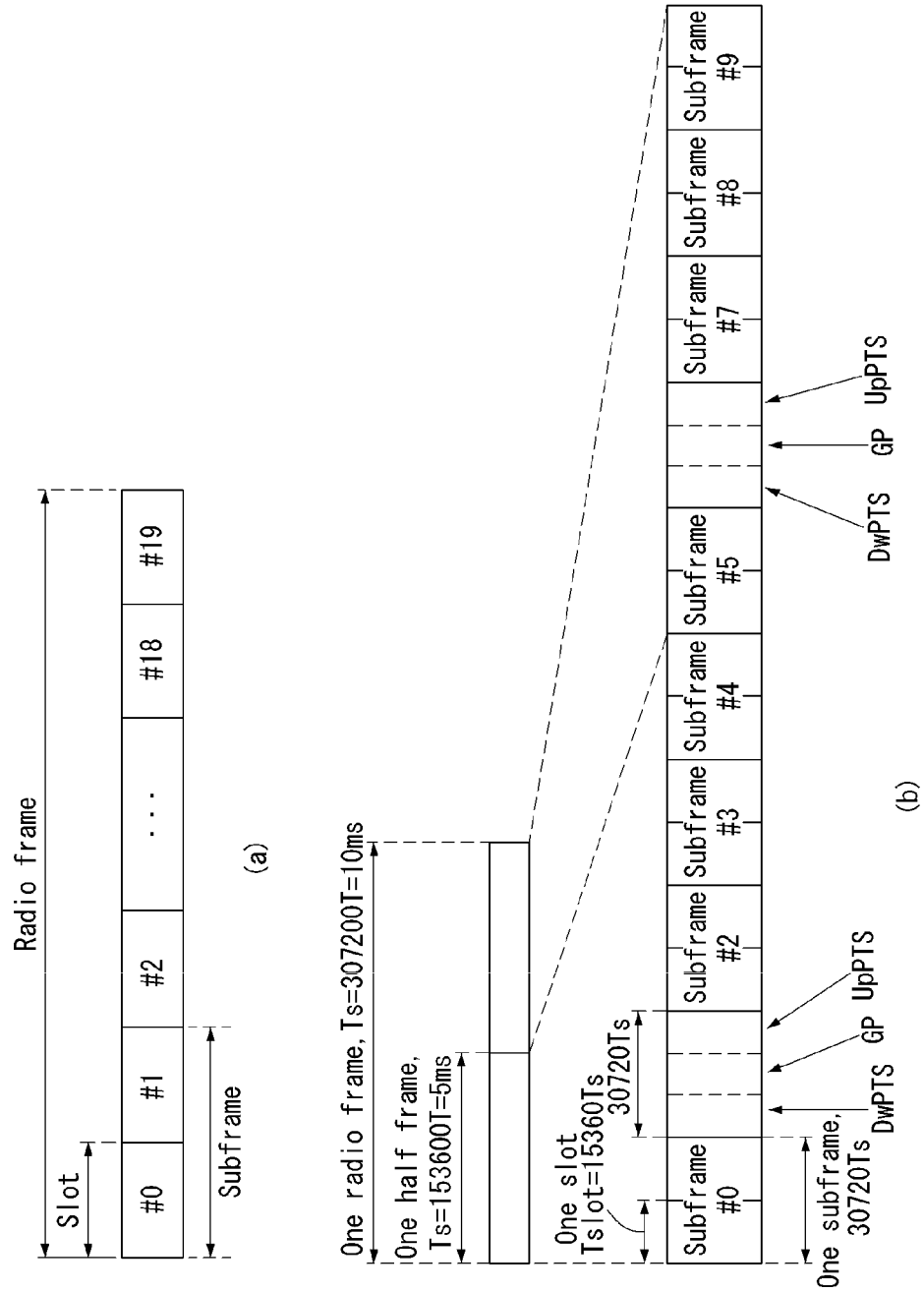
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed herein together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like.

Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. CDMA may be implemented by radio technology universal terrestrial radio access (UTRA) or CDMA2000. TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number |   |   |   |   |   |   |   |   |   |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

Table 2 illustrates the configuration (the length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

The structure of the radio frame is just one example and the number subcarriers included in the radio frame or the number of slots included in the subframe and the number of OFDM symbols included in the slot may be variously changed.

Figure 2:
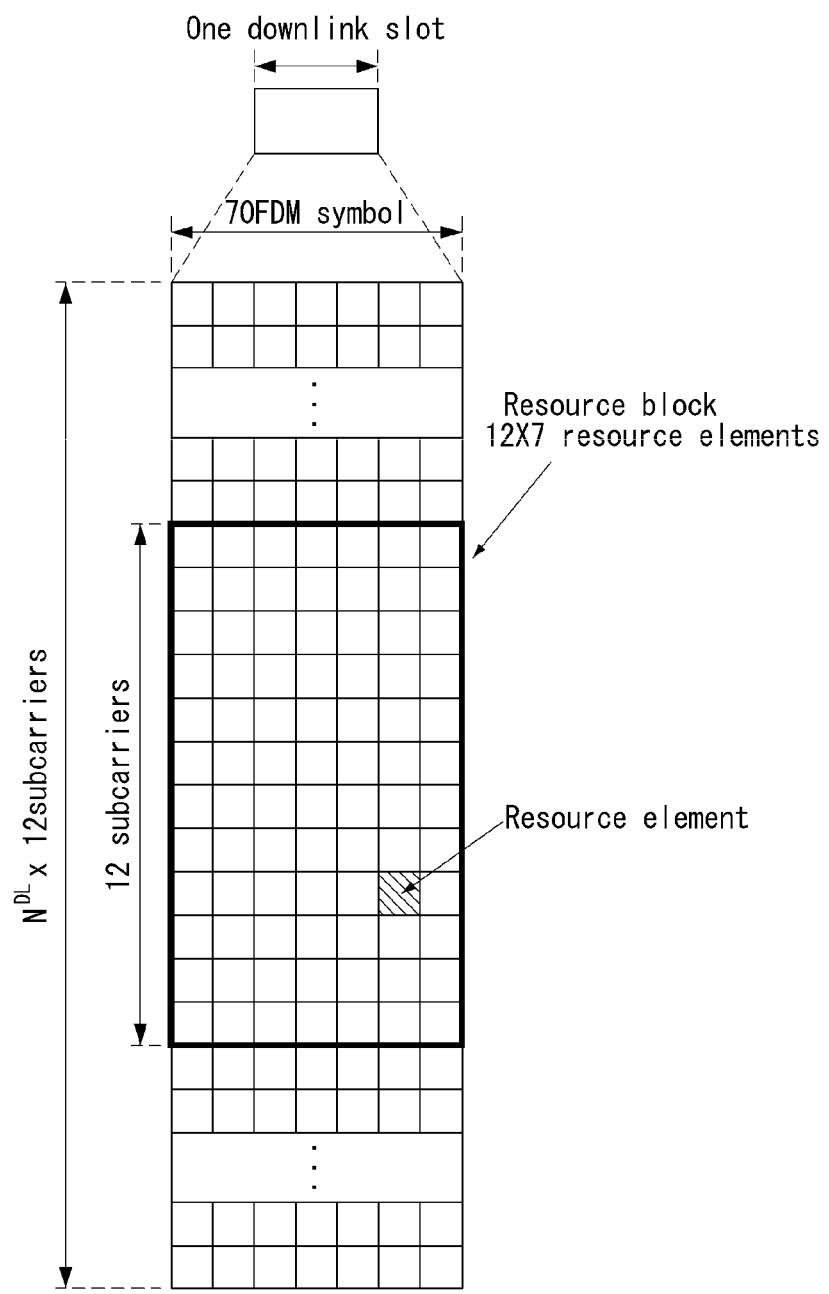
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, $N^{DL}$ is subordinated to a downlink transmission bandwidth.

A structure of the uplink slot may be the same as that of the downlink slot.

Figure 3:
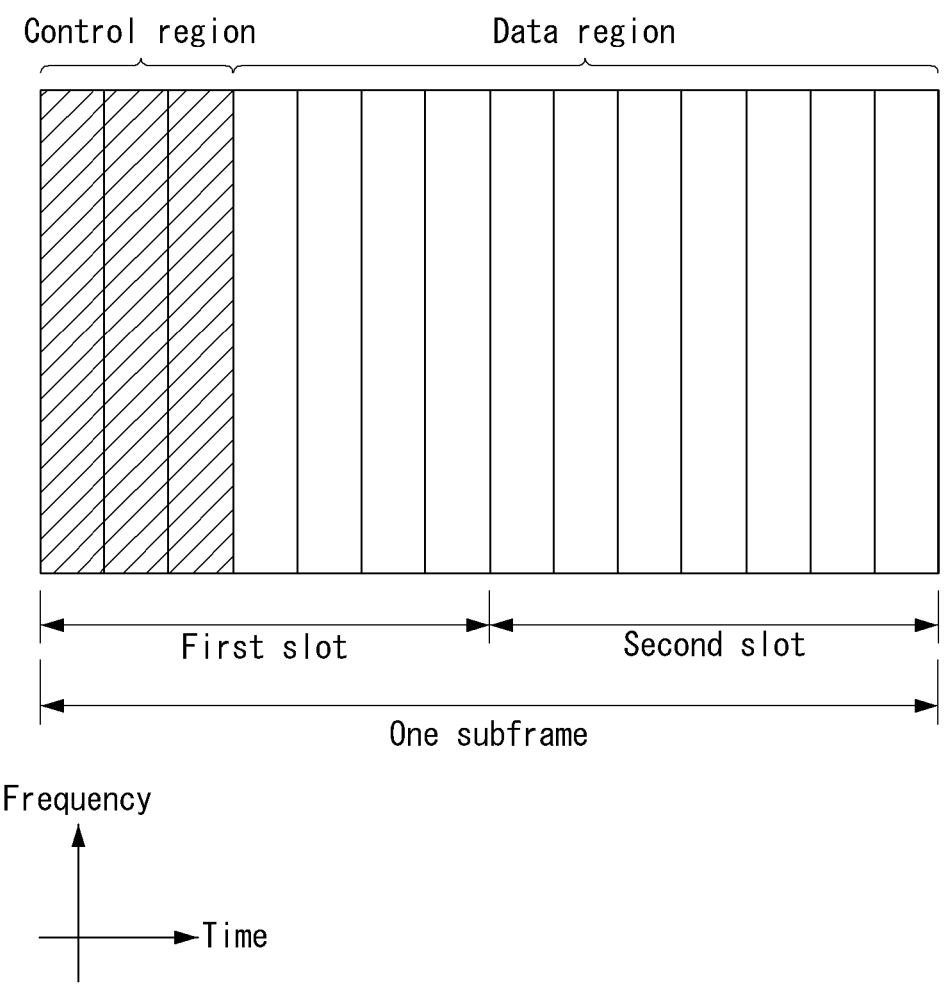
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of former three OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
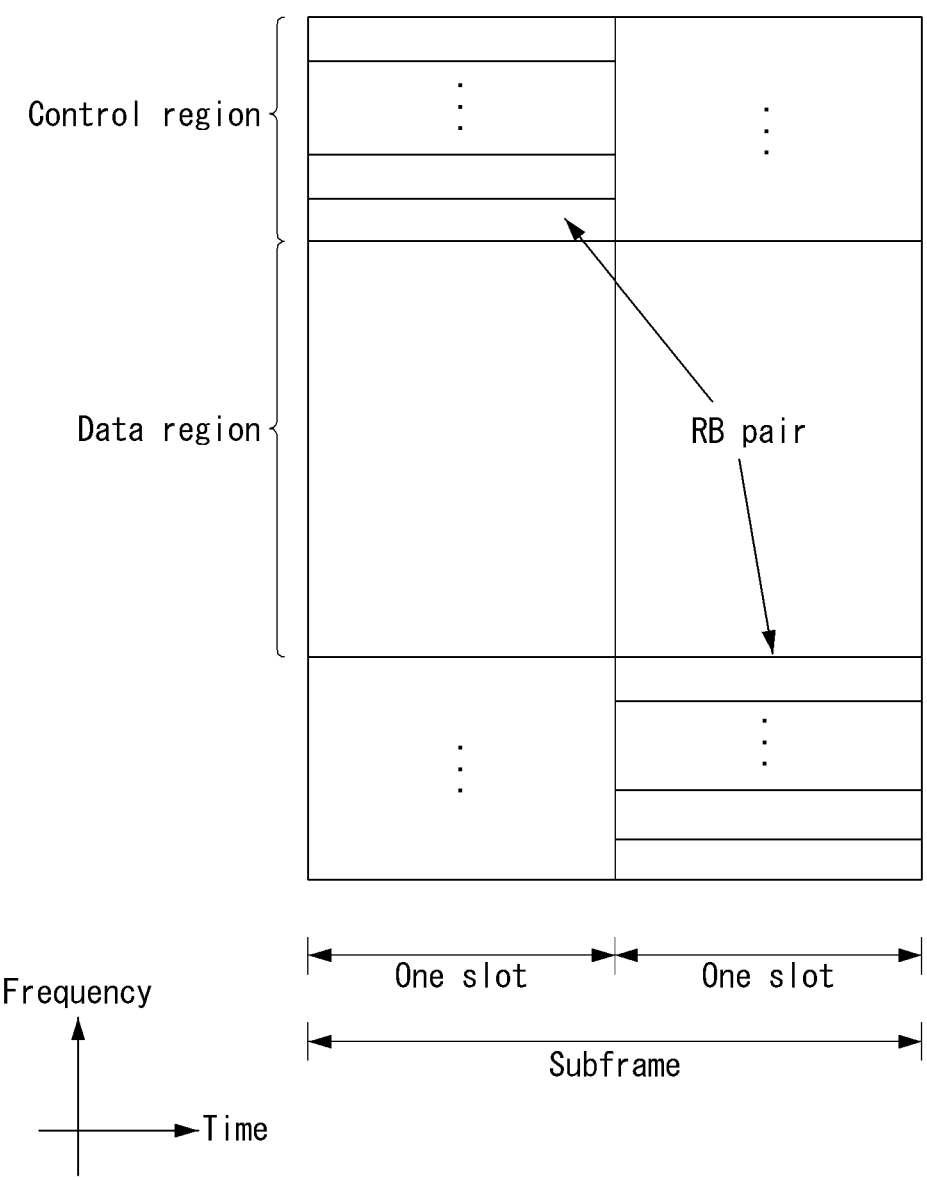
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

Uplink control information (UCI) transmitted through a PUCCH may include the following scheduling request (SR), HARQ ACK/NACK information, and downlink channel measurement information.

Scheduling Request (SR): The SR is information used for requesting an uplink UL-SCH resource. The SR is transmitted using an On-off Keying (OOK) method.

HARQ ACK/NACK: The HARQ ACK/NACK is a response signal to a downlink data packet on a PDSCH. The HARQ ACK/NACK represents whether a downlink data packet is successfully received. ACK/NACK 1 bit is transmitted in response to a single downlink codeword, and ACK/NACK 2 bits are transmitted in response to two downlink codewords.

Channel State Information (CSI): The CSI is feedback information about a downlink channel. CSI may include at least one of a Channel Quality Indicator (CQI), a rank indicator (RI), a precoding matrix indicator (PMI), and a Precoding Type Indicator (PTI). 20 bits are used per subframe.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 3

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 | HARQ ACK/NACK, SR, CSI (48 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK.

PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK. In the case of an extended CP, PUCCH format 2 may be transmitted for transmitting the CQI and the HARQ ACK/NACK.

PUCCH format 3 is used for carrying encoded UCI of 48 bits. The PUCCH format 3 may carry HARQ ACK/NACK of a plurality of serving cells, SR (when existing), and CSI report of one serving cell.

Figure 5:
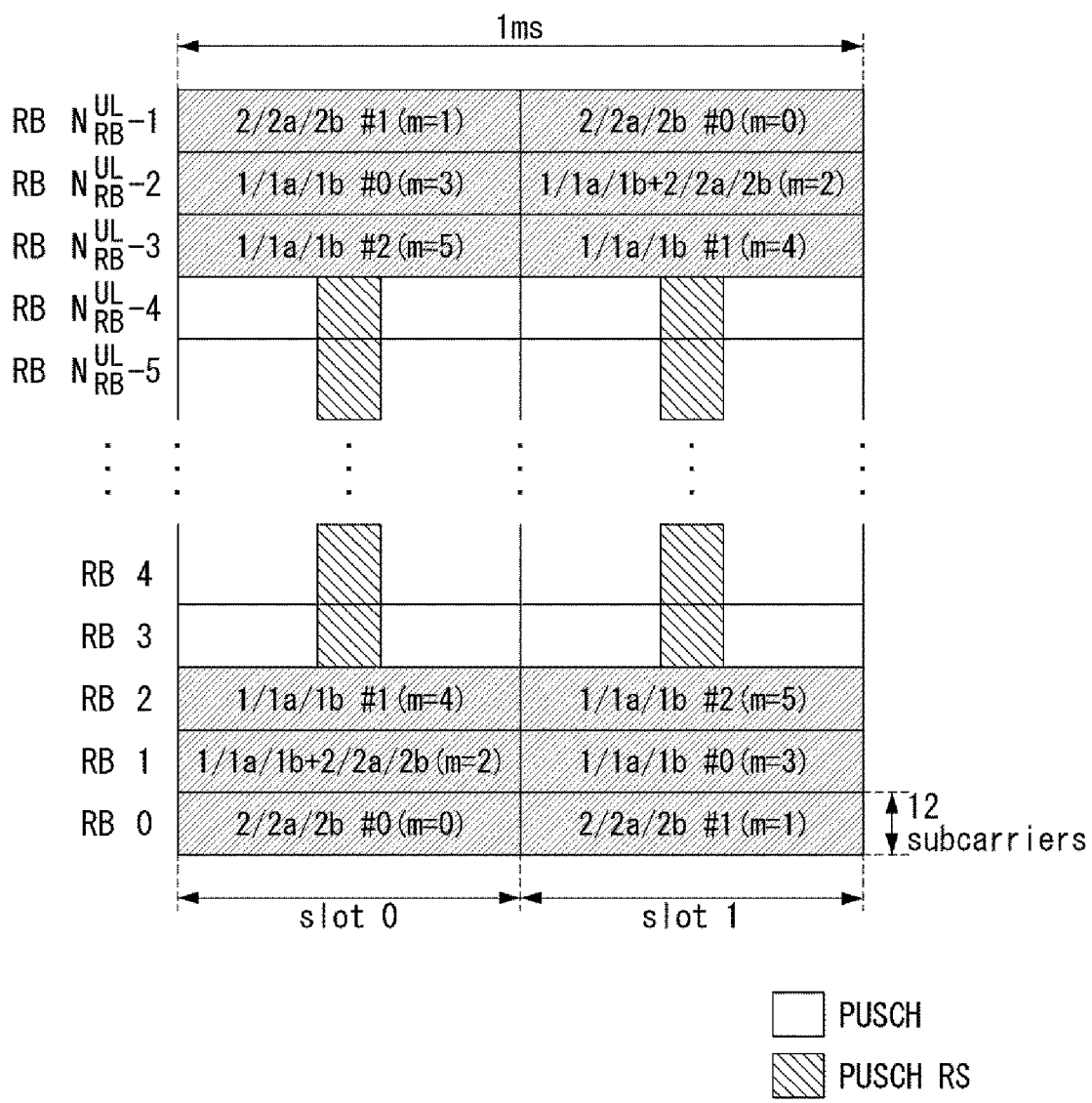
FIG. 5 illustrates an example of the shape in which PUCCH formats are mapped to the PUCCH region of uplink physical resource block in a wireless communication system to which the present invention may be applied.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and 0, 1, . . . , $N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixed and mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
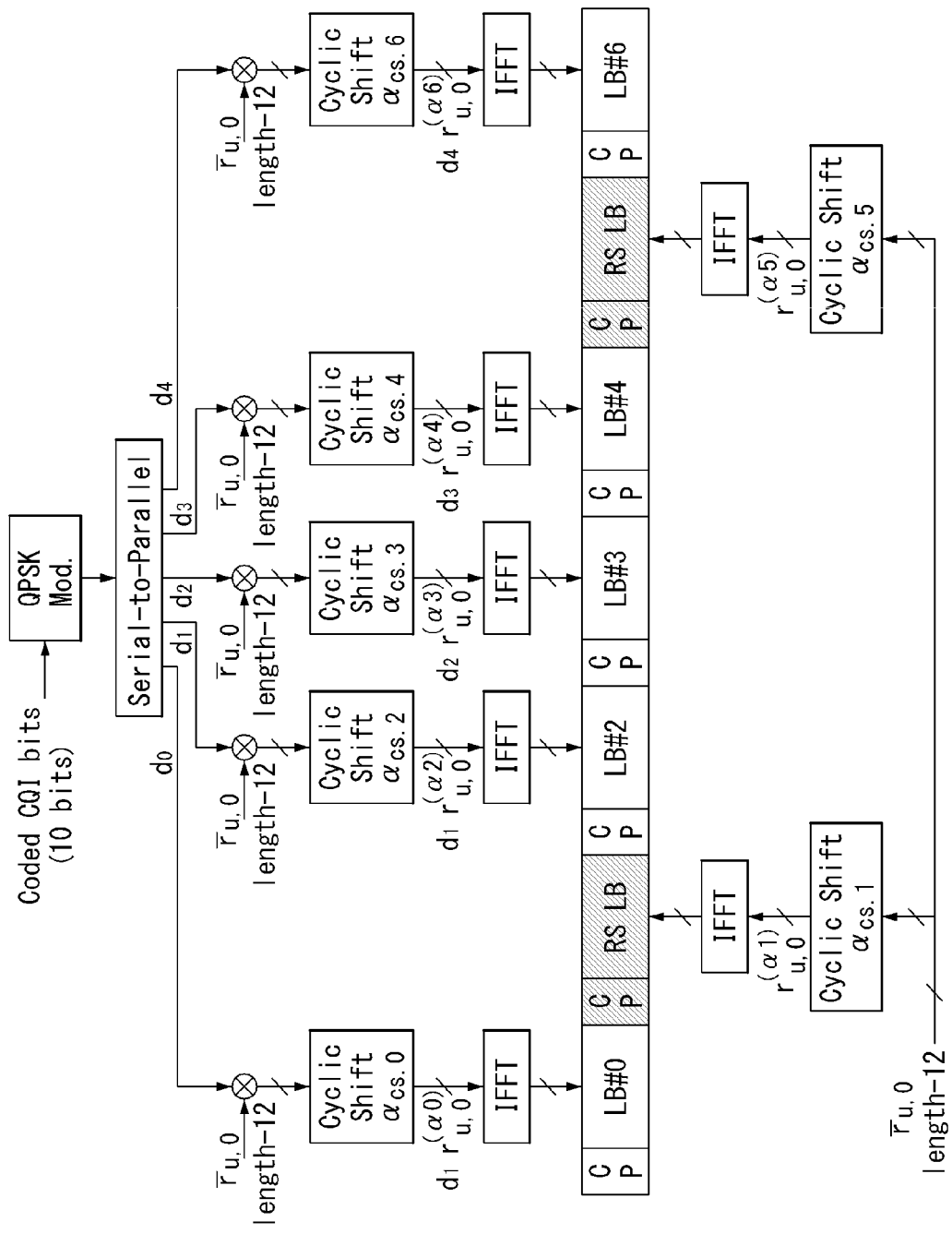
FIG. 6 illustrates a structure of CQI channel in the case of normal CP in a wireless communication system to which the present invention may be applied.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

Hereinafter, PUCCH formats 1a and 1b will be described.

In the PUCCH format 1a/1b, a symbol modulated using a BPSK or QPSK modulation method is multiplied with a CAZAC sequence of a length 12. For example, a result in which a CAZAC sequence r (n) (n=0, 1, 2, . . . , N−1) of a length N is multiplied to a modulation symbol d(0) becomes y(0), y(1), y(2), . . . , y(N−1). y(0), y(1), y(2), . . . , y(N−1) symbols may be referred to as a block of symbol. After a CAZAC sequence is multiplied to a modulation symbol, block-wise diffusion using an orthogonal sequence is applied.

A Hadamard sequence of a length 4 is used for general ACK/NACK information, and a Discrete Fourier Transform (DFT) sequence of a length 3 is used for shortened ACK/NACK information and a reference signal.

A Hadamard sequence of a length 2 is used for a reference signal of an extended CP.

Figure 7:
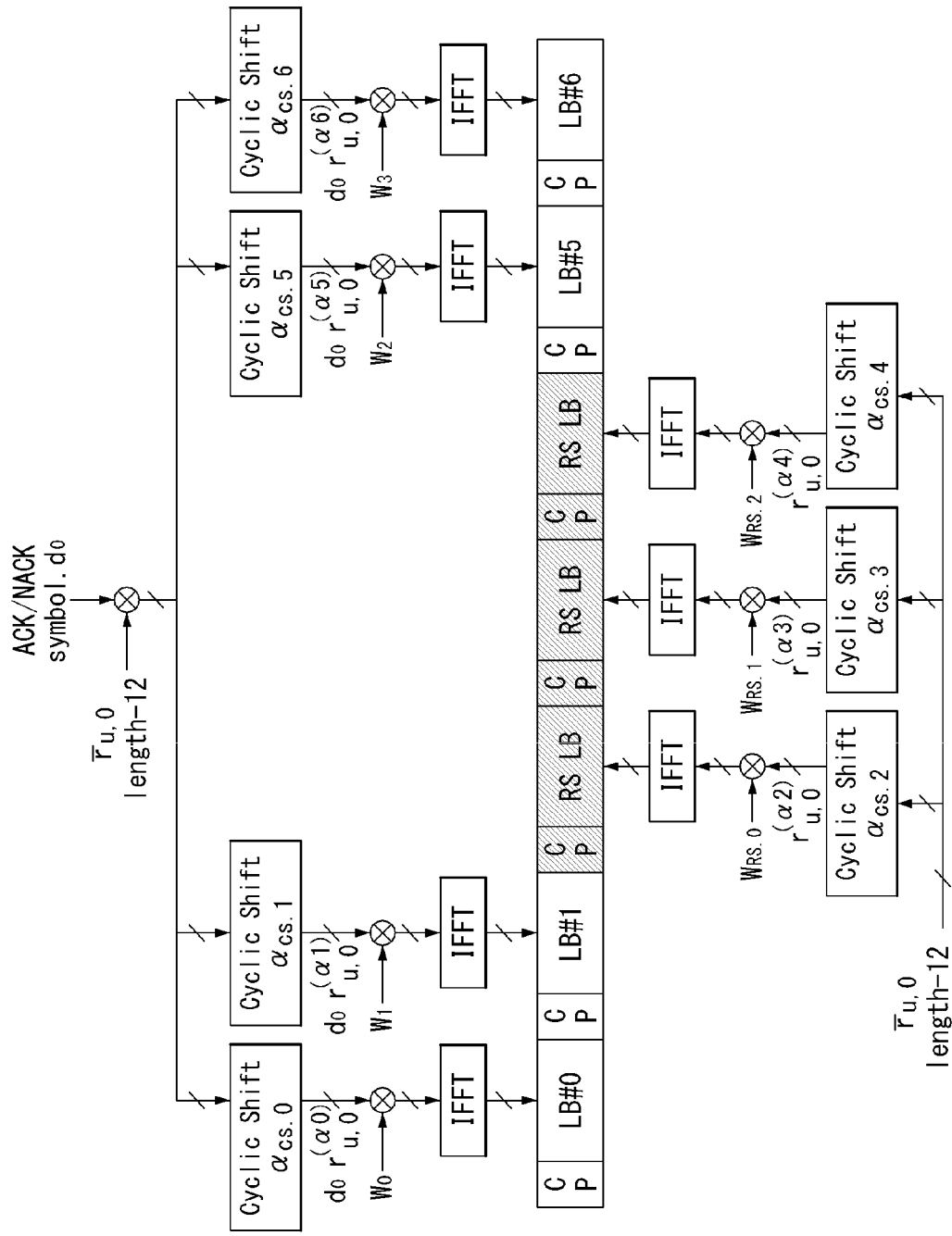
FIG. 7 illustrates a structure of ACK/NACK channel in the case of normal CP in a wireless communication system to which the present invention may be applied.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format will be described. e-PUCCH may correspond to PUCCH format 3 of the LTE-A system. A block spreading scheme may be applied to ACK/NACK transmission using the PUCCH format 3.

The block spreading technique will be described in detail below with reference to FIG. 14.

PUCCH Piggybacking

Figure 8:
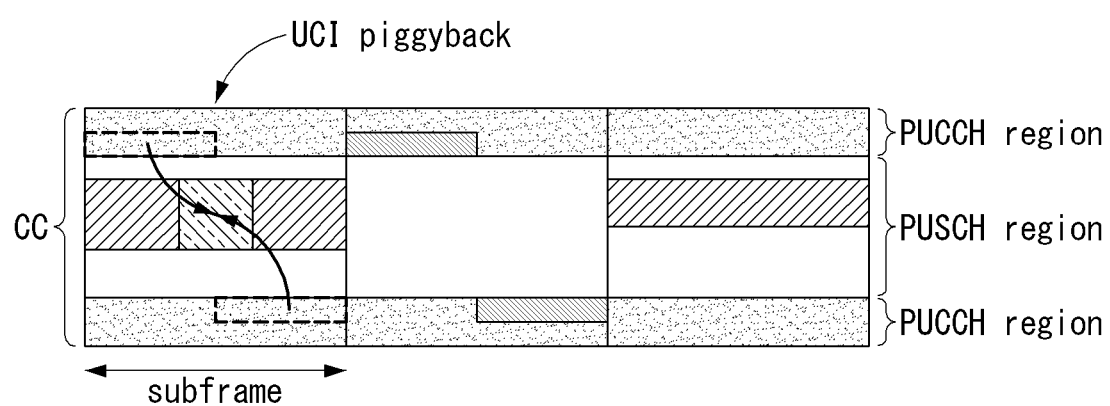
FIG. 8 illustrates an example of a transport channel processing of UL-SCH in a wireless communication system to which the present invention may be applied.

FIG. 8 illustrates an example of a transport channel processing of UL-SCH in a wireless communication system to which the present invention may be applied.

Figure 11:
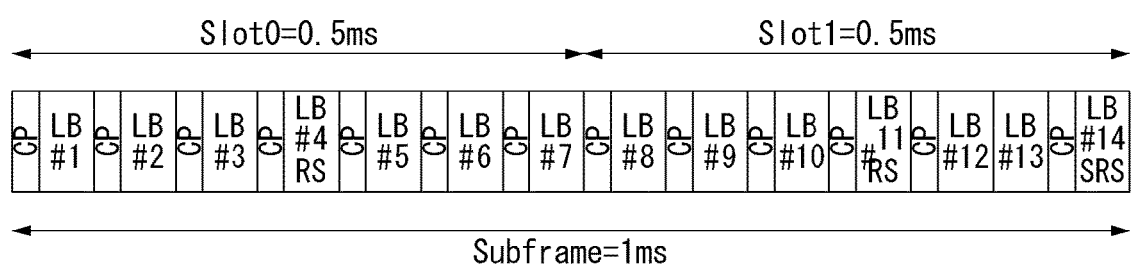
FIG. 11 illustrates an uplink subframe including a sounding reference signal symbol in a wireless communication system to which the present invention may be applied.

In the 3GPP LTE system (=E-UTRA or Rel. 8), in order to efficiently utilize a power amplifier of the UE, single carrier transmission is maintained, which is excellent in a peak-to-average power ratio (PAPR) characteristic or a cubic metric (CM) characteristic which influences performance of a power amplifier. That is, in the case of the PUSCH transmission in the conventional LTE system, the single carrier characteristic may be maintained through DFT-precoding for data to be transmitted, while in the case of the PUCCH transmission, information is transmitted while being loaded on a sequence having the single carrier characteristic, and as a result, the single carrier characteristic may be maintained. However, when the DFT-precoded data is discontinuously allocated on a frequency axis or when the PUSCH and the PUCCH are simultaneously transmitted, the single carrier characteristic is broken. Therefore, when the PUSCH is transmitted in the same subframe as the PUCCH transmission as illustrated in FIG. 11, uplink control information (UCI) to be transmitted to the PUCCH is transmitted (piggybacked) together with data through the PUSCH in order to maintain the single carrier characteristic.

As described above, since the PUCCH and the PUSCH may not be simultaneously transmitted, the conventional LTE UE uses a method of multiplexing uplink control information (UCI) (CQI/PMI, HARQ-ACK, RI, etc.) to the PUCCH region in the subframe where the PUSCH is transmitted.

As an example, when a Channel Quality Indicator (CQI) and/or Precoding Matrix Indicator (PMI) needs to be transmitted in a subframe allocated to transmit the PUSCH, UL-SCH data and CQI/PMI are multiplexed before DFT-spreading to transmit control information and data together. In this case, the UL-SCH data is rate-matched by considering CQI/PMI resources. Further, control information such as HARQ ACK, RI, etc. is multiplexed in the PUSCH region by puncturing the UL-SCH data.

Figure 9:
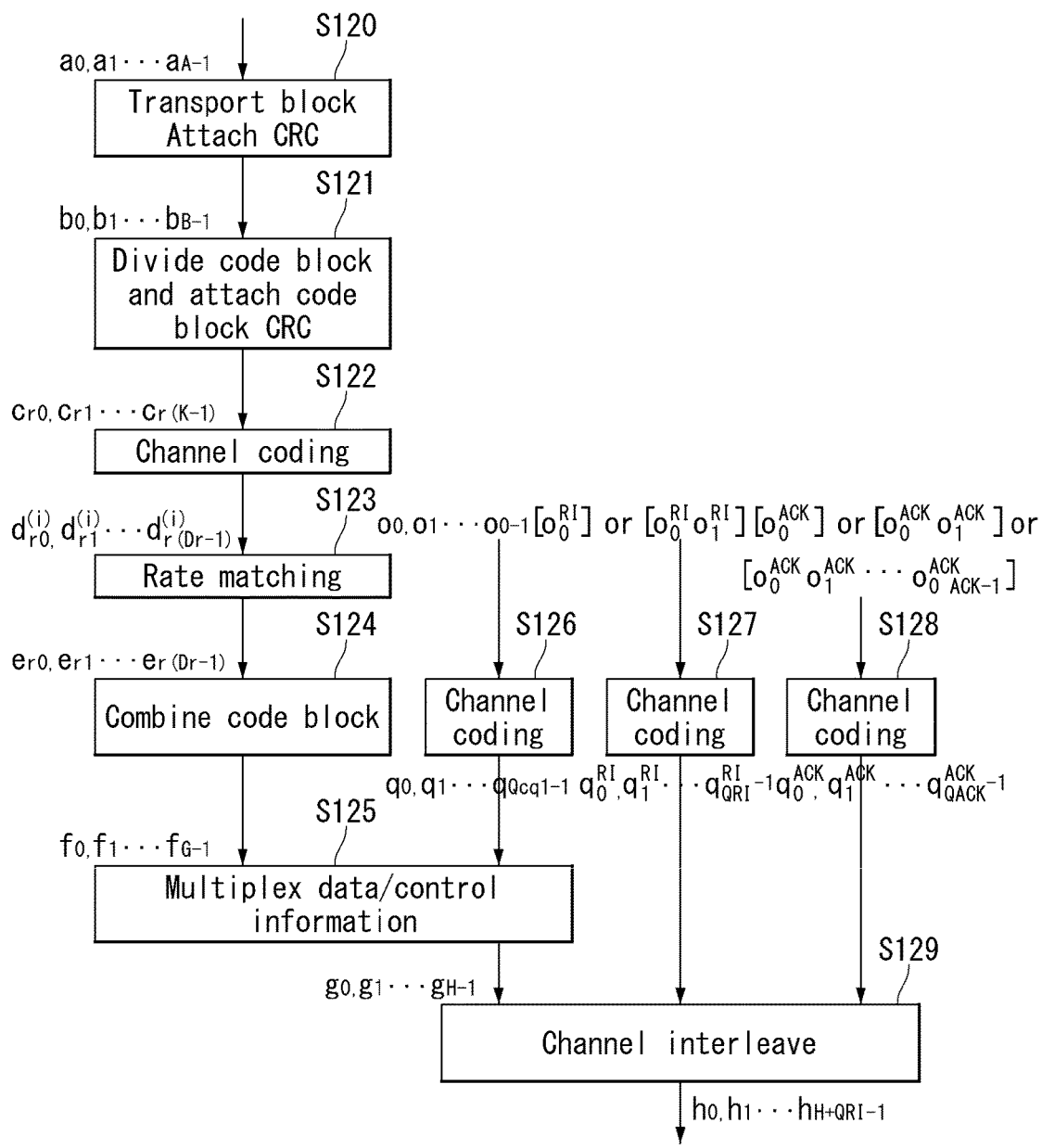
FIG. 9 shows an example of a signal processing process of an uplink shared channel which is a transport channel in a wireless communication system to which the present invention may be applied.

FIG. 9 shows an example of a signal processing process of an uplink shared channel which is a transport channel in a wireless communication system to which the present invention may be applied.

Hereinafter, a signal processing process of the uplink shared channel (hereinafter referred to as 'UL-SCH') may be applied to one or more transport channels or control information types.

Referring to FIG. 9, the UL-SCH is transmitted to a coding unit in the form of a transport block (TB) once every transmission time interval (TTI).

A CRC parity bit $p_0, p_1, p_2, p_3, \ldots, p_{L-1}$ is attached to the bit $a_0, a_1, a_2, a_3, \ldots, a_{A-1}$ of the transport block received from the higher layer (S90). In this case, A represents a size of the transport block and L represents the number of parity bits. An input bit with the CRC is represented as $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the TB size and the CRC is attached to multiple segmented CBs (S91). Bits after code block segmentation and CRC attachment are represented as $c_{r0}, c_{r1}, c_{r2}, c_{r3}, \ldots, c_{r(K_r-1)}$. Here, r represents the number ($r=0, \ldots, C-1$) of the code block and $K_r$ represents the number of bits depending the code block r. Further, C represents the total number of code blocks.

Next, channel coding is performed (S92). An output bit $d_{r0}^{(i)}, d_{r1}^{(i)}, d_{r2}^{(i)}, d_{r3}^{(i)}, \ldots, d_{r(D_r-1)}^{(i)}$ after the channel coding is represented as. In this case, i represents an encoded stream index and may have a value of 0, 1, or 2. $D_r$ represents the number of bits of an i-th encoded stream for the code block r. r represents the code block number ($t=0, \ldots, C-1$) and C represents the total number of code blocks. Each code block may be encoded by turbo coding, respectively.

Next, rate matching is performed (S93). Bits after the rate matching are represented as $e_{r0}, e_{r1}, e_{r2}, e_{r3}, \ldots, e_{r(E_r-1)}$. In this case, r represents the code block number ($r=0, \ldots, C-1$) and C represents the total number of code blocks. $E_r$ represents the number of rate-matched bits of an r-th code block.

Next, concatenation between the code blocks is performed again (S94). Bits after the concatenation of the code blocks is performed are represented as. In this case, G represents the total number of encoded bits for transmission and does not include the number of bits used for transmitting the control information when the control information is multiplexed with the UL-SCH transmission.

Meanwhile, when the control information is transmitted on the PUSCH, each of CQI/PMI, RI, and ACK/NACK as the control information is independently channel-encoded (S96, S97, and S98). Since different encoded symbols are allocated for transmitting respective control information, respectively, the respective control information has different coding rates.

As an ACK/NACK feedback mode in Time Division Duplex (TDD), two modes, ACK/NACK bundling and ACK/NACK multiplexing are supported by a higher layer configuration. For the ACK/NACK bundling, the ACK/NACK information bit is configured by 1 bit or 2 bits, and for the ACK/NACK multiplexing, the ACK/NACK information bit is configured between 1 bit and 4 bits.

After a concatenation step between the code blocks in step S134, multiplexing of encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ f the CQI/PMI is performed (S95). A result of multiplexing the data and the CQI/PMI is represented as $g_0, g_1, g_2, g_3, \ldots, g_{H'-1}$. In this case, $g_i$ ($i=0, \ldots, H'-1$) represents a column vector having a length of $(Q_m \cdot N_L)$. $H=(G+N_L \cdot Q_{CQI})$ $H'=H/(N_L \cdot Q_m)$. $N_L$ and represents the number of layers to which the UL-SCH transport block is mapped and H represents the total number of encoded bits allocated for the UL-SCH data and the CQI/PMI information to $N_L$ transport layers to which the transport block is mapped.

Next, multiplexed data and CQI/PMI, separately channel-encoded RI, and ACK/NACK are channel-interleaved to output an output signal (S99).

Reference Signal (RS)

In a wireless communication system, since data is transmitted over a wireless channel, the signal may be distorted during transmission. In order to correctly receive the distorted signal at a receiving end, the distortion of the received signal must be corrected using channel information. In order to detect the channel information, a method for transmitting a signal known to both a transmitting side and a receiving side and a method for detecting the channel information using a degree of distortion when a signal is transmitted through a channel are mainly used. The above-mentioned signal is referred to as a pilot signal or a reference signal (RS).

Further, in recent years, in most mobile communication systems, when transmitting a packet, a method is used, which may enhance transmission and reception data efficiency by adopting multiple transmitting antennas and multiple receiving antennas by emerging from use of one transmitting antenna and one receiving antenna used up to now. When data is transmitted/received using a multi-input/output antenna, a channel state between the transmitting antenna and the receiving antenna must be detected to correctly receive the signal. Accordingly, respective transmitting antennas need to have individual reference signals.

The RS in the mobile communication system may be largely categorized into two types. There are an RS for the purpose of channel information acquisition and an RS used for data demodulation. Since the object of the former reference signal is to enable a UE (user equipment) to acquire downlink channel information, the former reference signal should be transmitted on broadband and even the UE that does not receive data in a specific subframe should be able to receive and measure the RS. Further, the former RS is also used for measurement of handover, etc. The latter RS is an RS transmitted together when the eNB transmits DL data. The UE may perform channel estimation by receiving the corresponding RS, thereby demodulating data. The RS should be transmitted to a region to which the data is transmitted.

Five types of downlink reference signals are defined.
Cell-specific reference signal (CRS)
Multicast-broadcast single-frequency network reference signal (MBSFN RS)
UE-specific reference signal or demodulation reference signal (DM-RS)
Positioning reference signal (PRS)
Channel state information reference signal (CSI-RS)

One reference signal is transmitted for each downlink antenna port.

The CRS is transmitted in all downlink subframes in a cell that supports the PDSCH transmission. The CRS is transmitted on one or more ports of antenna ports 0 to 3. The CRS is defined only in $\Delta f=15$ kHz.

The MBSFN RS is transmitted in the MBSFN region of the MBSFN subframe only when a physical multicast channel (PMCH) is transmitted. The MBSFN RS is transmitted at antenna port 4. The MBSFN RS is defined only in the extended CP.

The DM-RS is supported for transmission of PDSCH and is transmitted at antenna port $p=5$, $p=7$, $p=8$ or $p=7$, $8, \ldots, v+6$. Here, $v$ represents the number of layers used for PDSCH transmission. The DM-RS is present and valid for PDSCH demodulation only when the PDSCH transmission is associated at the corresponding antenna port. The DM-RS is transmitted only in the resource block (RB) to which the corresponding PDSCH is mapped.

When either the physical channel or the physical signal other than the DM-RS is transmitted using the RE of the same index pair (k, l) as the resource element RE to which the DM-RS is transmitted regardless of the antenna port p, the DM-RS is not transmitted in the RE of the index pair (k, l).

The PRS is transmitted only in the resource block within the downlink subframe configured for transmitting the PRS.

When both the normal subframe and the MBSFN subframe are configured as the positioning subframe in one cell, the OFDM symbols in the MBSFN subframe configured for the PRS transmission use the same CP as subframe #0. When only one MBSFN subframe is configured as the positioning subframe in one cell, the OFDM symbols configured for the PRS in the MBSFN region of the corresponding subframe use the extended CP.

In the subframe configured for the PRS transmission, a start point of the OFDM symbol configured for the PRS transmission is the same as a start point of a subframe in which all OFDM symbols have the same CP length as the OFDM symbol configured for the PRS transmission.

The PRS is transmitted at antenna port 6.

The PRS is not mapped to the RE (k, l) allocated to the physical broadcast channel (PBCH), the PSS, or the SSS regardless of the antenna port p.

The PRS is defined only in $\Delta f=15$ kHz.

The CSI-RS is transmitted in 1, 2, 4, or 8 antenna ports by using $p=15$, $p=15, 16$, $p=15, \ldots, 18$, and $p=15, \ldots, 22$, respectively.

The CRS is defined only in $6l=15$ kHz.

The reference signal will be described in more detail.

The CRS is a reference signal for acquisition of information regarding a channel state shared by all UEs in the cell and measurement of handover, etc. The DM-RS is used for data demodulation for only a specific UE. Information for demodulation and channel measurement may be provided by using the reference signals. That is, the DM-RS is used only for the data demodulation and the CRS are used for both purposes of the channel information acquisition and the data demodulation.

The receiving side (that is, UE) measures the channel state from the CRS and feeds back to the transmitting side (that is, eNB) an indicator related to a channel quality, such as a channel quality indicator (CQI), a precoding matrix index (PMI), a precoding type indicator (PTI), and/or a rank indicator (RI). The CRS is also referred to as cell-specific RS. On the contrary, a reference signal related to feedback of the channel state information (CSI) may be defined as CSI-RS.

The DM-RS may be transmitted via resource elements when data demodulation on the PDSCH is required. The UE may receive whether the DM-RS exists through the higher layer and is valid only when the corresponding PDSCH is mapped. The DM-RS may be referred to as the UE-specific RS or demodulation RS (DMRS).

Figure 10:
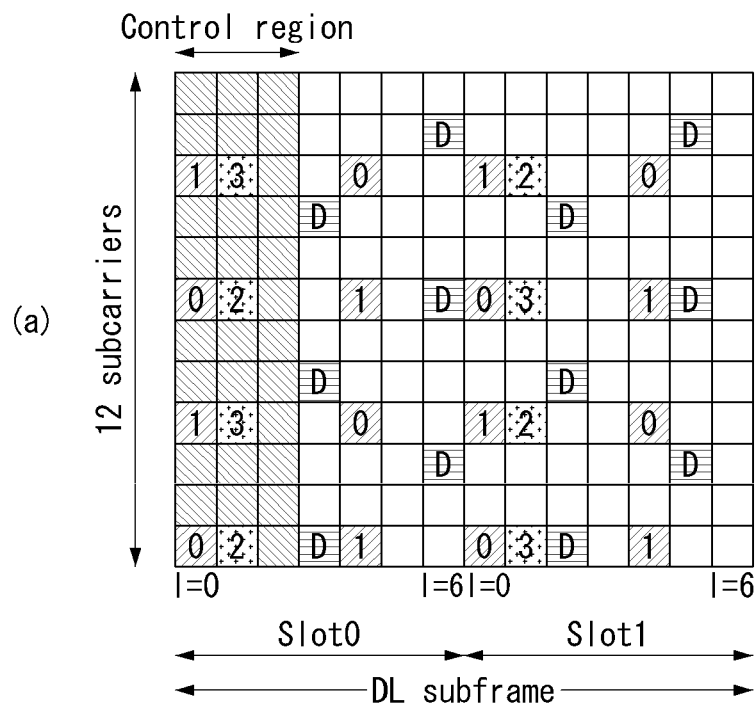
FIG. 10 illustrates a reference signal pattern mapped to a downlink resource block pair in a wireless communication system to which the present invention may be applied.
Figure 10:
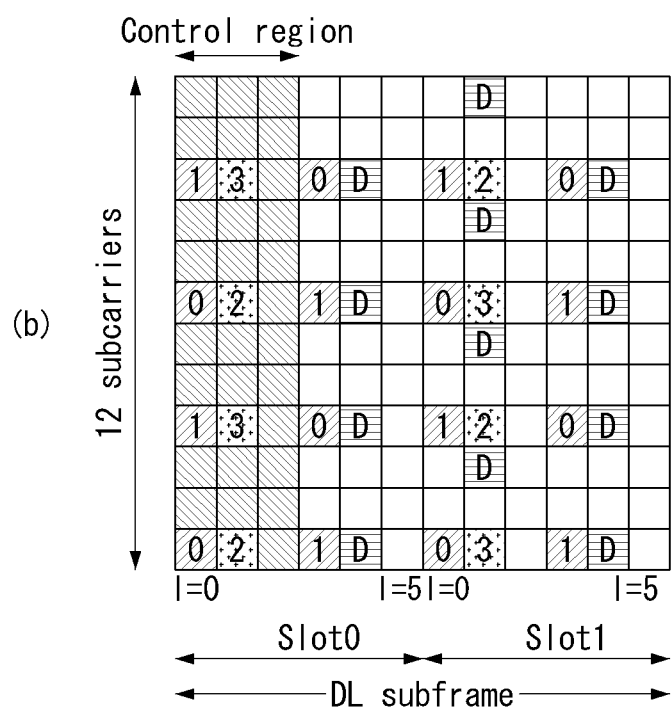

FIG. 10 illustrates a reference signal pattern mapped to a downlink resource block pair in a wireless communication system to which the present invention may be applied.

Referring to FIG. 10, a downlink resource block pair may be represented by one subframe in a time domain x 12 subcarriers in a frequency domain in units of the reference signal mapped. That is, when one resource block pair on the time axis (x axis) has a length of 14 OFDM symbols n the case of a normal cyclic prefix (normal CP) (in the case of FIG. 10(a)) and has a length of 12 OFDM symbols in the case of extended cyclic prefix (extended CP) (in the case of FIG. 10(b)). Resource elements REs described as '0', '1', '2', and '3' in a resource block grid mean locations of the CRS of the antenna port indexes '0', '1', '2', and '3' and resource elements denoted by 'D' mean a location of the DRS.

Hereinafter, when the CRS is described in more detail, the CRS is used for estimating the channel of the physical antenna and is distributed in an entire frequency band as a reference signal which may be commonly received by all UEs positioned in the cell. Further, the CRS may be used for the channel quality information (CSI) and the data demodulation.

The CRS is defined in various formats according to an antenna array at the transmitting side (eNB). In the 3GPP LTE system (for example, release-8), various antenna arrays are supported and a downlink signal transmitting side has three types of antenna arrays such as three single transmitting antennas, two transmitting antennas, and four transmitting antennas. When the eNB uses the single transmitting antenna, reference signals for the single antenna port are arrayed. When the eNB uses two transmitting antennas, the reference signals for two transmitting antenna ports are arrayed by using a time division multiplexing (TDM) and/or frequency division multiplexing (FDM) scheme. That is, the reference signals for the two antenna ports are allocated different time resources and/or different frequency resources, respectively, to be distinguished.

Moreover, when the eNB uses four transmitting antennas, the reference signals for four transmitting antenna ports are arrayed by using the TDM and/or FDM scheme. Channel information measured by the receiving side (UE) of the downlink signal may be used for demodulating data transmitted by using a transmission scheme such as single transmitting antenna transmission, transmission diversity, closed-loop spatial multiplexing, open-loop spatial multiplexing, or multi-user multi-input multi-output (MIMO).

In the case where a multi-input/multi-output antenna is supported, when the reference signal is transmitted from a specific antenna port, the reference signal is transmitted to the locations of the resource elements specified according to the pattern of the reference signal and the reference signal is not transmitted to the locations of the resource elements specified for another antenna port. That is the reference signals between different antennas do not overlap with each other.

A rule of mapping the CRS to the resource block is defined as follows.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{cell,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l denote a subcarrier index and a symbol index, respectively, and p denotes an antenna port. $N_{symb}^{DL}$ denotes the number of OFDM symbols in one downlink slot and $N_{symb}^{DL}$ denotes the number of radio resources allocated to the downlink. ns denotes a modulo operation. The location of the reference signal varies depending on a value of $v_{shift}$ in the frequency domain. Since $v_{shift}$ depends on a cell ID, the location of the reference signal has various frequency shift values depending on the cell.

More specifically, in order to enhance the channel estimation performance through the CRS, the position of the CRS may be shifted in the frequency domain depending on the cell. For example, when the reference signal is located at an interval of three subcarriers, reference signals in one cell are allocated to the 3k-th subcarrier, and reference signals in the other cells are allocated to the 3k+1-th subcarrier. From the viewpoint of one antenna port, the reference signals are arrayed at an interval of six resource elements in the frequency domain and separated from the reference signal allocated to another antenna port at an interval of three resource elements.

In the time domain, reference signals are arrayed at a constant interval starting from symbol index 0 of each slot. The time interval is defined differently depending on a cyclic prefix length. In the case of a normal cyclic prefix, the reference signals are positioned in symbol indexes 0 and 4 of the slot and in the case of an extended cyclic prefix, the reference signals are positioned in symbol index 0 and 3 of the slot. A reference signal for an antenna port having a maximum value between two antenna ports is defined in one OFDM symbol. Therefore, in the case of four transmitting antenna transmissions, the reference signals for reference signal antenna ports 0 and 1 are located in symbol indexes 0 and 4 (symbol indexes 0 and 3 in the case of the extended cyclic prefix) of the slot and the reference signals for antenna ports 2 and 3 are located in symbol index 1 of the slot. Positions in the frequency domains of the reference signals for antenna ports 2 and 3 are swapped with each other in a second slot.

Hereinafter, when the DRS is described in more detail, the DRS is used for demodulating data. A precoding weight used for a specific UE in MIMO transmission is used without any change in order to estimate a channel corresponding in combination with the transport channel transmitted in each transmitting antenna when the UE receives the reference signal.

The 3GPP LTE system (e.g., Release-8) supports up to four transmitting antennas and the DRS for rank 1 beamforming is defined. The DRS for rank 1 beamforming also indicates a reference signal for antenna port index 5.

A rule of mapping the DRS to the resource block is defined as follows. Equation 2 shows the normal cyclic prefix and Equation 3 shows the extended cyclic prefix.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 1 to 3, k and p denote the subcarrier index and the antenna ports, respectively. $N_{RB}^{DL}$, ns, and $N_{ID}^{cell}$ represent the number of RBs allocated to the downlink, the number of slot indexes, and the number of cell IDs, respectively. The location of the RS depends on the value of $v_{shift}$ in terms of the frequency domain.

In Equations 2 and 3, k and l denote the subcarrier index and a symbol index, respectively, and p denotes the antenna port. $N_{sc}^{RB}$ represents a resource block size in the frequency domain and $N_{sc}^{RB}$ is expressed as the number of subcarriers. $n_{PRB}$ represents the number of physical resource blocks. $N_{RB}^{PDSCH}$ represents a frequency band of a resource block for PDSCH transmission. ns denotes a slot index and $N_{ID}^{cell}$ denotes a cell ID. mod represents a modulo operation. The position of the reference signal depends on the value of $v_{shift}$ in the frequency domain. Since $v_{shift}$ is dependent on the cell ID, the position of the reference signal has various frequency shift values depending on the cell.

Sounding Reference Signal (SRS)

An SRS is mainly used for channel quality measurement to perform uplink frequency-selective scheduling and is not related to transmission of uplink data and/or control information. However, the present invention is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a predetermined UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array among the arrays completely turns off a switch of the SRS in the cell and this is primarily suitable for a serving cell that serves high-speed UEs.

FIG. 11 illustrates an uplink subframe including a sounding reference signal symbol in a wireless communication system to which the present invention may be applied.

Referring to FIG. 11, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

Overview of Carrier Aggregation

A communication environment considered in embodiments of the present invention includes all multi-carrier support environments. That is, a multi-carrier system or carrier aggregation (CA) system used in the present invention is a system in which, when a target wide band is configured, one or more component carriers (CCs) having a bandwidth smaller than a target bandwidth are aggregated and used in order to support a wide band.

In the present invention, multi-carriers refer to aggregation (or carrier aggregation) of carriers and in this case, the aggregation of the carriers refers to both aggregation of contiguous carriers and aggregation of non-contiguous carriers. Further, the number of components carriers aggregated between the downlink and the uplink may be set differently. A case where the number of downlink component carriers (hereinafter, referred to as 'In CC') is equal to the number of uplink component carriers (hereinafter, referred to as 'UL CC') is referred to as symmetric aggregation and a case where the number of downlink CCs is different from the number of uplink CCs is referred to as asymmetric aggregation. Such carrier aggregation may be used interchangeably with terms such as carrier aggregation, bandwidth aggregation, spectrum aggregation, and the like.

Carrier aggregation configured by combining two or more component carriers aims at supporting up to 100 MHz bandwidth in the LTE-A system. When one or more carriers having a bandwidth smaller than the target bandwidth are combined, the bandwidth of the combined carriers may be limited to the bandwidth used in the existing system in order to maintain backward compatibility with the existing IMT system. For example, in the existing 3GPP LTE system, {1.4, 3, 5, 10, 15, 20} MHz bandwidth is supported and in 3GPP LTE-advanced system (that is, LTE-A), a bandwidth larger than 20 MHz may be supported by using only the bandwidths for compatibility with the existing system. Further, the carrier aggregation system used in the present invention may support the carrier aggregation by defining a new bandwidth regardless of the bandwidth used in the existing system.

The LTE-A system uses a concept of a cell to manage radio resources.

The aforementioned carrier aggregation environment may be referred to as a multiple-cell environment. The cell is defined as a combination of a pair of a downlink resource (DL CC) and an uplink resource (UL CC), but the uplink resource is not required. Accordingly, the cell may be constituted by the downlink resource along or by the downlink resource and the uplink resource. When a specific user equipment has only one configured serving cell, the specific user equipment may have one DL CC and one UL CC, but when the specific user equipment has two or more configured serving cells, the specific user equipment may have DL CCs as many as the cells and the number of UL CCs may be equal to or smaller therethan.

Alternatively, on the contrary, the DL CC and the UL CC may be configured. That is, when the specific user equipment has multiple configured serving cells, a carrier aggregation environment in which the number of UL CCs is larger than the number of DL CCs may also be supported. That is, the carrier aggregation may be appreciated as aggregation of two or more different cells having carrier frequencies (center frequency of the cell), respectively. Here, the term 'cell' needs to be distinguished from a 'cell' as an area covered by the eNB which is generally used.

The cell used in the LTE-A system includes a primary cell (PCell) and a secondary cell (SCell). The P cell and the S cell may be used as the serving cell. In the case of a user equipment which is in an RRC_CONNECTED state, but does not configure the carrier aggregation or does not support the carrier aggregation, only one serving cell configured only by the P cell exists. On the contrary, in the case of a user equipment which is in the RRC_CONNECTED state and configures the carrier aggregation, one or more serving cells may exist and the entire serving cell includes the P cell and one or more S cells.

The serving cell (P cell and S cell) may be configured through an RRC parameter. PhysCellId has integer values of 0 to 503 as a physical layer identifier of the cell. SCellIndex has integer values of 1 to 7 as a short identifier used for identifying the S cell. ServCellIndex has integer values of 0 to 7 as a short identifier used for identifying the serving cell (P cell or S cell). The 0 value is applied to the P cell and SCellIndex is previously granted to be applied to the S cell. That is, a cell having the smallest cell ID (or cell index) in ServCellIndex becomes the P cell.

The P cell refers to a cell operating on a primary frequency (or primary CC). The user equipment may be used to perform an initial connection establishment process or a connection re-establishment process and may refer to a cell indicated during a handover process. Further, the P cell refers to a cell which becomes a center of control related communication among the serving cells configured in the carrier aggregation environment. That is, the user equipment may be allocated the PUCCH only in the P cell thereof and may transmit the allocated PUCCH and may use only the P cell for acquiring system information or changing a monitoring procedure. Evolved Universal Terrestrial Radio Access (E-UTRAN) may change only the P cell for the handover procedure by using an RRC connection reconfiguration message of a higher layer, which includes mobility control information to the user equipment that supports the carrier aggregation environment.

The S cell refers to a cell operating on a second frequency (or secondary CC). Only one P cell may be allocated to the specific user equipment and one or more S cells may be allocated to the specific user equipment. The S cell may be configured after the RRC connection is configured and may be used to provide an additional radio resource. The PUCCH does not exist in remaining cells other than the P cell among the serving cells configured in the carrier aggregation environment, that is, the S cell. When the E-UTRAN adds the S cell to the user equipment supporting the carrier aggregation environment, the E-UTRAN may provide all the system information related to the operation of a related cell which is in the RRC_CONNECTED state through a dedicated signal. The change of the system information may be controlled by releasing and adding the related S cell and the RR connection reconfiguration message of the higher layer may be used at this time. The E-UTRAN may perform dedicated signaling with different parameters for each user equipment rather than broadcasting within the related Scell.

After an initial security activation process starts, the E-UTRAN may configure a network including one or more S cells in addition to the P cell initially configured in the connection configuration process. In the carrier aggregation environment, the P cell and the S cell may operate as respective component carriers. In the following embodiments, the primary component carrier (PCC) may be used in the same meaning as the P cell and the secondary component carrier (SCC) may be used in the same meaning as the Scell.

Figure 12:
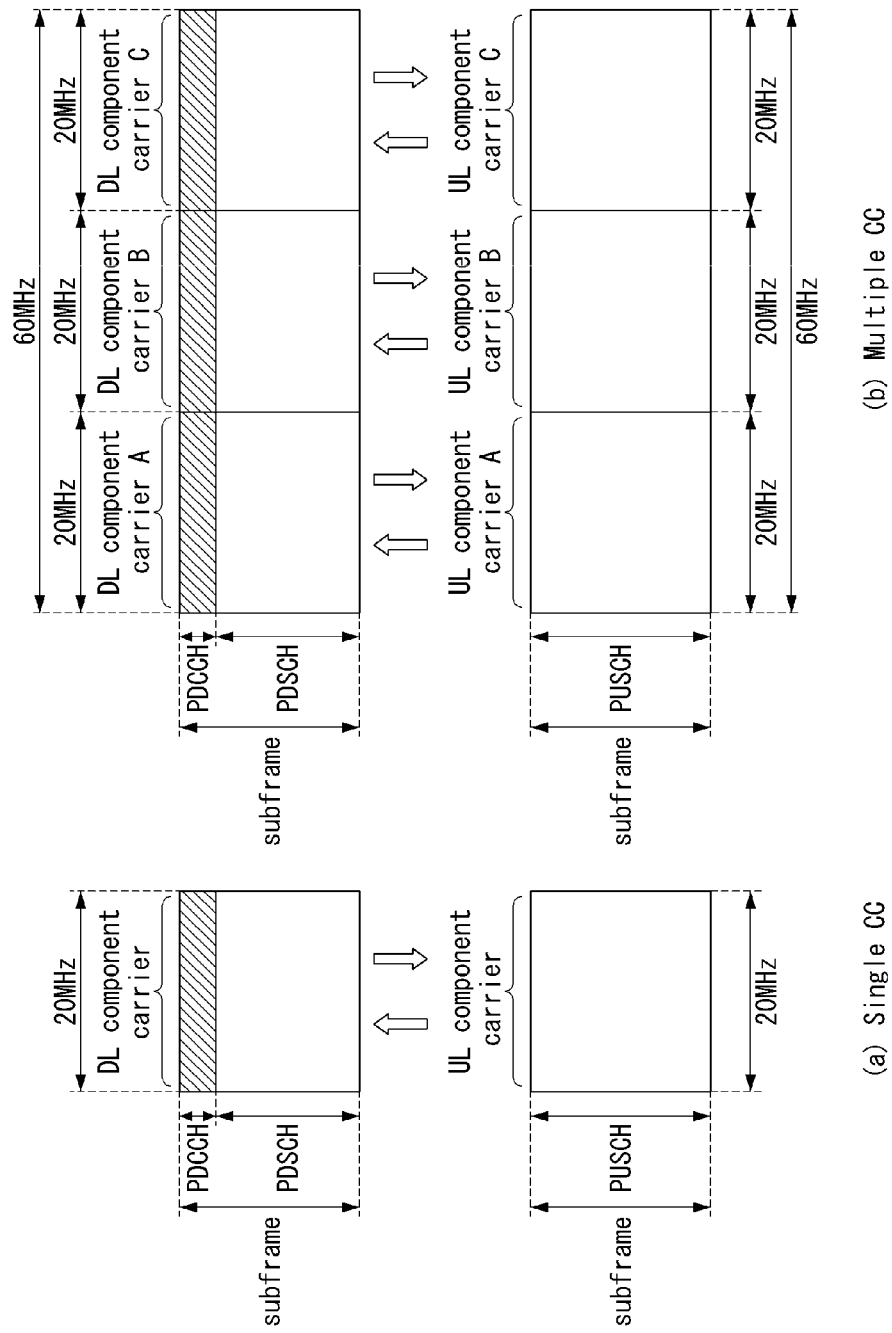
FIG. 12 illustrates examples of a component carrier and carrier aggregation in a wireless communication system to which the present invention may be applied.

FIG. 12 illustrates examples of a component carrier and carrier aggregation in a wireless communication system to which the present invention may be applied.

FIG. 12(a) illustrates a single carrier structure used in the LTE system. The component carrier includes the DL CC and the UL CC. One component carrier may have a frequency range of 20 MHz.

FIG. 12(b) illustrates a carrier aggregation structure used in the LTE-A system. FIG. 12(b) illustrates a case where three component carriers having a frequency magnitude of 20 MHz are combined. There are three DL CCs and three UL CCs, but the numbers of DL CCs and UL CCs are not limited. In the case of the carrier aggregation, the UE may simultaneously monitor three CCs, and receive a downlink signal/data and transmit an uplink signal/data.

When N DL CCs are managed in a specific cell, the network may allocate M (M≤N) DL CCs to the user equipment. In this case, the UE may monitor only M limited DL CCs and receive the DL signal. Further, the network may allocate a primary DL CC to the user equipment by assigning priorities to L (L≤M≤N) DL CCs and in this case, the UE needs to particularly monitor L DL CCs. Such a scheme may be similarly applied even to uplink transmission.

A linkage between the carrier frequency (or DL CC) of the downlink resource and the carrier frequency (or UL CC) of the uplink resource may be indicated by a higher layer message such as an RRC message or system information. For example, a combination of the DL resource and the UL resource may be configured by a linkage defined by System Information Block Type2 (SIB2). Specifically, the linkage may refer to a mapping relationship between a DL CC in which a PDCCH carrying a UL grant is transmitted and a UL CC that uses the UL grant or may refer to a mapping relationship between a DL CC (or UL CC) in which data for HARQ is transmitted and a UL CC (or DL CC) in which an HARQ ACK/NACK signal is transmitted.

Cross Carrier Scheduling

There are two types of a self-scheduling method and a cross carrier scheduling method in terms of scheduling for a carrier (or a carrier wave) or a serving cell in a carrier aggregation system. Cross carrier scheduling may be referred to as cross component carrier scheduling or cross cell scheduling.

The cross carrier scheduling means that the PDCCH (DL Grant) and the PDSCH are transmitted to different DL CCs or the PUSCH transmitted according to the PDCCH (UL Grant) transmitted from the DL CC is transmitted through other UL CC other than UL CC linked with the DL CC receiving the UL grant.

The cross carrier scheduling may be UE-specifically activated or deactivated and may be semi-statically informed for each UE through higher layer signaling (e.g., RRC signaling).

When the cross carrier scheduling is activated, a carrier indicator field (CIF) indicating through which DL/UL CC the PDSCH/PUSCH indicated by the corresponding PDCCH is transmitted to the PDCCH is required. For example, the PDCCH may allocate a PDSCH resource or a PUSCH resource to one of multiple component carriers using the CIF. That is, the CIF is configured when the PDCCH on the DL CC allocates the PDSCH or PUSCH resource to one of DL/UL CC in which is multi-aggregated.

In this case, a DCI format of LTE-A Release-8 may be extended according to the CIF. In this case, the configured CIF may be fixed to the 3-bit field or a location of the configured CIF may be fixed regardless of a DCI format size. Further, a PDCCH structure (resource mapping based the same coding and the same CCE) of LTE-A Release-8 may be reused.

On the contrary, the CIF is not configured when the PDCCH on the DL CC allocates the PDSCH resource on the same DL CC or allocates the PUSCH resource on a single linked UL CC. In this case, the same PDCCH structure (resource mapping based the same coding and the same CCE) and the DCI format as LTE-A Release-8 may be used.

When the cross carrier scheduling is available, the UE needs to monitor the PDCCHs for a plurality of DCIs in the control region of the monitoring CC according to the transmission mode and/or bandwidth for each CC. Therefore, a configuration of the search space and PDCCH monitoring that may support the monitoring are needed.

In the carrier aggregation system, a UE DL CC set represents a set of DL CCs scheduled for the UE to receive the PDSCH and a UE UL CC set represents a set of UL CCs scheduled for the UE to transmit the PUSCH. Further, a PDCCH monitoring set indicates at least one DL CC set that performs PDCCH monitoring. The PDCCH monitoring set may be the same as the UE DL CC set or may be a subset of the UE DL CC set. The PDCCH monitoring set may include at least any one of DL CCs within the UE DL CC set. Alternatively, the PDCCH monitoring set may be separately defined regardless of the UE DL CC set. The DL CC not included in the PDCCH monitoring set may be configured so that the self-scheduling for the linked UL CC is continuously enabled. The UE DL CC set, the UE UL CC set, and the PDCCH monitoring set may be configured to be UE-specific, UE group-specific, or cell-specific.

When the cross carrier scheduling is deactivated, it is meant that the PDCCH monitoring set is continuously the same as the UE DL CC set and in this case, an indication such as separate signaling for the PDCCH monitoring set is not required. However, when the cross carrier scheduling is activated, the PDCCH monitoring set is preferably defined within the UE DL CC set. That is, in order to schedule the PDSCH or PUSCH with respect to the UE, the eNB transmits the PDCCH through only the PDCCH monitoring set.

Figure 13:
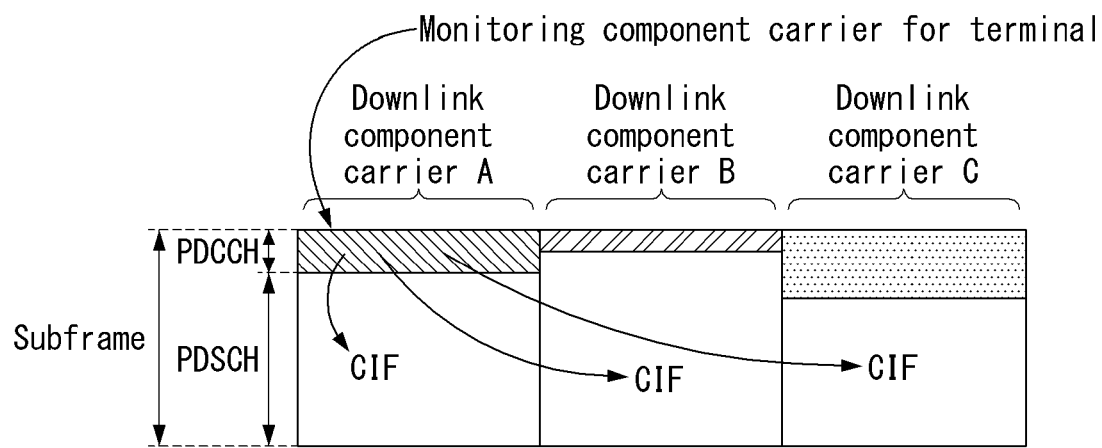
FIG. 13 illustrates an example of a subframe structure according to cross carrier scheduling in a wireless communication system to which the present invention may be applied.

FIG. 13 illustrates an example of a subframe structure according to cross carrier scheduling in a wireless communication system to which the present invention may be applied.

Referring to FIG. 13, a DL subframe for the LTE-A UE is combined with three DL CCs and DL CC 'A' is configured as PDCCH monitoring DL CC. When CIF is not used, each DL CC may transmit a PDCCH that schedules the PDSCH of the DL CC without the CIF. On the contrary, when the CIF is used through the higher layer signaling, only one DL CC 'A' may transmit the PDCCH that schedules the PDSCH of DL CC 'A' or the PDSCH of another CC. In this case, DL CCs 'B' and 'C' which are not configured as PDCCH monitoring DL CC do not transmit the PDCCH.

PDCCH Transmission

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

Next, the eNB generates coded data by performing channel coding of control information to which the CRC is added. In this case, the channel coding may be performed with a code rate depending on an MCS level. The eNB performs rate matching depending on a CCE aggregation level allocated to the PDCCH format and modulates the coded data to generate modulation symbols. In this case, a modulation sequence depending on the MCS level may be used. In modulation symbols constituting one PDCCH, the CCE aggregation level may be one of 1, 2, 4, and 8. Thereafter, the eNB maps the modulation symbols to a physical resource element (CCE to RE mapping).

A plurality of PDCCH may be transmitted within one subframe. That is, the control region of one subframe is constituted by a plurality of CCEs having indexes 0 to $N_{CCEk}-1$. Here, $N_{CCEk}$ represents the total number of CCEs within the control region of the k-th subframe. The UE monitors a plurality of PDCCHs for every subframe. Here, monitoring means that the UE attempts to decode each of the PDCCHs according to monitored PDCCH formats. In the control region allocated in the subframe, the eNB does not provide information on where the corresponding PDCCH is located to the UE. Since the UE may not know from which position and by which CCE aggregation level or DCI format the PDCCH of the UE is transmitted in order to receive the control channel transmitted from the eNB, the UE monitors an aggregation of PDCCH candidates in the subframe to find the PDCCH thereof. This is called blind decoding (BD). The blind decoding refers to a method in which the UE de-masks a UE ID of the UE to a CRC part and then checks CRC errors to determine whether the corresponding PDCCH is the control channel of the UE.

In an active mode, the UE monitors the PDCCH of each subframe in order to receive data to be transmitted to the UE. In a DRX mode, the UE wakes up in a monitoring period of every DRX cycle and monitors the PDCCH in a subframe corresponding to the monitoring period. A subframe in which the PDCCH is monitored is referred to as a non-DRX subframe.

In order to receive the PDCCH transmitted to the UE, the UE must perform the blind decoding on all CCEs present in the control region of the non-DRX subframe. Since the UE does not know which PDCCH format is to be transmitted, the UE must decode all PDCCHs at an available CCE aggregation level until the blinding decoding of the PDCCH is successful within every non-DRX subframe. Since the UE does not know how many CCEs the PDCCH for the UE uses, the UE must attempt detection at all available CCE aggregation levels until the blind decoding of the PDCCH is successful. That is, the UE performs the blind decoding for each CCE aggregation level. That is, the UE first attempts decoding by setting a CCE aggregation level unit to 1. When decoding is unsuccessful, the UE attempts decoding by setting the CCE aggregation level unit to 2. Thereafter, the UE attempts decoding by setting the CCE aggregation level unit to 4 and setting the CCE aggregation level unit to 8 again. Further, the UE attempts the blind decoding for all of four indicators C-RNTI, P-RNTI, SI-RNTI, and RA-RNTI. In addition, the UE attempts the blind decoding for all DCI formats to be monitored.

As described above, when the blind decoding is performed for each of all CCE aggregation levels for all DCI formats to be monitored for all available RNTIs, since the number of detection attempts is excessively increased, a search space (SS) concept is defined for the blind decoding of the UE in the LTE system. The search space may mean a PDCCH candidate set for monitoring and may have a different size according to each PDCCH format.

The search space may be constituted by a common search space (CSS) and a UE-specific/dedicated search space (USS). In the case of the common search space, all UEs may know the size of the common search space, but the UE-specific search space may be set individually for each UE. Therefore, the UE must monitor both the UE-specific search space and the common search space in order to decode the PDCCH, and thus performs the blind decoding (BD) at a maximum of 44 times in one subframe. 44-time blind decoding does not include blind decoding performed according to different CRC values (e.g., C-RNTI, P-RNTI, SI-RNTI, and RA-RNTI).

Due to a small search space, in the eNB, a CCE resource for transmitting the PDCCH to all UEs which the eNB intends to transmit the PDCCH within a given subframe may not be secured. The reason is that resources which remain after CCE locations are allocated may not be included in the UE-specific search space. A UE-specific hopping sequence may be applied at a start point of the UE-specific search space in order to minimize such barriers that may continue even in a next subframe.

Table 4 shows sizes of the common search space and the UE-specific search space.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of the UE according to the number of attempts of blind decoding, the UE does not simultaneously perform searches according to all defined DCI formats. Specifically, the UE may continuously perform searches for DCI formats 0 and 1 A in the UE-specific search space. In this case, the DCI formats 0 and 1A have the same size, but the UE may distinguish the DCI format using a flag (flag for format 0/format 1A differentiation) used for distinguishing the DCI formats 0 and 1A included in the PDCCH. In addition, according to the PDSCH transmission mode configured by the eNB, other DCI formats other than formats 0 and 1A may be requested to the UE and as an example, the DCI formats may include DCI formats 1, 1B, and 2.

In the common search space, the UE may search DCI formats 1 A and 1C. Further, the UE may be configured to search DCI format 3 or 3A and DCI formats 3 and 3A may have the same size as DCI formats 0 and 1A, but the UE may distinguish the DCI format by using CRC scrambled by other identifiers other than the UE-specific identifier.

The search space $S_k^{(L)}$ means a PDCCH candidate set according to the aggregation level $L \in \{1,2,4,8\}$ The CCE according to the PDCCH candidate set m of the search space may be determined by Equation 1 below.

$$L \cdot \{(Y_k+m) \bmod \lfloor N_{CCE,k}/L \rfloor\}+i \quad \text{[Equation 4]}$$

Here, $M^{(L)}$ denotes the number of PDCCH candidates according to the CCE aggregation level L for monitoring in the search space and m=0, . . . , $M^{(L)}$-1. i denotes an index for designating individual CCEs in respective PDCCH candidates and i=0, . . . , L-1.

As described above, the UE monitors both the UE-specific search space and the common search space in order to decode the PDCCH. Here, the common search space CSS supports PDCCHs having aggregate levels of {4, 8} and the UE-specific search space USS supports PDCCHs having aggregate levels of {1, 2, 4, 8}.

Table 5 shows the PDCCH candidates monitored by the UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, for the common search spaces, $Y_k$ is set to 0 for the two aggregation levels L=4 and L=8. For the UE-specific search space for the aggregation level L, $Y_k$ is defined by Equation 5.

$$Y_k=(A \cdot Y_{k-1}) \bmod D \quad \text{[Equation 5]}$$

Here, $Y_{-1}=n_{RNTI} \neq 0$ and an RNTI value used for $n_{RNTI}$ may be defined as one of identifications of the UE. Further, A=39827 D=65537 and k=$\lfloor n_s/2 \rfloor$. Here $n_s$ denotes is the slot number (or index) within a radio frame.

ACK/NACK Multiplexing Method

Under the situation that a UE should simultaneously transmit multiple ACK/NACKs corresponding to multiple data units received from the eNB, in order to maintain the single-carrier property of ACK/NACK signals and reduce the total ACK/NACK transmission power, an ACK/NACK multiplexing method based on PUCCH resource selection can be considered.

With ACK/NACK multiplexing, contents of the ACK/NACK responses for multiple data units are identified by the combination of the PUCCH resource used in actual ACK/NACK transmission and the one of QPSK modulation symbols.

For example, if we assume one PUCCH resource transmits 4 bits and 4 data units can be transmitted in maximum, the ACK/NACK result can be identified at the TX node as in the following Table 3.

TABLE 6

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |

TABLE 6-continued

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, ACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 6, HARQ-ACK(i) indicates the ACK/NACK result for an i-th data unit. In Table 3, discontinuous transmission (DTX) means there is no data unit transmitted for corresponding HARQ-ACK(i) or the UE doesn't detect the data unit corresponding to HARQ-ACK(i).

According to Table 6, there are up to 4 PUCCH resources ($n_{PUCCH,0}^{(1)}$, $n_{PUCCH,1}^{(1)}$, $n_{PUCCH,2}^{(1)}$, and $n_{PUCCH,3}^{(1)}$, and b(0) and b(1) are two bits transmitted using the selected PUCCH.

Fore example, if the UE receives 4 data units successfully, the UE transmits two bits, (1, 1), using $n_{PUCCH,1}^{(1)}$.

When the UE fails in decoding the first and third data units and decodes the second and fourth data units, the UE transmits bits (1, 0) using $n_{PUCCH,3}^{(1)}$.

In the ACK/NACK channel selection, if there is at least one ACK, NACK and DTX are coupled. This is because combinations of reserved PUCCH resources and QPSK symbols are insufficient to cover all ACK/NACK states. However, if there is no the ACK, the DTX is decoupled with the NACK.

In this case, the PUCCH resource linked to the data unit corresponding to single definite NACK may be also reserved to transmit the signal of multiple ACK/NACKs.

Block-Spreading Technique

A block-spreading technique is a method of modulating a control signal transmission using an SC-FDMA scheme unlike an existing PUCCH format 1 or 2 sequence. As shown in FIG. 14, a symbol sequence may spread and transmitted on a time-domain using an orthogonal cover code (OCC) Control signals of a plurality of UEs may be multiplexed on the same RB using the OCC. In the case of the PUCCH format 2 described above, one symbol sequence is transmitted over the time domain and the control signals of the plurality of UEs are multiplexed using a cyclic shift (CS) of a CAZAC sequence. On the other hand, in the case of a block-spreading based PUCCH format (e.g., PUCCH format 3), one symbol sequence is transmitted over the frequency domain and the control signals of the plurality of UEs are multiplexed by using the time domain spreading using the OCC.

Figure 14:
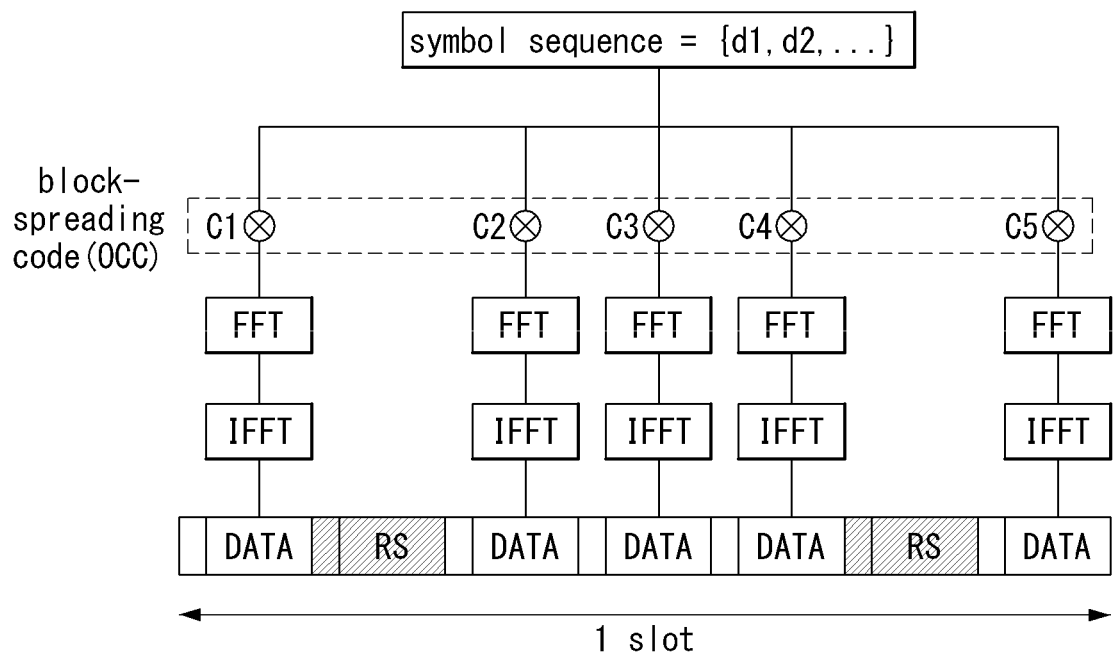
FIG. 14 illustrates an example of generating and transmitting five SC-FDMA symbols during one slot in a wireless communication system to which the present invention may be applied.

FIG. 14 shows an example of generating and transmitting 5 SC-FDMA symbols for one slot in the wireless communication system to which the present invention may be applied.

FIG. 14 shows an example of generating and transmitting 5 SC-FDMA symbols (that is, data part) using the OCC of length=5 (SF=5) with one symbol sequence for 1 slot. In this case, two RS symbols may be used for 1 slot.

In an example of FIG. 14, the RS symbol may be generated from a CAZAC sequence having a specific cyclic shift value, and may be transmitted in a form in which a specific OCC is applied (multiplied) to a plurality of RS symbols. Further, in the example of FIG. 8, assuming that 12 modulation symbols are used for each OFDM symbol (or SC-FDMA symbol) and each modulation symbol is generated by QPSK, the maximum number of bits that can be transmitted for one slot is 12×2=24 bits. Therefore, the number of bits that can be transmitted in two slots is total 48 bits. As such, in the case of using the block-spreading type PUCCH channel structure, transmission of control information having an expanded size is enabled compared with the existing PUCCH format 1 or 2 sequence.

Hybrid-Automatic Repeat and Request (HAM))

In a mobile communication system, one eNB transmits and receives to and from multiple UEs through a wireless channel environment in one cell/sector.

In multicarriers and systems operated in a similar manner thereas, the eNB receives packet traffic from a wired Internet network and transmits the received packet traffic to each UE using a predetermined communication method. In this case, it is downlink scheduling that the eNB determines at what timing, through which frequency domain, and to which UE data is transmitted.

In addition, the data transmitted from the UE by using a predetermined communication scheme is received and modulated to transmit the packet traffic through the wired Internet network. It is uplink scheduling that the eNB determines at what timing, through which frequency band, and to which UE uplink data may be transmitted. In general, a UE with a good channel status transmits and receives data using more frequent frequency resources.

Figure 15:
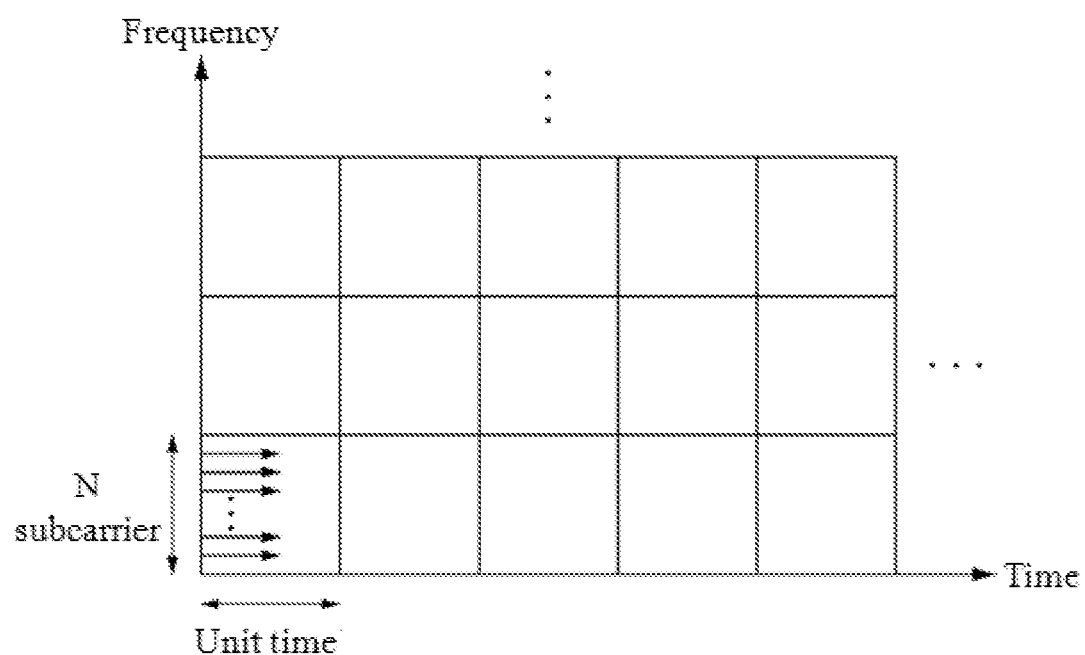
FIG. 15 is a diagram illustrating a time-frequency resource block in a time-frequency domain of a wireless communication system to which the present invention may be applied.

FIG. 15 is a diagram illustrating a time-frequency resource block in a time-frequency domain of a wireless communication system to which the present invention may be applied.

Resources in the multicarriers and the systems operated in the similar manner thereas may be largely divided into the time and frequency domains. The resource may again be defined as the resource block, which is made up of any N number of subcarriers and any M number of subframes or a given time unit. In this case, N and M may become 1.

In FIG. 15, one rectangle means one resource block, and one resource block has a plurality of subcarriers as one axis and a predetermined time unit as another axis. In the downlink, the eNB schedules one or more resource blocks to a selected UE according to a predetermined scheduling rule and the eNB transmits data using resource blocks allocated to the UE. In the uplink, the eNB schedules one or more resource blocks to the selected UE according to the predetermined scheduling rule and the UE transmits data using the allocated resources to the uplink.

As an error control method in the case where frames are lost or damaged after transmission of data after scheduling, there are an automatic repeat request (ARQ) scheme and more advanced HARQ (hybrid ARQ) scheme.

Basically, in the ARQ scheme, an acknowledgment message (ACK) is waited to arrive after one frame transmission and the receiving side sends the acknowledgment message (ACK) only when the receiving side correctly receives the acknowledgment message, and sends a negative-ACK (NACK) when an error occurs in the frame and deletes information on a receiving frame having the error from a receiver buffer. When the transmitting side receives the ACK signal, the transmitting side then transmits the frame, but when receiving the NACK message, the receiving side retransmits the frame.

Unlike the ARQ scheme, in the HARQ scheme, when the received frame may not be demodulated, the receiver transmits the NACK message to the transmitter, but an already received frame is stored in the buffer for a predetermined time and when the frame is retransmitted, the corresponding frame is combined with the previously received frame to increase a reception success rate.

In recent years, a more efficient HARQ scheme than the basic ARQ scheme has been more widely used. Such an HARQ scheme also includes various types and may be largely divided into synchronous HARQ and asynchronous HARQ according to a retransmission timing and may be divided into a channel-adaptive scheme and a channel-non-adaptive scheme according to whether the channel state is reflected to a quantity of resources used for retransmission.

The synchronous HARQ scheme is a scheme in which, when initial transmission is unsuccessful, the subsequent retransmission is performed at a timing determined by the system. That is, assuming that retransmission is performed every fourth time unit after the initial transmission is unsuccessful, it is not necessary to notify the timing again because an appointment has already been made between the eNB and the UE. However, if the NACK message is received from the data transmitting side, the frame is retransmitted every fourth time unit until receiving the ACK message.

On the contrary, in the asynchronous HARQ scheme, the retransmission timing may be newly scheduled or may be made through additional signaling. A timing at which retransmission for the frame, which is previously unsuccessful is performed is varied by various factors including the channel state, and the like.

The channel non-adaptive HARQ scheme is a scheme in which modulation of the frame, the number of resource blocks to be used, adaptive modulation and coding (AMC), and the like are performed at the time of the retransmission as determined at the initial transmission. Unlike this, the channel adaptive HARQ scheme is a scheme in which the modulation of the frame, the number of resource blocks to be used, the adaptive modulation and coding (AMC), and the like are varied according to the channel state. For example, it is the channel non-adaptive HARQ scheme that data is transmitted using six resource blocks in the initial transmission on the transmitting side and the data is retransmitted using 6 resource blocks similarly even in the subsequent retransmission. On the contrary, a scheme in which even though the data is initially transmitted using 6 resource blocks, the data is then retransmitted using resource blocks of a larger number or a smaller number than 6 according to the channel state is the channel adaptive HARQ scheme.

Each of four HARQ combinations may be made by such a classification, but the primarily used HARQ scheme includes an asynchronous and channel-adaptive HARQ scheme and a synchronous and channel-non-adaptive HARQ scheme.

In the asynchronous and channel-adaptive HARQ scheme, retransmission efficiency may be maximized by adaptively changing the retransmission timing and the amount of used resources according to the channel state, but the overhead becomes large, and as a result, the asynchronous and channel-adaptive HARQ scheme is not generally considered for the uplink.

Meanwhile, the synchronous and channel-non-adaptive HARQ scheme is advantageous in that there is little overhead because the timing and resource allocation for the retransmission are promised in the system, but is disadvantageous in that when the synchronous and channel-non-adaptive HARQ scheme is to be used in a channel state which is significantly changed, the retransmission efficiency becomes very low.

Figure 16:
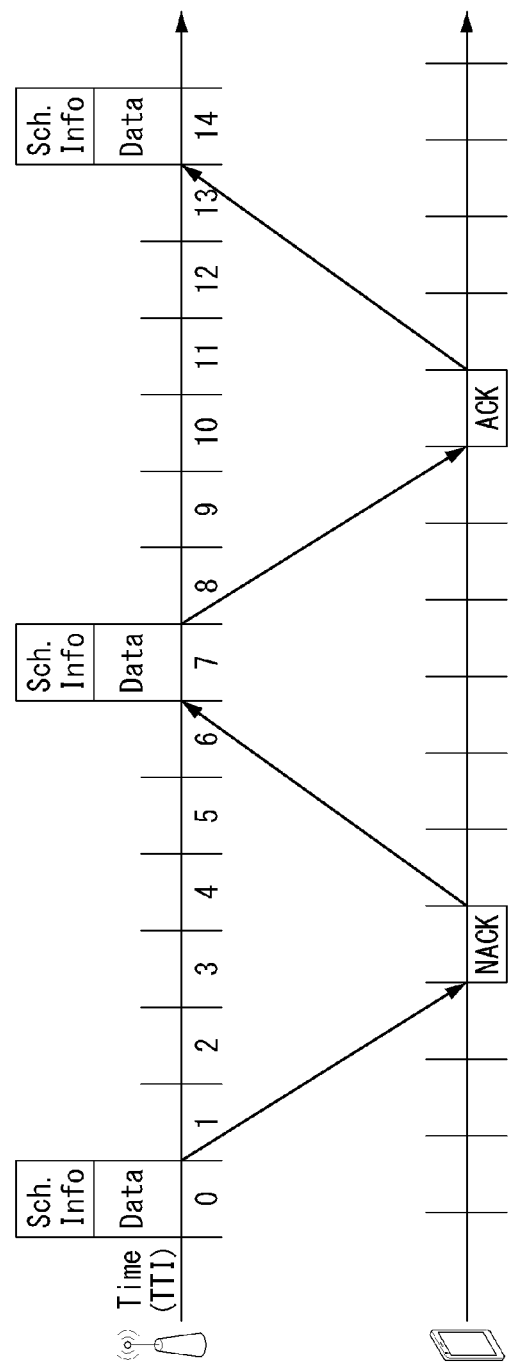
FIG. 16 is a diagram illustrating an asynchronous HARQ-scheme resource allocation and retransmission process in a wireless communication system to which the present invention may be applied.

FIG. 16 is a diagram illustrating an asynchronous HARQ-scheme resource allocation and retransmission process in a wireless communication system to which the present invention may be applied.

Meanwhile, in the case of the downlink as an example, a time delay occurs as illustrated in FIG. 16 until the next data is transmitted again after ACK/NACK information is received from the UE after data is transmitted through scheduling. This is a delay which occurs due to a channel propagation delay and time required for data decoding and data encoding.

A method of transmitting data using an independent HARQ process is used for data transmission without a gap during the delay interval. For example, if a shortest period from the next data transmission to the subsequent data transmission is 7 subframes, 7 independent processes are used to transmit data without the gap.

The LTE physical layer supports the HARQ on the PDSCH and PUSCH and transmits the associated acknowledgment (ACK) feedback on a separate control channel.

In the LTE FDD system, when not operating as MIMO, eight stop-and-wait (SAW) HARQ processes are supported in both the uplink and the downlink with a constant round-trip time (RTT) of 8 ms.

CoMP Operation Based on CA

In systems after LTE, cooperative multi-point (CoMP) transmission may be implemented using a carrier aggregation (CA) function in LTE.

Figure 17:
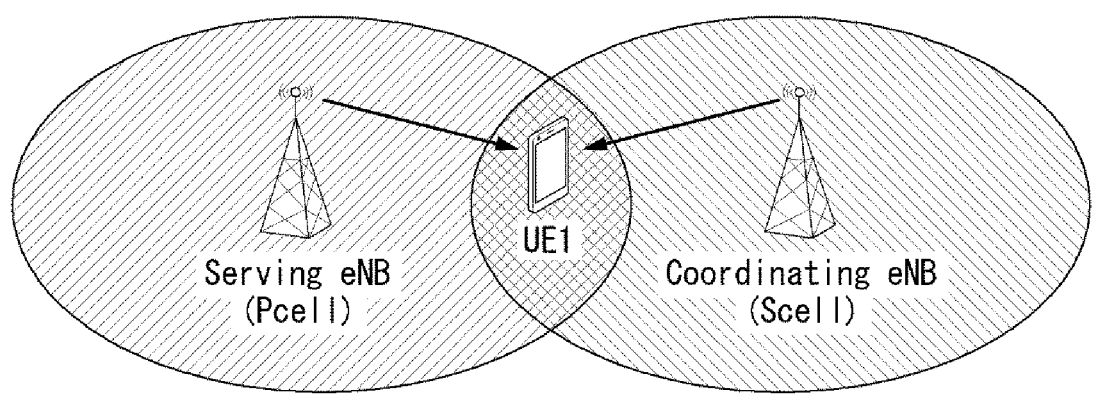
FIG. 17 is a diagram illustrating a carrier aggregation-based CoMP system in a wireless communication system to which the present invention may be applied.
Figure 17:
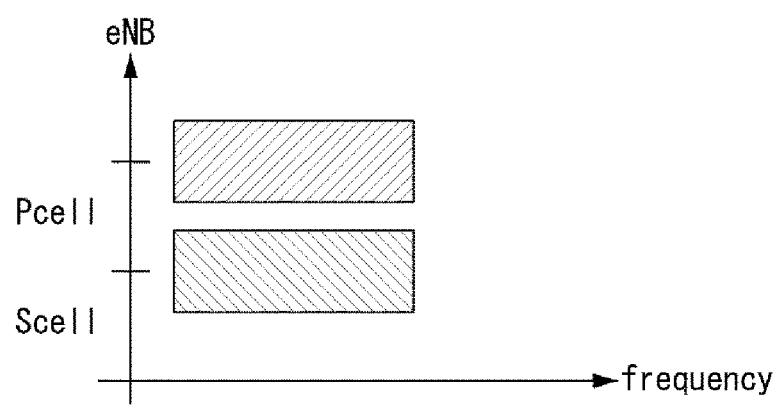

FIG. 17 is a diagram illustrating a carrier aggregation-based CoMP system in a wireless communication system to which the present invention may be applied.

Referring to FIG. 17, a primary cell (PCell) carrier and a secondary cell (SCell) carrier use the same frequency band in the frequency axis and are respectively allocated to two geographically separated eNBs.

A serving eNB allocates PCell to UE1 and a neighboring eNB which give large interference allocates SCell, thereby enabling various DL/UL CoMP operations including JT, CS/CB, dynamic cell selection, and the like.

FIG. 17 illustrates an example in which the UE aggregates two eNBs into the PCell and the SCell, respectively. However, actually, one UE aggregates three or more cells, some cells of the cells may perform a CoMP operation in the same frequency band and perform a simple CA operation in different frequency bands and in this case, the PCell need not particularly participate in the CoMP operation.

UE Procedure for Receiving PDSCH

Except the subframes indicated by the higher layer parameter 'mbsfn-SubframeConfigList', a UE shall upon detection of a PDCCH of a serving cell with DCI format 1, 1A, 1B, 1C, 1D, 2, 2A, 2B or 2C intended for the UE in a subframe, decode the corresponding PDSCH in the same subframe with the restriction of the number of transport blocks defined in the higher layers.

A UE may assume that positioning reference signals are not present in resource blocks in which it shall decode PDSCH according to a detected PDCCH with CRC scrambled by the SI-RNTI or P-RNTI with DCI format 1A or 1C intended for the UE.

A UE configured with the carrier indicator field for a given serving cell shall assume that the carrier indicator field is not present in any PDCCH of the serving cell in the common search space.

Otherwise, the CIF-configured UE shall assume that for the CIF for the serving cell is present in PDCCH located in the UE specific search space when the PDCCH CRC is scrambled by C-RNTI or SPS C-RNTI.

If a UE is configured by higher layers to decode PDCCH with CRC scrambled by the SI-RNTI, the UE decodes the PDCCH and the corresponding PDSCH according to any of the combinations defined in Table 3 below. The scrambling initialization of PDSCH corresponding to these PDCCHs is by SI-RNTI.

Table 3 illustrates a PDCCH and a PDSCH configured by SI-RNTI.

TABLE 7

| DCI format | Search space | transmission scheme of PDSCH corresponding to PDCCH |
|---|---|---|
| DCI format 1C | Common | If the number of PBCH antenna ports is 1, Single-antenna port, port 0 is used, otherwise Transmit diversity. |
| DCI format 1A | Common | If the number of PBCH antenna ports is 1, Single-antenna port, port 0 is used, otherwise Transmit diversity |

If a UE is configured by higher layers to decode PDCCH with CRC scrambled by P-RNTI, the UE decodes the PDCCH and the corresponding PDSCH according to any of the combinations defined in Table 4 below. The scrambling initialization of PDSCH corresponding to these PDCCHs is by P-RNTI.

Table 8 illustrates a PDCCH and a PDSCH configured by P-RNTI.

TABLE 8

| DCI format | Search space | transmission scheme of PDSCH corresponding to PDCCH |
|---|---|---|
| DCI format 1C | Common | If the number of PBCH antenna ports is 1, Single-antenna port, port 0 is used, otherwise Transmit diversity |
| DCI format 1A | Common | If the number of PBCH antenna ports is 1, Single-antenna port, port 0 is used, otherwise Transmit diversity |

If a UE is configured by higher layers to decode PDCCH with CRC scrambled by RA-RNTI, the UE decodes the PDCCH and the corresponding PDSCH according to any of the combinations defined in Table 5 below. The scrambling initialization of PDSCH corresponding to these PDCCHs is by RA-RNTI.

Table 9 illustrates a PDCCH and a PDSCH configured by RA-RNTI.

TABLE 9

| DCI format | Search space | transmission scheme of PDSCH corresponding to PDCCH |
|---|---|---|
| DCI format 1C | Common | If the number of PBCH antenna ports is 1, Single-antenna port, port 0 is used, otherwise Transmit diversity |
| DCI format 1A | Common | If the number of PBCH antenna ports is 1, Single-antenna port, port 0 is used, otherwise Transmit diversity |

The UE may be semi-statically configured via higher layer signaling to receive PDSCH data transmissions signaled via the PDCCH according to one of nine transmission modes, denoted mode 1 to mode 9.

In the case of a frame structure type 1,
- The UE does not receive PDSCH RBs transmitted on antenna port 5 even in any subframe in which the number of OFDM symbols for PDCCH with normal CP is equal to four.
- The UE does not receive PDSCH RBs transmitted on antenna port 5, 7, 8, 9, 10, 11, 12, 13 or 14 in the two PRBs to which a pair of virtual RBs (VRBs) is mapped if either one of the two physical RBs (PRBs) overlaps in frequency with a transmission of either PBCH or primary or secondary synchronization signals in the same subframe.
- The UE does not receive PDSCH RBs transmitted on antenna port 7 for which distributed VRB resource allocation is assigned.
- The UE may skip decoding the transport blocks if it does not receive all assigned PDSCH RBs. If the UE skips decoding, the physical layer indicates to higher layer that the transport blocks are not successfully decoded.

In the case of a frame structure type 2,
- The UE does not receive PDSCH RBs transmitted on antenna port 5 even in any subframe in which the number of OFDM symbols for PDCCH with normal CP is equal to four.
- The UE does not receive PDSCH RBs transmitted on antenna port 5 in the corresponding two PRBs to which a pair of VRBs is mapped if either one of the two PRBs overlaps in frequency with a transmission of PBCH in the same subframe.
- The UE does not receive PDSCH RBs transmitted on antenna 7, 8, 9, 10, 11, 12, 13 or 14 in the two PRBs to which a pair of VRBs is mapped if either one of the two PRBs overlaps in frequency with a transmission of a primary or secondary synchronization signal in the same subframe.
- When the normal CP is configured, the UE does not receive a PDSCH on antenna port 5 for which distributed VRB resource allocation is assigned in the special subframe with uplink-downlink configuration #1 or #6.
- The UE does not receive a PDSCH on antenna port 7 for which distributed VRB resource allocation is assigned.
- The UE may skip decoding the transport block if it does not receive all assigned PDSCH RBs. If the UE skips decoding, the physical layer indicates to higher layer that the transport blocks are not successfully decoded.

If a UE is configured by higher layers to decode a PDCCH with CRC scrambled by C-RNTI, the UE decodes the PDCCH and the corresponding PDSCH according to any of the combinations defined in Table 10 below. The scrambling initialization of PDSCH corresponding to these PDCCHs is by C-RNTI.

If the UE is configured with the CIF for a serving cell or, if the UE is configured by higher layers to decode a PDCCH with CRC scrambled by the C-RNTI, the UE decodes a PDSCH of the serving cell indicated by the CIF value in the decoded PDCCH.

When the UE configured in transmission mode 3, 4, 8 or 9 receives a DCI format 1A assignment, the UE assumes that the PDSCH transmission is associated with transport block 1 and that transport block 2 is disabled.

When the UE is configured in transmission mode 7, scrambling initialization of UE-specific reference signals corresponding to these PDCCHs is by C-RNTI.

The UE does not support transmission mode 8 if extended CP is used in the downlink.

When the UE is configured in transmission mode 9, if the UE detects a

PDCCH with CRC scrambled by the C-RNTI transmitting DCI format 1A or 2C intended for the UE, decode the corresponding PDSCH in the same subframe, the UE decodes the corresponding PDSCH in a subframe indicated by a higher layer parameter 'mbsfn-SubframeConfigList'. However, the UE is configured to decode a PMCH by the higher layer or the PRS occasion is configured only in an MBSFN subframe, the CP length used in subframe #0 is normal CP, and the subframe configured by a part of the PRS occasion by the higher layer is excepted.

Table 10 illustrates a PDCCH and a PDSCH configured by C-RNTI.

TABLE 10

| Transmission mode | DCI format | Search space | transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1 | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is 1, single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is 1, single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is 1, single-antenna port, port 0 is used, otherwise Transmit diversity MBSFN subframe: Single-antenna port, port 7 |
| | DCI format 2C | UE specific by C-RNTI | Up to 8 layer transmission, ports 7-14 |

If a UE is configured by higher layers to decode a PDCCH with CRC scrambled by SPS C-RNTI, the UE decodes the PDCCH on the primary cell and any corresponding PDSCH on the primary cell according to any of the combinations defined in Table 7 below. The same PDSCH related configuration is applied in the case that a PDSCH is transmitted without a corresponding PDCCH. The scrambling initialization of a PDSCH corresponding to these PDCCHs and a PDSCH without a corresponding PDCCH is by SPS C-RNTI.

When the UE is configured in transmission mode 7, scrambling initialization of UE-specific reference signals corresponding to these PDCCH(s) is by SPS C-RNTI.

When the UE is configured in transmission mode 9, if the UE detects a PDCCH with CRC scrambled by the SPS C-RNTI transmitting DCI format 1A or 2C intended for the UE or a PDSCH configured without the PDCCH intended for the UE, the UE decodes the corresponding PDSCH in a subframe indicated by a higher layer parameter 'mbsfn-SubframeConfigList'. However, the UE is configured to decode a PMCH by the higher layer or the PRS occasion is configured only in an MBSFN subframe, the CP length used in subframe #0 is normal CP, and the subframe configured by a part of the PRS occasion by the higher layer is excepted.

Table 11 illustrates a PDCCH and a PDSCH configured by SPS C-RNTI.

TABLE 11

| Transmission mode | DCI format | Search space | transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Transmit diversity |
| Mode 4 | DCI format 1A | Common and UE specific by C-RNTI | Transmit diversity |
| | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
| | DCI format 1 | UE specific by C-RNTI | Single-antenna port, port 5 |
| Mode 8 | DCI format 1A | Common and UE specific by C-RNTI | Single-antenna port, port 7 |
| | DCI format 2B | UE specific by C-RNTI | Single-antenna port, port 7 |
| Mode 9 | DCI format 1A | Common and UE specific by C-RNTI | Single-antenna port, port 7 |
| | DCI format 2C | UE specific by C-RNTI | Single-antenna port, port 7 |

If the UE is configured by higher layers to decode a PDCCH with CRC scrambled by a temporary C-RNTI and is not configured to decode the PDCCH with CRC scrambled by the C-RNTI, the UE decodes the PDCCH and the corresponding PDSCH according to the combination defined in Table 8. The scrambling initialization of PDSCH corresponding to these PDCCHs is by temporary C-RNTI.

Table 12 illustrates a PDCCH and a PDSCH configured by temporary C-RNTI.

TABLE 12

| DCI format | Search space | Transmission scheme of PDSCH corresponding to PDCCH |
|---|---|---|
| DCI format 1A | Common and UE specific by temporary C-RNTI | If the number of PBCH antenna ports is 1, single-antenna port, port 0 is used, otherwise Transmit diversity |
| DCI format 1 | UE specific by temporary C-RNTI | If the number of PBCH antenna ports is 1, single-antenna port, port 0 is used, otherwise Transmit diversity |

UE Procedure for Transmitting PUSCH

A UE is semi-statically configured via higher layer signaling to transmit a PUSCH signaled via a PDCCH according to one of two uplink transmission modes, denoted modes 1 and 2 as defined in Table 13. If the UE is configured by higher layers to decode PDCCH with CRC scrambled by the C-RNTI, the UE decodes the PDCCH and transmits the corresponding PDSCH according to combinations defined in Table 9 below. The scrambling initialization of this PUSCH corresponding to these PDCCHs and the PUSCH retransmission for the same transport block is by C-RNTI. Transmission mode 1 is a default uplink transmission mode for the UE until the UE is assigned in an uplink transmission mode by higher layer signaling.

When the UE configured in transmission mode 2 receives a DCI format 0 uplink scheduling grant, the UE assumes that the PUSCH transmission is associated with transport block 1 and that transport block 2 is disabled.

Table 13 illustrates a PDCCH and a PDSCH configured by C-RNTI.

TABLE 13

| Transmission mode | DCI format | Search space | Transmission scheme of PDSCH corresponding to PDCCH |
|---|---|---|---|
| Mode 1 | DCI format 0 | Common and UE specific by C-RNTI | Single-antenna port, port 10 |
| Mode 2 | DCI format 0 | Common and UE specific by C-RNTI | Single-antenna port, port 10 |
| | DCI format 4 | UE specific by C-RNTI | Closed-loop spatial multiplexing |

If the UE is configured by higher layers to decode PDCCHs with the CRC scrambled by the C-RNTI and is also configured to receive random access procedures initiated by PDCCH orders, the UE decodes the PDCCH according to the combination defined in Table 10.

Table 14 illustrates a PDCCH configured as a PDCCH order to initiate the random access procedure.

TABLE 14

| DCI format | Search space |
|---|---|
| DCI format 1A | Common and UE specific by C-RNTI |

If the UE is configured by higher layers to decode a PDCCH with CRC scrambled by the SPS C-RNTI, the UE decodes the PDCCH and transmits the corresponding PDSCH according to combinations defined in Table 11 below. The scrambling initialization of this PUSCH corresponding to these PDCCHs and the PUSCH retransmission for the same transport block is by SPS C-RNTI. The scrambling initialization of initial transmission of this PUSCH without a corresponding PDCCH and the PUSCH retransmission for the same transport block is by SPS C-RNTI.

Table 15 illustrates a PDCCH and a PUSCH configured by SPS C-RNTI.

TABLE 15

| Transmission mode | DCI format | Search space | Transmission scheme of PDSCH corresponding to PDCCH |
| --- | --- | --- | --- |
| Mode 1 | DCI format 0 | Common and UE specific by C-RNTI | Single-antenna port, port 10 |
| Mode 2 | DCI format 0 | Common and UE specific by C-RNTI | Single-antenna port, port 10 |

If the UE is configured by higher layers to decode PDCCH with CRC scrambled by the temporary C-RNTI regardless of whether UE is configured or not configured to decode PDCCHs with the CRC scrambled by the C-RNTI, the UE decodes the PDCCH and transmits the corresponding PUSCH according to combinations defined in Table 12 below. The scrambling initialization of PUSCH corresponding to these PDCCHs is by temporary C-RNTI.

If the temporary C-RNTI is set by higher layers, the scrambling of PUSCH transmission corresponding to the random access response grant and the PUSCH retransmission for the same transport block is by the temporary C-RNTI. Otherwise, the scrambling of the PUSCH transmission corresponding to the random access response grant and the PUSCH retransmission for the same transport block is by C-RNTI.

Table 16 illustrates a PDCCH configured by the temporary C-RNTI.

TABLE 16

| DCI format | Search space |
| --- | --- |
| DCI format 0 | Common |

If the UE is configured by higher layers to decode a PDCCH with CRC scrambled by TPC-PUCCH-RNTI, the UE decodes a PDCCH according to combinations defined in Table 13 below. In Table 17, the notation 3/3A implies that the UE receives either DCI format 3 or DCI format 3A depending on the configuration.

Table 17 illustrates a PDCCH configured by the TPC-PUCCH-RNTI.

TABLE 17

| DCI format | Search space |
| --- | --- |
| DCI format 3/3A | Common |

If the UE is configured by higher layers to decode a PDCCH with CRC scrambled by the TPC-PUCCH-RNTI, the UE decodes a PDCCH according to combinations defined in Table 14 below. In Table 18, the notation 3/3A implies that the UE receives either DCI format 3 or DCI format 3A depending on the configuration.

Table 18 illustrates a PDCCH configured by the TPC-PUCCH-RNTI.

TABLE 18

| DCI format | Search space |
| --- | --- |
| DCI format 3/3A | Common |

Relay Node (RN)

A relay node transmits data transmitted and received between the eNB and the UE via two different links (backhaul link and access link). The eNB may include a donor cell. The relay node is wirelessly connected to a radio-access network through a donor cell.

Meanwhile, with respect to a band (or spectrum) usage of the relay node, a case where the backhaul link operates in the same frequency band as the access link is referred to as an 'in-band', and a case where the backhaul link and the access link operate in different frequency bands is referred to as a 'out-band'. In the case of the in-band and the out-band, all UEs (hereinafter, referred to as legacy UEs) operating according to the existing LTE system (e.g., release-8) may be connected to the donor cell.

With respect to the knowledge in the UE, relay nodes may be classified into a transparent relay node or a non-transparent relay node. The transparent means a case where the UE is not aware of whether or not it communicates with the network via the relay node and the non-transparent means a case where the UE is aware of whether or not it is communicating with the network via the relay node.

With respect to the control of the relay node, the relay node may be classified into a relay node constituted by a part of the donor cell or a relay node controlling a cell by itself.

The relay node constituted by the part of the donor cell may have a relay node ID, but may not have a cell identity of its own relay node.

If at least part of the radio resource management (RRM) is controlled by the eNB to which the donor cell belongs, the relay node is referred to as the relay node constituted as the part of the donor cell even if parts of the RRM may be located in the relay node. Preferably, such a relay node may support a legacy UE. For example, smart repeaters, decode-and-forward relays, different types of L2 (second layer) relay nodes, and a Type 2 relay node correspond to the relay node.

In the case the relay node is in control of cells of its own, the relay node controls one or several cells and a unique physical-layer cell identity is provided in each of the cells controlled by the relay node. In addition, each of the cells controlled by the relay node may use the same RRM mechanism. In terms of the UE, there is no difference in accessing cells controlled by the relay and accessing cells controlled by a normal eNB. The cells controlled by the relay node may support the legacy UE. For example, a self-backhauling relay node, a L3 (third layer) relay node, a Type-1 relay node, and a Type-1a relay node correspond to such a relay node.

The Type-1 relay node controls a plurality of cells as an in-band relay node and each of the plurality of cells appears to a separate cell distinct from the donor cell in terms of the UE. The plurality of cells has respective physical cell IDS (defined in LTE-release 8) and the relay node may transmit its own synchronization channels, reference signals, and the like. In the case of single-cell operation, the UE may receive scheduling information and HARQ feedback directly from the relay node and transmit its control channels (scheduling request (SR), CQI, ACK/NACK, etc.) to the relay node. In addition, the Type-1 relay node appears as a legacy eNB (eNB operating according to an LTE release-8 system) to the legacy UE (UE operating according to an LTE release-8 system). That is, the Type-1 relay node has backward compatibility. Meanwhile, to the UEs operating according to the LTE-A system, the Type-1 relay node may be seen as a different eNB from the legacy eNB to provide performance enhancement.

The Type-1a relay node has the same features as the Type-1 relay node described above, except for operating as the out-band. The operation of the Type-1a relay node may be configured to minimize or eliminate the impact on the L1 (first layer) operation.

A Type-2 relay node is an in-band relay node and does not have a separate physical cell ID, thereby not forming a new cell. The Type-2 relay node is transparent to the legacy UE, and the legacy UE does not recognize the presence of the Type-2 relay node. The Type-2 relay node may transmit the PDSCH, but does not transmit at least the CRS and the PDCCH.

On the other hand, in order for the relay node to operate in-band, some resources in the time-frequency space needs to be reserved for the backhaul link and these resources may be set not to be used for the access link. This is called resource partitioning.

The general principle of resource partitioning at the relay node may be described as follows. A backhaul downlink and an access downlink may be multiplexed in a time division multiplex (TDM) scheme on one carrier frequency (i.e., only one of the backhaul downlink or access downlink is activated at a particular time). Similarly, the backhaul downlink and the access downlink may be multiplexed in the TDM scheme on one carrier frequency (i.e., only one of the backhaul downlink or access downlink is activated at a particular time).

Backhaul link multiplexing in the FDD may be performed in the downlink frequency band for the backhaul downlink transmission and in the uplink frequency band for the backhaul uplink transmission. Backhaul link multiplexing in the TDD may be performed in the downlink subframe of the eNB and the relay node, and the backhaul uplink transmission may be performed in the uplink subframe of the eNB and the relay node.

In the case of an in-band relay node, for example, when the backhaul downlink reception from the eNB and the access downlink transmission to the UE are simultaneously performed in the same frequency band, signal interference may occur at a receiving end of the relay node by a signal transmitted from a transmitting end of the relay node. That is, signal interference or RF jamming may occur in an RF front-end of the relay node. Similarly, when the backhaul uplink transmission to the eNB and the access uplink reception from the UE are simultaneously performed in the same frequency band, signal interference may occur.

Therefore, in order to transmit and receive signals simultaneously in the same frequency band in the relay node, if a sufficient separation between the reception signal and the transmission signal (for example, a transmission antenna and a reception antenna are installed on the ground/underground to be geographically spaced) is not provided, it is difficult to be implemented.

One solution to this problem of signal interference is to allow the relay node to operate so as not to transmit the signal to the UE while receiving a signal from the donor cell. That is, a gap may be generated in the transmission from the relay node to the UE, and during this gap, the UE (including the legacy UE) may be set not to expect any transmission from the relay node. This gap may be set by constituting a multicast broadcast single frequency network (MBSFN) subframe.

Figure 18:
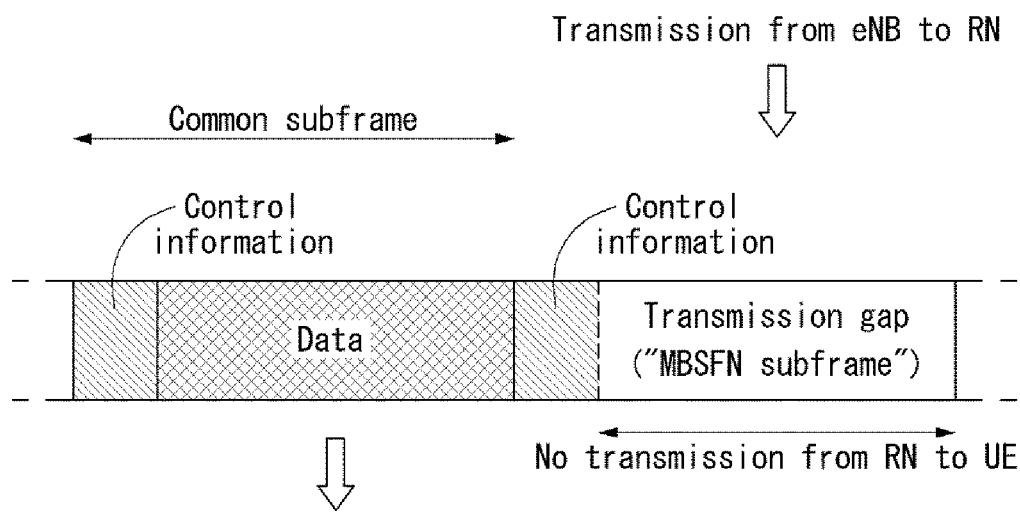
FIG. 18 illustrates relay node resource partitioning in a wireless communication system to which the present invention may be applied.

FIG. 18 shows relay node resource partitioning in a radio communication system to which the present invention can be applied.

In FIG. 18, a first subframe is a normal subframe in which downlink (i.e., access downlink) control signals and data are transmitted from the relay node to the UE, and a second subframe is an MBSFN subframe, in which a control signal is transmitted from the relay node to the UE in a control area of the downlink subframe, but no transmission is performed from the relay node to the UE in the remaining area of the downlink subframe. Here, in the case of the legacy UE, since it is expected to transmit the PDCCH in all the downlink subframes (that is, the relay node needs to support the PDCCH received by the legacy UEs in its own area in each subframe to perform a measurement function), it is necessary to transmit the PDCCH in all downlink subframes for correct operation of the legacy UE. Therefore, even on the subframe (second subframe) configured for downlink (i.e., backhaul downlink) transmission from the eNB to the relay node, in the first N (N=1, 2, or 3) OFDM symbol periods of the subframe, the relay node needs to perform access downlink transmission instead of receiving backhaul downlink. On the other hand, since the PDCCH is transmitted from the relay node to the UE in the control area of the second subframe, backward compatibility for the serving legacy UE can be provided in the relay node. In the remaining area of the second subframe, the relay node may receive the transmission from the eNB while no transmission is performed from the relay node to the UE. Therefore, through the resource division scheme, it is possible to prevent the access downlink transmission and the backhaul downlink reception from being performed simultaneously in the in-band relay node.

The second sub-frame using the MBSFN sub-frame will be described in detail. The control area of the second subframe may be referred to as a relay node non-hearing period. The relay node non-hearing period means a period in which the relay node transmits an access downlink signal without receiving a backhaul downlink signal. This period may be set to 1, 2 or 3 OFDM lengths as described above. In the relay node non-hearing period, the relay node may perform access downlink transmission to the UE and in the remaining area, the relay node may receive the backhaul downlink from the eNB. At this time, since the relay node may not perform transmission/reception simultaneously in the same frequency band, it takes time for the relay node to be switched from the transmission mode to the reception mode. Therefore, it is necessary to set a guard time (GT) so that the relay node switches the transmission/reception mode in the first partial period of the backhaul downlink reception area. Similarly, the guard time for switching the transmission/reception mode of the relay node may be set even when the relay node operates to receive the backhaul downlink from the eNB and transmit the access downlink to the UE. The length of this guard time may be given as a value of the time domain and may be given as, for example, k (k≥1) time sample values (Ts) or may be set to one or more OFDM symbol lengths. Alternatively, the guard time of the last part of the subframe may be defined or not set when the relay node backhaul downlink subframe is set consecutively or according to a predetermined subframe timing alignment relationship. In order to maintain the backward compatibility, the guard time may be defined only in the frequency domain set for the backhaul downlink subframe transmission (when the guard time is set in the access downlink interval, the legacy UE may not be supported). The relay node may receive the PDCCH and the PDSCH from the eNB in the backhaul downlink reception period except for the guard time. It may be represented by a relay-PDCCH (R-PDCCH) and a relay-PDSCH (R-PDSCH) in the meaning of a relay node dedicated physical channel.

Quasi Co-Located (QCL) Between Antenna Ports

Quasi co-located or quasi co-location (QC/QCL) may be defined as follows.

If two antenna ports has a QC/QCL relationship (or be in QC/QCL), the UE may assume that a large-scale property of the signal transmitted through one antenna port may be inferred from the signal transmitted to the other antenna port. Here, the large-scale property includes at least one of a delay spread, a Doppler spread, a frequency shift, average received power, and a received timing.

The large-scale property may also be defined as follows. If two antenna ports has a QC/QCL relationship (or be in QC/QCL), the UE may assume that a large-scale property of a channel transmitted by one symbol through one antenna port may be inferred from a radio channel transmitted by one symbol to the other antenna port. Here, the large-scale property includes at least one of a delay spread, a Doppler spread, a Doppler shift, average gain, and average delay.

That is, the fact that the two antenna ports has the QC/QCL relationship (or be in the QC/QCL) means that the large-scale property of the radio channel from one antenna port is the same as the large-scale property of the radio channel from the other antenna port. Considering the plurality of antenna ports through which the RSs are transmitted, if the antenna ports through which two different kinds of RSs are transmitted has the QCL relationship, the large-scale property of the radio channels from one type of antenna port may be replaced with the large-scale property of the radio channels from the other type of antenna port.

In this specification, the above QC/QCL related definitions are not distinguished. That is, the QC/QCL concept may follow one of the above definitions. Alternatively, in the other similar form, the QC/QCL concept definition may also be modified to a form in which it may be transmitted at the co-location between antenna ports established by the QC/QCL hypothesis (for example, the UE may be assumed as the antenna port transmitted at the same transmission point), and the spirit of the present invention includes such similar variations. In the present invention, QC/QCL related definitions are used in combination for convenience of description.

According to the concept of QC/QCL, the UE may not assume the same large-scale property between the radio channels from the corresponding antenna ports with respect to non-QC/QCL antenna ports. That is, in this case, the UE needs to perform independent processing for each set non-QC/QCL antenna port with respect to timing acquisition and tracking, frequency offset estimation and compensation, delay estimation, and Doppler estimation.

With respect to the antenna ports that can assume the QC/QCL, the UE has an advantage that can perform the following operations:

For delay spread and Doppler spreading, the UE may equally apply to a Wiener filter or the like used in the channel estimation for the radio channel from the other antennal port, the power-delay profile, delay spread and Doppler spectrum, and Doppler spread estimation results for the radio channel from any one antenna port.

For frequency shift and received timing, the UE may apply the same synchronization to the demodulation of another antenna port after performing time and frequency synchronization for any one antenna port.

For average received power, the UE may average reference signal received power (RSRP) measurement for two or more antenna ports.

For example, if a DMRS antenna port for downlink data channel demodulation is QC/QCL-ed with a CRS antenna port of a serving cell, the UE equally applies large-scale properties of the radio channels which have been estimated from its own CRS antenna ports in the channel estimation through the corresponding DMRS antenna port to improve DMRS-based downlink data channel reception performance.

Since the CRS is a reference signal broadcast at a relatively high density over every subframe and the entire band, estimated values of the large-scale properties can be acquired more stably from the CRS. On the other hand, since the DMRS is transmitted in a UE-specific manner for a specific scheduled RB, and a precoding matrix used for transmission by the eNB in a precoding resource block group (PRG) unit may be changed, an available channel received to the UE may vary in a PRG unit and thus even if a plurality of PRGs are scheduled, performance deterioration may occur when the DMRS is used for estimating the large-scale property of a radio channel over a wide band. The CSI-RS also has a transmission period of several to several tens of ms, and has a low density of one resource element per antenna port on average per resource block. Therefore, when the CSI-RS is also used for estimating the large-scale property, performance degradation may occur.

That is, the UE can utilize the detection/reception of the downlink reference signal, the channel estimation, the channel status reporting, and the like by assuming the QC/QCL between the antenna ports.

Buffer Status Reporting (BSR)

A buffer status reporting procedure may be used to provide the serving eNB with information about the amount of data available (or valid) for transmission in the UL buffers of the UE. RRC may control BSR reporting by configuring the two timers, and in this case, two timers may correspond to periodicBSR-Timer and retxBSR-Timer. Further, the RRC may control BSR reporting by optionally signaling a logical channel group (LCG) which allocates a logical channel for the LCG.

For the BSR procedure, the UE shall consider all radio bearers which are not suspended. In addition, in this case, the UE may also consider radio bearers which are suspended.

A BSR may be triggered if any of the following events occur:

UL data (for a logical channel which belongs to a LCG) becomes available for transmission in the RLC entity or in the PDCP entity, and either the data belongs to a logical channel with higher priority than the priorities of the logical channels which belong to any LCG and for which data is already available for transmission, or there is no data available for transmission for any of the logical channels which belong to a LCG, (i.e., in the case where the BSR corresponds/is referred below to as "Regular BSR")

UL resources are allocated and number of padding bits is equal to or larger than the size of a buffer status report MAC control element plus its subheader, (i.e., in the case where the BSR corresponds/is referred below to as "Padding BSR")

A retxBSR-Timer expires and the UE has data available for transmission for any of the logical channels which belong to a LCG, (i.e., in the case where the BSR corresponds/is referred below to as "Regular BSR")

A periodicBSR-Timer expires, (i.e., in the case where the BSR corresponds/is referred below to as "Periodic BSR")

In the case of Regular and Periodic BSR:
if more than one LCG has data available for transmission in the TTI where the BSR is transmitted: report Long BSR.
else report Short BSR.

In the case of Padding BSR:
1) if the number of padding bits is equal to or larger than the size of the Short BSR plus its subheader but smaller than the size of the Long BSR plus its subheader:
if more than one LCG has data available for transmission in the TTI where the BSR is transmitted: report truncated BSR of the LCG with the highest priority logical channel with data available for transmission.
Other cases: report Short BSR.
2) In addition, if the number of padding bits is equal to or larger than the size of the Long BSR plus its subheader: report Long BSR.

If the BSR procedure determines that at least one BSR has been triggered and not cancelled:
1) if the UE has UL resources allocated for new transmission for this TTI:
The UE instruct a multiplexing and assembly procedure to generate a BSR MAC control element.
The UE start or restart periodicBSR-Timer except when all the generated BSRs are truncated BSRs.
The UE start or restart retxBSR-Timer.
2) In addition, if a Regular BSR has been triggered:
if an UL grant is not configured or the Regular BSR was not triggered due to data becoming available for transmission for a logical channel (here, the logical channel SR masking (logicalChannelSR-Mask) is setup by higher layers: A Scheduling Request is triggered.

A MAC PDU contains at most one MAC BSR control element, even when multiple events triggering a BSR occur until a BSR can be transmitted in which case the regular BSR and the periodic BSR have precedence over the padding BSR. The UE may start or restart retxBSR-Timer upon indication of a grant for transmission of new data on any UL-SCH.

All triggered BSRs may be cancelled in case the UL grant(s) in this subframe can accommodate all pending data available for transmission but is not sufficient to additionally accommodate the BSR MAC control element plus its subheader. All triggered BSRs may be cancelled when a BSR is included in a MAC PDU for transmission.

The UE may transmit at most one Regular/Periodic BSR in a TTI. If the UE is requested to transmit multiple MAC PDUs in a TTI, the UE may include a padding BSR in any of the MAC PDUs which do not contain a Regular/Periodic BSR.

All BSRs transmitted in a TTI may always reflect the buffer status after all MAC PDUs constituted for this TTI are transmitted. Each LCG may report at the most one buffer status value per TTI and the value may be reported in all BSRs reporting buffer status for this LCG. A Padding BSR is not allowed to cancel a triggered Regular/Periodic BSR. A Padding BSR is triggered for a specific MAC PDU only and the trigger is cancelled when this MAC PDU has been constituted.

Device-to-Device (D2D) Communication

Figure 19:
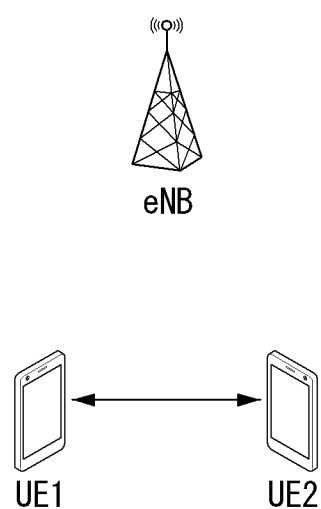
FIG. 19 is a diagram for describing elements for a device-to-device direct communication (D2D) technique.

FIG. 19 is a diagram for describing elements for a device-to-device direct communication (D2D) technique.

In FIG. 19, the UE refers to a user terminal, but when a network equipment such as an eNB transmits and receives signals according to a communication scheme with the UE, the corresponding network equipment may also be regarded as a kind of UE. Hereinafter, the UE 1 may operate to select a resource unit corresponding to a specific resource in a resource pool, which means a series of resources and to transmit a D2D signal using the resource unit. UE2, which is a receiving UE for the D2D signal, configures a resource pool in which the UE 1 may transmit a signal and detects the signal of the UE 1 in the pool. Here, in the resource pool, the eNB may notify the UE 1 when the UE 1 is in a connection range of the eNB and another UE may notify the UE 1 when the UE 1 is out of the connection range or may be determined by a predetermined resource. In general, the resource pool may include a plurality of resource units and each UE may select one or multiple resource units and use the selected resource units for D2D signal transmission thereof.

Figure 20:
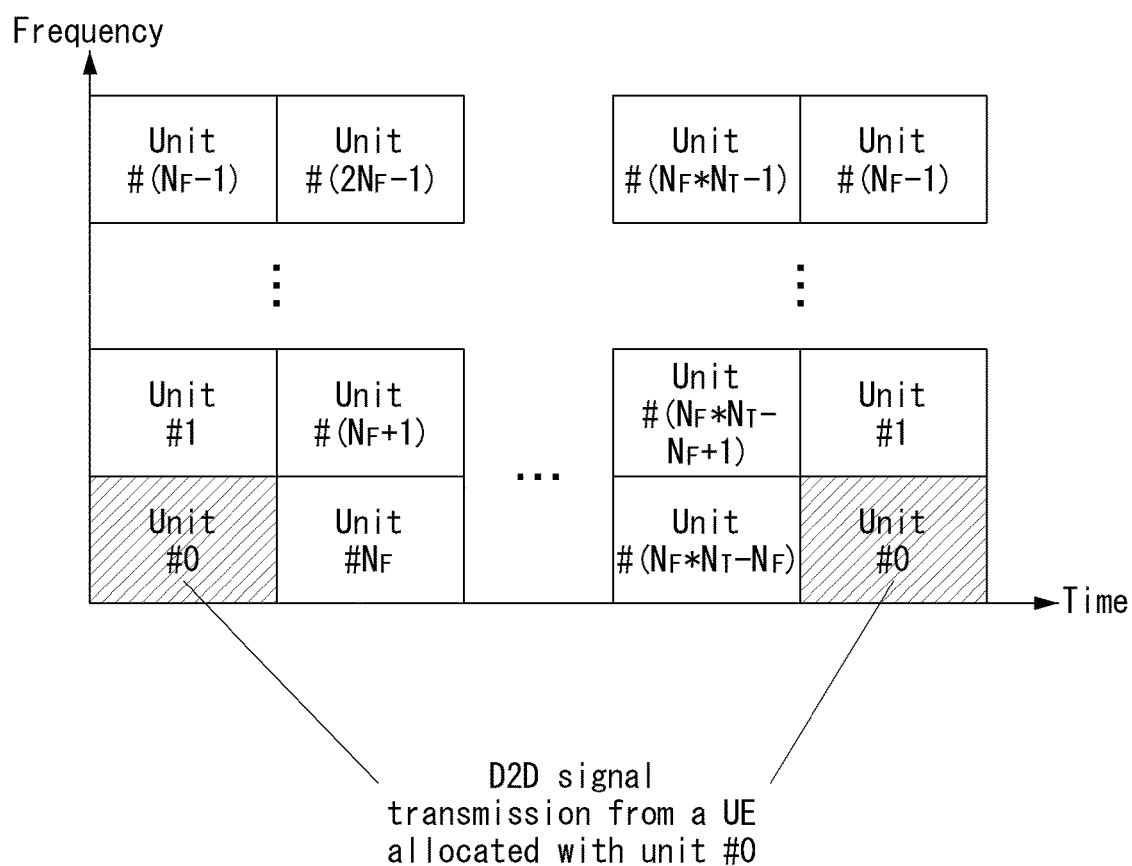
FIG. 20 is a diagram illustrating a configuration example of a resource unit.

FIG. 20 is a diagram illustrating a configuration example of a resource unit.

Referring to FIG. 20, an entire frequency resource is divided into N_F frequency resources and an entire time resource is divided into NT time resources, and as a result, a total of N_F*N_T resource units may be defined. Here, it may be expressed that the resource pool is repeated at intervals of N_T subframes. Characteristically, one resource unit may be repeated periodically as illustrated in FIG. 19. Alternatively, the index of the physical resource unit to which one logical resource unit is mapped may change in a predetermined pattern according to time in order to obtain a diversity effect in terms of the time or frequency. In such a resource unit structure, the resource pool may mean a set of resource units which the UE may use for transmitting the D2D signal.

The resource pools described above can be subdivided into several types. First, the resource pool may be divided according to contents of the D2D signal transmitted from each resource pool. As an example, the contents of the D2D signal may be divided as follows, and a separate resource pool may be configured for each content.

Scheduling assignment (SA): Signal including a location of a resource used for transmission of a D2D data channel, which is performed by each transmitting UE and information such as a modulation and coding scheme (MCS) for demodulation of other data channels or an MIMI transmission scheme and/or a time advance. The signal may be transmitted while being multiplexed with D2D data on the same resource unit. In the present specification, the SA resource pool may mean a pool of resources in which the SA is transmitted while being multiplexed with the D2D data and may be referred to as a D2D control channel.

D2D data channel: Resource pool which the transmitting UE uses for transmitting user data by using resources designated through the SA. When the user data is enabled to be multiplexed and transmitted together with the D2D data on the same resource unit, only a D2D data channel of a form excluding SA information may be transmitted in the resource pool for the D2D data channel. In other words, the resource element that is used to transmit the SA information on individual resource units in the SA resource pool may still be used to transmit the D2D data in the D2D data channel resource pool.

Discovery channel: Resource pool for a message that allows the transmitting UE to transmit information such as an ID thereof, etc. to allow neighboring UEs to the transmitting UE.

Contrary to the above case, even when the content of the D2D signal is the same, different resource pools may be used depending on a transmission/reception attribute of the D2D signal. For example, the same D2D data channel or a discovery message may be divided into different resource pools again according to a transmission timing determination scheme (e.g., whether the D2D signal is transmitted at the time of receiving a synchronous reference signal or is transmitted by applying a predetermined timing advance at the point in time) of the D2D signal or a resource allocation scheme (e.g., whether the eNB assigns the transmission resource of the individual signals to an individual transmitting UE or whether the individual transmitting UE autonomously selects an individual signaling resource in the pool), a signal format (e.g., the number of symbols which each D2D signal occupies in one subframe or the number of subframes used for transmitting one D2D signal), a signal strength from the eNB, a transmission power intensity of the D2D UE, and the like.

For convenience of description, it is assumed in the present specification that a mode in which the eNB directly indicates a transmission resource of a D2D transmitting UE in D2D communication will be referred to as/defined as Mode 1 and a method in which a transmission resource region is configured in advance or the eNB designates the transmission resource region and the UE directly selects the transmission resource will be referred to as/defined as Mode 2. In the case of D2D discovery, a case where the eNB directly indicates the resource will be referred to as/defined as Type 2 and a case where the UE directly selects the transmission resource in a resource region which is configured in advance or a resource region indicated by the eNB will be referred to as/defined as Type 1.

The above-mentioned D2D may be referred to as a sidelink and the SA may be referred to as a physical sidelink control channel (PSCCH), a D2D synchronization signal may be referred to as a sidelink synchronization signal (SSS), and a control channel that transmits the most basic information before the D2D communication, which is transmitted together with the SSS may be referred to as a physical sidelink broadcast channel (PSBCH) or a physical D2D synchronization channel (PD2DSCH) as another name. A signal for notifying that a specific UE is in the vicinity may include an ID of the specific UE and such a channel may be referred to as a physical sidelink discovery channel (PSDCH).

In D2D of Rel. 12, only the D2D communication UE transmits the PSBCH with the SSS, and therefore, the measurement of the SSS is performed using the DMRS of the PSBCH. An out-coverage UE measures the DMRS of the PSBCH and measures reference signal received power (RSRP) of the signal, etc. to determine whether the outer-coverage UE becomes a synchronization source.

Multi-Cell Multicast/Broadcast

The broadcast and multicast transmission in which the network transmits the same data to a plurality of UEs is performed in such a form that one cell transmits data using an RS and a format similar to existing unicast transmission or may also be performed in a form in which a plurality of cells transmits the same data together using a separate RS and format (in particular, RS and format configured such that the signals arriving from the plurality of cells are appropriately combined) different from the transmission. In this case, the former may be referred to as a single cell point-to-multipoint (SC-PTM) and the latter may be referred to as a multicast and broadcast in a single frequency network (MBSFN).

The multicast/broadcast transmission may be an effective transmission method for rapidly transmitting data generated at a specific location to a plurality of UEs near the corresponding location. As an example, a case may occur in which a vehicle corresponding to the UE informs surrounding vehicles of data (e.g., data indicating that the vehicle is out of order) containing a series of information related to an operation. Such data need not be delivered to a UE which is far from the UE which has generated the data by more than a predetermined distance, but needs to be transmitted to the UEs in a predetermined region within a predetermined distance at a time. Therefore, in this case, it may be preferable that cells positioned in a predetermined region from the UE that generates the data to UEs which are positioned within coverage thereof by broadcast/multicast the corresponding data.

However, as in the above example, since the UE such as the vehicle may move at a high speed, it may be difficult for each network to grasp a precise location of the UE and frequent handover of the UE may occur. Further, in order to avoid the frequent handover, a UE that does not need to communicate with the network may participate in transmission/reception of data (e.g., data for notifying a status of the vehicle) even in an RRC_Idle state and in this case, since there is no RPM report from the UE, it may be more difficult for the network to determine the accurate location of the UE. Therefore, it may be difficult for the network to accurately broadcast/multicast the data received from the transmitting UE to the UEs located near the transmitting UE with high reliability.

Meanwhile, there may be a case where a plurality of UEs belonging to a reception region of data transmitted from the transmitting UE are dispersed and positioned in a coverage area of the plurality of cells. In this case, the transmitting UE is positioned at a cell boundary or data (e.g., emergency data indicating occurrence of a collision accident) to be delivered to UEs in a very wide area is generated.

Figure 21:
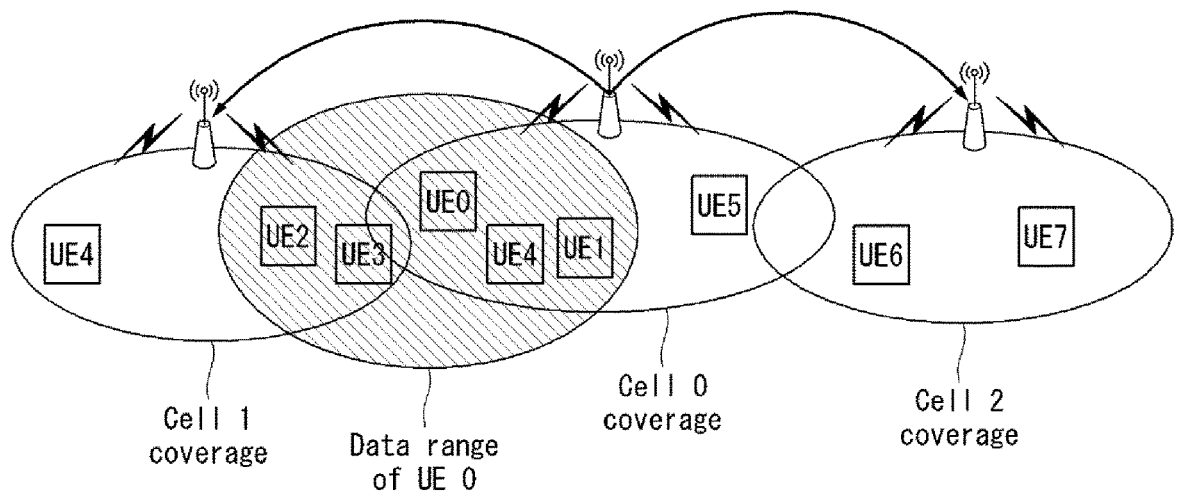
FIG. 21 is a diagram illustrating a broadcast/multicast transmission method of a plurality of cells according to an embodiment of the present invention.

FIG. 21 is a diagram illustrating a broadcast/multicast transmission method of a plurality of cells according to an embodiment of the present invention. In FIG. 21, it is assumed that data is generated in UE 0 belonging to an area of Cell 0 and that the UE 0 needs to transmit data to UEs (UE 1 to UE 4) around the UE 0.

Referring to FIG. 21, the UE 0 may first transmit the data to the eNB of cell 0, which is an eNB close to the UE 0. In this case, the network that receives the data knows a fact that the UE 0 is positioned within the area of cell 0, but may not know the accurate location of the UE 0. Accordingly, in this case, as a cell that broadcasting/multicast data of the UE 0, at least one cell having a sufficiently wide area such that the data of the UE 0 may include an area (e.g., D2D communication/V2X communication area) transmitted to other UEs. In the embodiment of FIG. 21, cell 0 of the UE 0 may perform broadcast/multicast transmission basically and cell 1 and cell 2 adjacent to cell 0 may participate in broadcast/multicast transmission of cell 0. Accordingly, all UEs within the data transmission/reception region of the UE 0 may receive a broadcast/multicast message in which the cell/eNB closest to (or belongs to) all UEs participates.

However, UEs (i.e., UE1 and UE4) that belong to the same cell as the UEs (i.e., UE1 and UE4) belonging to the data region of the UE 0 and do not belong to the data region of the UE 0 may exist and a cell that needs to participate in broadcast/multicast transmission of the cell 0 in spite of not having an area which overlaps with the data region of the UE 0, such as cell 2 to which UE 6 and UE 7 belong may exist.

In order to effectively perform the above-described operations, it is important to appropriately configure a cluster for transmitting data. Here, the term cluster may mean a set of at least one cell/eNB participating in multicast/broadcast transmission of specific data. Cells/eNBs belonging to one cluster may synchronize with each other and perform MBSFN transmission that transmits the same signal through the same resource or transmit the same data as a different signal through different resources in an SC-PTM form.

A situation may occurs, in which when the size of the cluster is too small, the cluster does not sufficiently include (or cover) the data region of the transmitting UE (e.g., UE 0). In particular, for data to be delivered with a high level of reliability, the data should be able to sufficiently include/cover UE(s) which belong(s) to a transmission/reception range of the corresponding data. On the contrary, when the size of the cluster is too large, network resources are wasted. Therefore, the cluster for transmitting data must be set to an appropriate size.

Figure 22:
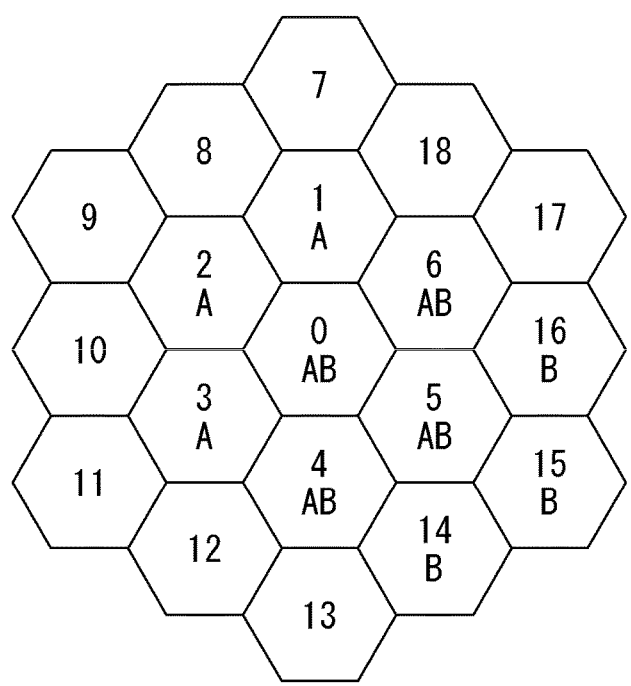
FIG. 22 is a diagram illustrating clusters configured according to an embodiment of the present invention.

FIG. 22 is a diagram illustrating clusters configured according to an embodiment of the present invention.

When respective clusters for transmitting data generated in all cells are separately configured in a situation in which data of one cell is transmitted in a cluster constituted by a plurality of cells, the clusters consequently overlap with each other and one cell belongs to a plurality of clusters. This means that even if the same cell is used, a cell in which a type of transmitted data, in particular, data transmitted by the cluster is generated may belong to a plurality of different clusters.

For example, as illustrated in FIG. 22, a cluster configured for data generated in one cell may be assumed as a set of the corresponding cell and 6 adjacent cells surrounding the cell. In this case, data generated in cell 0 is transmitted in a cluster constituted by cells 0, 1, 2, 3, 4, 5, and 6 which are cells indicated by A and data generated in cell 5 is transmitted in a cluster constituted by cells 5, 6, 0, 4, 14, 15, and 16 which are cells indicated by B. Therefore, cells 0, 4, 5 and 6 are included in the cluster transmitting the data of cell 0 and included in the cluster transmitting the data of cell 5 at the same time.

Meanwhile, an appropriate level of cluster size may be determined according to the size of each data region. Data transmitted in a relatively narrow data region is sufficient even though the size of the cluster is set to be small, while data transmitted in a relatively wide data region requires a large-sized cluster. This may mean that in spite of data which the same UE generates at the same location, the cluster needs to be differently configured according to the type of data and the data transmission/reception area.

Meanwhile, In the Rel-11 standard of the 3GPP standard, QCL type A or QCL type B is defined and in transmission mode (TM) 10, any one of both QCL types may be configured to the UE by RRC signaling Antenna Port QCL for PDSCH A UE in which transmission mode 8-10 for the serving cell is configured assumes that antenna port 7-14 of the serving cell is QCL with respect to delay spread, Doppler spread, Doppler shift, average gain, and average delay of the given subframe.

A UE in which transmission mode 1-9 for a serving cell is configured assumes that antenna ports 0-3, 5, and 7-22 of the serving cell are QCL with respect to Doppler shift, Doppler spread, average delay, and delay spread of a given subframe.

A UE in which transmission mode 10 for the serving cell is configured is constituted by two following QCL types with respect to the serving cell by a higher layer parameter qcl-Operation in order to decode the PDSCH according to a transmission scheme related to antenna ports 7-14.

Type A: In the UE, antenna ports 0-3 and 7-22 of the serving cell are QCL with respect to delay spread, Doppler spread, Doppler shift, and average delay.

Type B: In the UE, antenna port 15-22 corresponding to a CSI-RS resource configuration identified by a higher layer parameter qcl-CSI-RS-ConfigNZPId-r11 and antenna port 7-14 associated with the PDSCH are QCL with respect to Doppler shift, Doppler spread, average delay, and delay spread.

Vehicle-to-Vehicle/Infrastructure/Pedestrian (V2X) Communication

In the present invention, V2X communication related technology providing the following service types will be described. Three representative service types of V2X communication is exemplified as follows.

Vehicle-to-vehicle (V2V): Communication between vehicles

Vehicle-to-infrastructure (V2I): Communication between a vehicle and a roadside unit (RSU) which is implemented in an eNB or a stationary UE Vehicle-to-pedestrian (V2P): Communication between a vehicle and a device carried by an individual (pedestrian, cyclist, driver or passenger)

Figure 23:
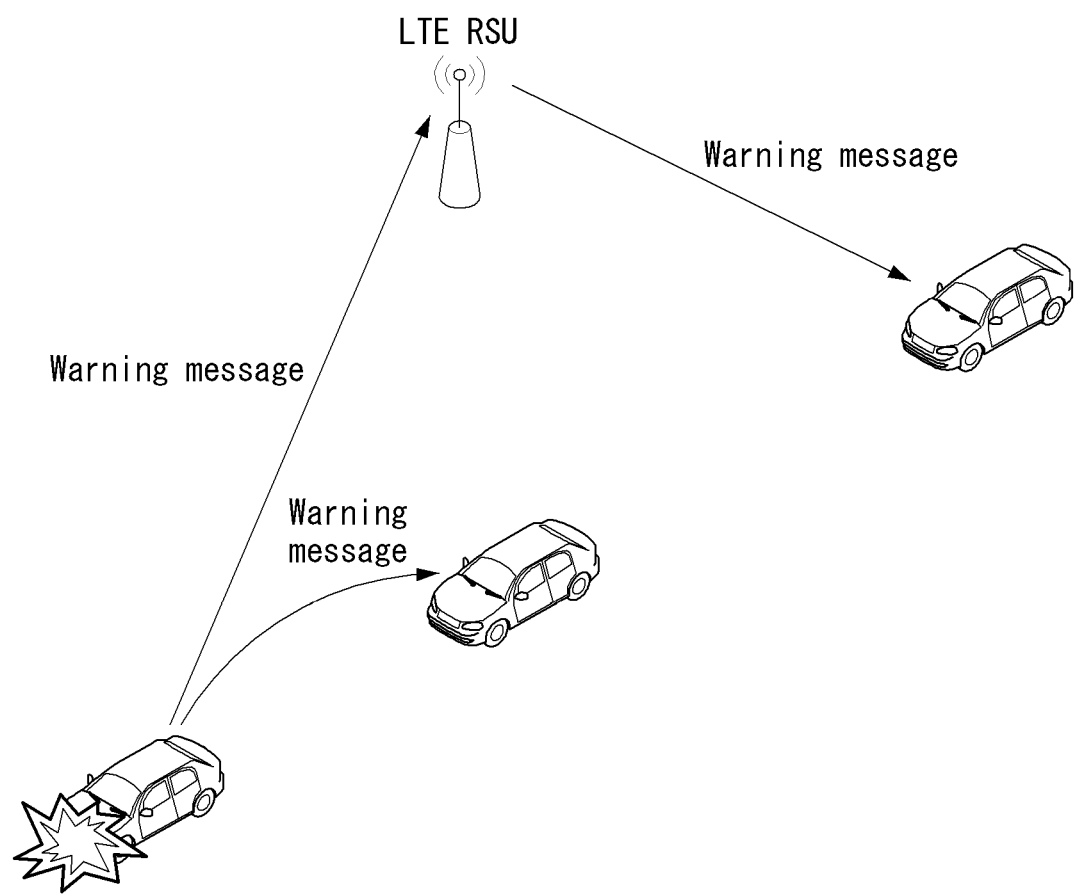
FIGS. 23 and 24 are diagrams illustrating V2X communication according to an embodiment of the present invention.
Figure 24:
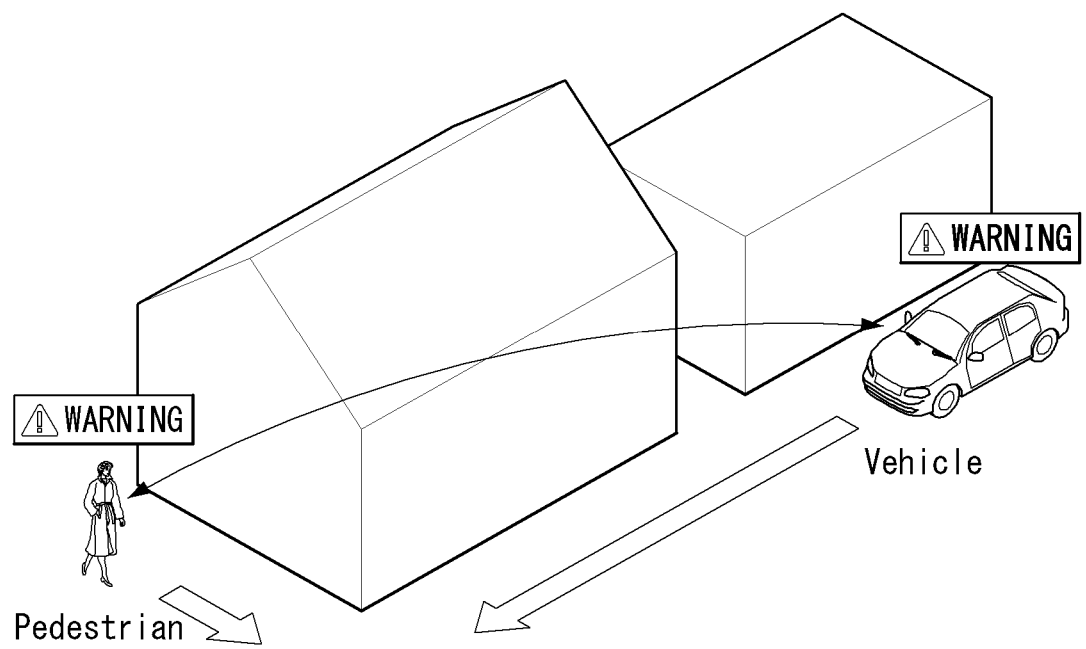

FIGS. 23 and 24 are diagrams illustrating V2X communication according to an embodiment of the present invention. More specifically, FIG. 23 illustrates V2V and V2I communication according to an embodiment of the present invention and FIG. 24 illustrates V2P communication according to an embodiment of the present invention.

The vehicle may perform V2X communication in order to transmit various information/messages. In particular, the V2X communication may be performed for a purpose of notifying a specific situation such as occurrence of an accident to the vicinity.

For example, referring to FIG. 23, when a vehicle accident occurs in at a specific point, an accident vehicle may transmit a warning message for notifying the occurrence of the accident to a nearby vehicle. In this case, the accident vehicle may directly transmit the warning message (e.g., V2X message, cooperative awareness message (CAM)/decentralized environmental notification message (DENM)) to the nearby vehicle and this may correspond to V2V communication. Alternatively, the accident vehicle may transmit the warning message to the nearby vehicle through an infrastructure network such as LTE RSU positioned nearby, etc. and this may correspond to V2I communication.

Alternatively, referring to FIG. 24, when a pedestrian and the vehicle will approach each other quickly and collide with each other, the vehicle may directly transmit a collision warning message to the UE of the pedestrian, which may correspond to V2P communication. In this case, a receiver that receives the message in the V2P communication is not limited to the UE of the pedestrian and may correspond to all UEs capable of performing the V2P communication such as a UE of a bicycle/vehicle driver or a passenger/rider which rides on a bicycle/vehicle.

The V2X communication may be performed for a specific purpose such as a case for more rapidly notifying an emergency and a scheme for efficiently operating the V2X communication is actively discussed.

Storing Soft Channel Bits

In FDD, TDD, and FDD-TDD, when the UE is configured one or more cells or SCG is configured, in a case where decoding a code block of the transport block for at least one of $K_{MIMO} \cdot \min(M_{DL\_HARQ}, M_{limit})$ transport blocks is unsuccessful, the UE may at least store received soft channel bits of ranges of $w_k, w_{k+1}, \ldots, w_{mod(k+n_{SB}-1, N_{cb})}$. Here, n_SB may be expressed by an equation of Equation 6 below.

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right)$$ [Equation 6]

In Equation 6, $w_k$ represents a cyclic buffer having a length of $K_w = 3K_\Pi$ for an r-th coded block and may be expressed as shown in Equation 7 below.

$w_k = v_k^{(0)}$ for $k = 0, \ldots, K_\Pi - 1$ $w_{K_\Pi + 2k} = v_k^{(1)}$ for $k = 0, \ldots, K_\Pi - 1$ $w_{K_\Pi + 2k + 1} = v_k^{(2)}$ for $k = 0, \ldots, K_\Pi - 1$ [Equation 7]

Further, in Equation 6, C may represent the number of code blocks, $N_{cb}$ may represent a soft buffer size for the r-th code block, and MDL_HARQ may represent the maximum number of DL HARQ procedures. Further, when the UE is configured to receive PDSCH transmission based on transmission mode 3, 4, 8, 9, or 10, $K_{MIMO}$ is set to '2' and if not, $K_{MIMO}$ is set to '1'. However, in the case of Bandwidth-reduced Low-complexity or Coverage Enhanced (BL/CE) UE, $K_{MIMO}$ is set to '1'. Further, $M_{limit}$ is set to '8'. When SCG is configured in the UE, $N_{cells}^{DL}$ represents the number of serving cells configured in both MCG and SCG and if not, $N_{cells}^{DL}$ represents the number of serving cells.

When the UE signals ue-CategoryDL-r12, $N'_{soft}$ so may be the total number of soft channel bits according to UE category indicated by a ue-CategoryDL-r12 parameter. Alternatively, when the UE signals ue-Category-v1170 and does not signal ue-CategoryDL-r12, $N'_{soft}$ may be the total number of soft channel bits according to the UE category indicated by ue-Category-v1170. Alternatively, when the UE does not signal ue-CategoryDL-r12 and ue-Category-v1170 and signals ue-Category-v1020, $N'_{soft}$ may be the total number of soft channel bits according to the UE category indicated by ue-Category-v1020. Otherwise, $N'_{soft}$ may be the total number of soft channel bits according to the UE category indicated by a ue-Category parameter.

In determining K, the UE may preferentially store the soft channel bits corresponding to a lower value of k. $w_k$ may correspond to the received soft channel bit. A range of, $w_k$, $w_{k+1}, \ldots, w_{mod(k+n_{SB}-1, N_{cb})}$ may include subsets which do not the received soft channel bits.

LTE System (LTE-U) in Unlicensed Band

As more and more communication devices demand a larger communication capacity, efficient utilization of a limited frequency band in a next wireless communication system becomes an increasingly important requirement. To this end, in a cellular communication system such as an LTE system, a scheme is considered, which utilizes an unlicensed band such as a 2.4 GHz used by the existing Wi-Fi system or an unlicensed band such as a 5 GHz which is newly attracted for traffic offloading.

Basically, since a wireless transmission/reception scheme through a contention between respective communication nodes is assumed in the unlicensed band, it is required that by performing channel sensing before each communication node transmits the signal, another communication node verifies not transmitting the signal. This is referred to as clear channel assessment (CCA) and the eNB or UE of the LTE system also needs to perform the CCA in order to transmit the signal in an unlicensed band (hereinafter referred to as 'LTE-U band'). Further, when the eNB or UE of the LTE system transmits the signal, other communication nodes such as Wi-Fi, etc. also perform the CCA to prevent interference. For example, in a Wi-Fi standard (801.11ac/ax/ay, etc.), a CCA threshold is specified as −62 dBm for a non-Wi-Fi signal and specified as −82 dBm for a Wi-Fi signal. This means that the STA or AP does not transmit the signal to prevent the interference when a signal other than Wi-Fi is received with power of −62 dBm or more, for example. In the Wi-Fi system, when the STA or AP performs the CCA for 4 μs or more and does not detect a signal of the CCA threshold, the STA or AP may transmit the signal.

Meanwhile, a name of the eNB described in the specification is used as a comprehensive term including remote radio head (RRH), eNB, transmission point (TP), reception point (RP), a relay, and the like. Hereinafter, for easy description, a proposal scheme will be described based on the 3GPP LTE system. However, a range of the system to which the proposal method is applied may be extended to other systems (e.g., UTRA, and the like) other than the 3GPP LTE system.

In the specification, a method of setting a resource period in a cell/carrier in which an available resource period is acquired/configured non-periodically or discontinuously as in the case of an unlicensed band in which exclusive use of a specific system is not guaranteed and an accompanied UE operation are proposed.

Figure 25:
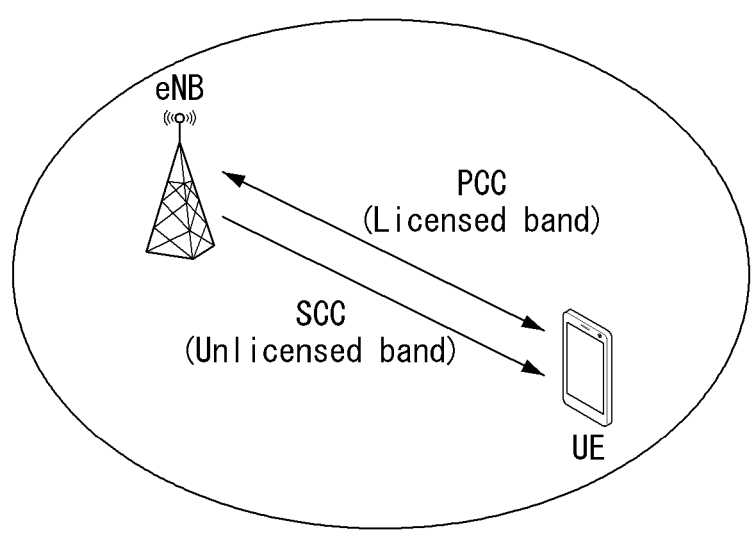
FIG. 25 is a diagram illustrating a wireless communication method between an eNB and a UE in a license band and an unlicensed band to which an embodiment of the present invention may be applied.

FIG. 25 is a diagram illustrating a wireless communication method between an eNB and a UE in a license band and an unlicensed band to which an embodiment of the present invention may be applied.

Referring to FIG. 25, the eNB may transmit the signal to the UE or the UE may transmit the signal to the eNB in a carrier aggregation situation of LTE-A Band which is the license band and the unlicensed band/LTE-u band. Hereinafter, for convenience of description of the proposed scheme, it is assumed that the UE is configured to perform wireless communication through two component carriers (CC) in each of the license band and the unlicensed band. In this case, for example, the carrier in the license band may correspond to a primary CC (may be referred to as PCC or PCell) and the carrier in the unlicensed band may correspond to a secondary CC (may be referred to as SCC or SCell). However, the proposed schemes of the present specification may be extensively applied to a situation where a plurality of license bands and a plurality of unlicensed bands are used as a carrier aggregation technique and also applicable to a case where signal transmission/reception between the eNB and the UE is performed only in the unlicensed band. In addition, the proposed schemes of the present specification may be extensively applied not only to the 3GPP LTE system but also to systems having other characteristics.

In order for the eNB and the UE to perform communication in the LTE-U band, the corresponding band is unlicensed spectrum. Therefore, the corresponding band should be able to be first occupied/secured through a contention with another communication (e.g., Wi-Fi) system which is irrespective of LTE. Hereinafter, for convenience, the occupied/secured time period for communication in the LTE-U band will be referred to as a reserved resource period (RRP). There may be various methods to secure the RRP as follows.

Representatively, a method is available, which transmits a specific reservation signal so that another communication system devices including Wi-Fi, etc. recognize that the radio channel is busy or continuously the RS and the data signal so that a signal of a specific power level or higher is continuously transmitted during the RRP. When the eNB predetermines the RRP time period to intend to occupy the LTE-U band as described above, the eNB informs the UE of the RRP time period in advance to allow the UE to maintain a communication transmission/reception link during the RRP time period. A scheme that informs the UE of information on the RRP time period may include a scheme that transfers the RRP time period information through another CC (e.g., the LTE-A band) connected in the carrier aggregation form.

As another example of an unlicensed band operation in which the eNB operates by a contention based random access scheme, the eNB may first perform carrier sensing (CS) before data transmission/reception. It is checked whether a current channel status of the SCell is busy or idle and when it is determined that the current channel status is idle, the eNB may transmit a scheduling grant through (E)PDCCH of PCell (i.e., cross carrier scheduling (CCS)) or PDCCH of SCell and attempt data transmission/reception. In this case, as an example, an RRP may be configured, which is constituted by M consecutive subframes (SFs). Here, the eNB may inform the UE of an M value and uses of M SFs through a higher layer signaling (using PCell) or physical control/data channel in advance. A starting point of the RRP may be set periodically (or semi-statically) by the higher layer signaling. Alternatively, when it is desired to set the RRP starting point to SF #n, the starting point of the RRP may be designated through the physical layer signaling in SF #n or SF #(n−k).

Figure 26:
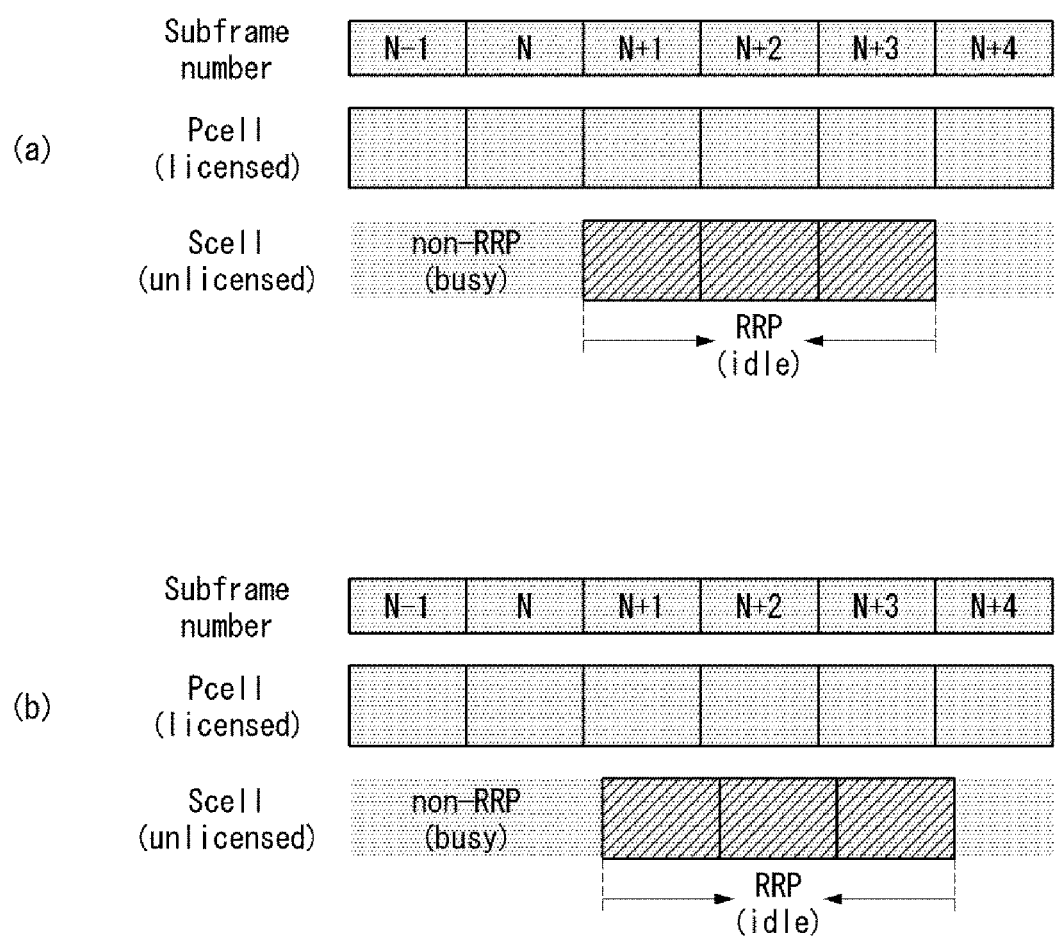
FIG. 26 is a diagram illustrating a subframe configuring RRP to which the present invention may be applied.

FIG. 26 is a diagram illustrating a subframe configuring RRP to which the present invention may be applied. In particular, FIG. 26(a) is a diagram illustrating an aligned-RRP to which the present invention may be applied and FIG. 26(b) is a diagram illustrating a floating-RRP to which the present invention may be applied.

The "aligned-RRP" configured in a form in which a subframe boundary and a subframe number/index are aligned with Pcell as illustrated in FIG. 26(a) and the "floating-RRP" configured in which the subframe boundary and the subframe number/index are aligned with Pcell as illustrated in FIG. 26(b) may be supported. Here, when the subframe boundaries between cells are aligned with each other, it may be meant that an interval between subframe boundaries of two different cells is equal to or less than a specific time (for example, CP length or X μs, X≥0). Further, Pcell may mean a specific cell (e.g., cell (i.e., Lcell) on the license band (i.e., L-band)) referred to determine a subframe (and/or symbol) boundary of a cell (i.e., Ucell) on the unlicensed band (i.e., U-band) in terms of time (and/or frequency) synchronization.

New Radio Access Technology (RAT) for Next-Generation System

As more and more communication devices require a larger communication capacity, there is a need for enhanced mobile broadband communication as compared with the existing radio access technology. Massive machine type communications (MTCs), which provide various services anytime and anywhere by connecting many devices and objects, are one of the major issues to be considered in the next generation communication. In addition, in next-generation communication, a communication system design considering a service/UE sensitive to reliability and latency is being discussed. The introduction of next generation radio access technology considering enhanced mobile broadband communication, massive MTC, ultra-reliable and low latency communication (URLLC) is discussed, and in the present invention, the technology is called new RAT for convenience.

[Self-Contained Subframe Structure]

Figure 27:
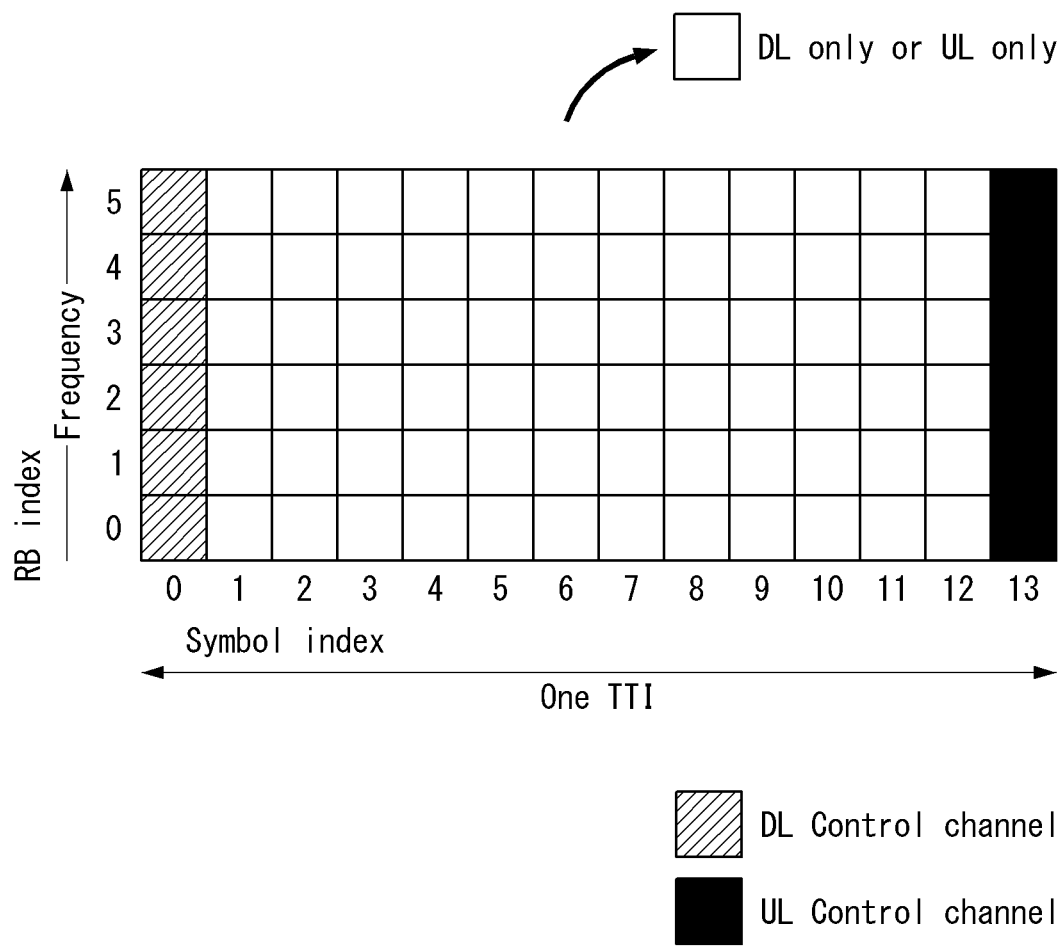
FIG. 27 illustrates a self-contained subframe structure to which the present invention may be applied.

FIG. 27 illustrates a self-contained subframe structure to which the present invention may be applied.

In order to minimize the latency of data transmission in a TDD system, the fifth generation new RAT considers a self-contained subframe structure as shown in FIG. 27. In FIG. 27, a hatched area indicates a downlink control region, and a black part indicates an uplink control region. Further, in FIG. 27, an unmarked area may also be used for downlink data transmission or for uplink data transmission. Such a structure is characterized in that DL transmission and UL transmission may be sequentially performed in one subframe, and DL data may be transmitted in the subframe, and UL ACK/NACK may be received. As a result, it takes less time to retransmit data when a data transmission error occurs, thereby minimizing the latency of final data transmission.

As an example of the self-contained subframe structure that may be configured/set in a system operating on New RAT, at least four following subframe types may be considered. Hereinafter, intervals which exist in each subframe type are listed in a chronological order.

1) DL control interval+DL data interval+guard period (GP)+UL control interval
2) DL control interval+DL data interval
3) DL control interval++GP+UL data interval+UL control interval
4) DL control interval+GP+UL data interval In such a self-contained subframe structure, there is a need for a time gap between the eNB and the UE for the conversion process from the transmission mode to the reception mode or from the reception mode to the transmission mode. To this end, some OFDM symbols at the time of switching from DL to UL in the subframe structure may be set to GP, and such a subframe type may be referred to as a 'self-contained SF'.

[Analog Beamforming]

In the millimeter wave (mmW), the wavelength is shortened, so that a plurality of antennas may be installed in the same area. That is, a total of 100 antenna elements can be installed in a 2-dimension array at a 0.5 lambda (wavelength) interval on a panel of 5 by 5 cm with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem in that effectiveness is deteriorated in terms of costs. Therefore, a method of mapping a plurality of antenna elements to one TXRU and adjusting a direction of a beam using an analog phase shifter is considered. Such an analog beamforming method has a disadvantage in that frequency selective beamforming cannot be performed by making only one beam direction in all bands.

A hybrid BF with B TXRUs, which is an intermediate form of digital BF and analog BF, and fewer than Q antenna elements, may be considered. In this case, although there is a difference depending on a connection method of B TXRUs and Q antenna elements, the number of directions of the beams that can be transmitted at the same time is limited to B or less.

Method for Reducing and Configuring and Indicating Channel Information for Communication System with High Reliability and Low Latency Hereinafter, a communication technique for a next-generation communication system (e.g., autonomous vehicle control/communication systems) that requires high reliability and low latency, such as V2X, etc., will be discussed.

When the conventional communication system aims at maintaining a block error rate (BLER) at a level of $10^{-2}$, the next generation communication system aims at maintaining BLER<<$10^{-2}$ (for example, targeting BLER=$10^{-5}$) level and requires very high reliability. Representatively, the above case may correspond to a case where the V2X service evolves into an autonomous driving service, a case where a medical service is provided through the device, or the like. Such a service requires the very low latency and reliable successful transmission/reception needs to be completed within a very short time.

Hereinafter, the present invention will be described mainly on the basis of a downlink in which a transmitting end is the eNB and a receiving end is the UE, but the present invention may be applied even to an uplink in which the UE transmits data to the eNB or device-to-device communication in which the UE directly transmits data to another UE.

First, in order to satisfy the high reliability, application of a plurality of repetitive transmissions (for example, repeated transmission and using repetition coding) or robust transmission using a high coding rate may be considered. Here, a plurality of repetitive transmissions may be performed in such a form that ACK/NACK feedback is received from the receiver for each transmission, and the number of repetitive transmissions is determined based on the ACK/NACK feedback. The methods may be transmission methods in which time-domain transmission resources are consumed until successful reception is completed. That is, in order to achieve a lower target BLER (e.g., $10^{-5}$) in next generation communications as compared to a transmission method for satisfying a conventional relatively high target BLER (for example, $10^{-2}$), the transmission resources of the time axis should be consumed relatively more. However, this has a disadvantage in that performance is significantly deteriorated in terms of latency since a successful reception completion time point results in a further delay than in the related art.

In particular, in a communication system of a form in which the transmitter first transmits a specific control signal for scheduling data transmission to a specific control channel (e.g., PDCCH) and when the receiver detects the specific control signal, the receiver receives data of a resource region indicated by the specific control signal like the LTE system, detection/reception performance of the specific control signal (for scheduling data transmission) should be preferably sufficiently reliable (e.g., should maintain a more stable level than the reception performance of the data).

However, in a communication scheme requiring high reliability such as URLLC (or critical communication), eV2X, etc., the target BLER of the data may require a very low error rate such as $10^{-5}$ level, etc. and it may be very difficult to design a control channel having a lower error rate (e.g., $10^{-6}$, etc.).

For example, it is assumed that the control channel is designed by reusing a conventional specific scheduling DCI. In this case, since a payload size of the convention DCI is designed as a size of 30 bits to 50 bits, a very low coding rate is required for achieving the transmission having the low error rate with respect to the payload size and serious efficiency deterioration is caused in considering control channel overhead for the very low coding rate.

In order to solve such a problem, the present specification proposes a scheme that dynamically signals only a scheduling grant of an activation/deactivation (ON/OFF, grant/non-grant, valid/invalid, and application/non-application) level (and/or a level including only an information indicator related with allocation/transmission of a minor number of resources) for a specific control configuration through a very simplified control channel indicator/information (several-bits level). In addition, proposed is a scheme in which detailed configuration information (e.g., at least some of DCI contents in the conventional LTE system) required for data reception is pre-configured in a form of candidate parameter sets through a higher layer signal (e.g., RRC signaling) in advance. The schemes may be configured to be limited to specific ultra-reliable and/or low-latency services (for example, eV2X service), but are not limited thereto.

It may be analyzed that the simplified DCI signaling is used for indicating which set among the pre-configured candidate parameter sets is to be applied. Such a simplified DCI will be referred to as 'minimized DCI (mDCI)' for convenience in the present specification. However, a name of the simplified DCI proposed by the present invention is not limited to mDCI and may be defined as a new DCI format or may be referred to as a new name.

The payload size of the mDCI may be defined/set to 1 bit at the smallest. In this case, the mDCI may indicate only whether a specific configuration is activated/deactivated (ON/OFF) (e.g., whether there is a scheduling grant at a current point of time). Further, the payload size of the mDCI may be defined/set to N bits (e.g., N is a natural number of 2 or more) and in this case, the mDCI may dynamically indicate control information/configuration through an N-bits payload. For example, $2^N$ state-specific control channel information may be pre-configured by the higher layer configuration (through RRC-signaling, etc.) and the N-bits payload may dynamically indicate which state of control channel information (e.g., candidate parameter set) the UE should follow.

This may be interpreted that in a situation where a plurality of semi-persistent scheduling (SPS) configurations having different "resource block (RB) location/size, period, MCS" to be described below, the mDCI may be operated/applied in a form to indicate which SPS configuration among the SPS configurations is valid at a current point of time (e.g., subframe) (e.g., by the mDCI). Further, this may be operated in such a manner that different parameter sets are mapped according to the subframe (SF) set. For example, mDCI transmitted in SF #n and mDCI transmitted in SF #n+1 may be different in terms of the parameter set (e.g., resource block (RB) location/size, period, and MCS) indicating activation (ON).

A control information indication scheme through the mDCI has the following differences from the existing semi-persistent scheduling (SPS) as described above.

First, in the case of the existing SPS, the period in which the DCI is transmitted is preset through the higher layer signaling with a specific value (for example, 5 ms/10 ms grid) and when the SPS starts, a DCI (e.g., a DCI masked with SPS C-RNTI) for the SPS is transmitted to the UE at a specific period. In this case, the transmitted DCI for the SPS may still include other parameters (e.g., parameters to be described below in relation with pre-configurable higher layer parameter set(s) to be described below) except for the period at which the DCI is transmitted. This means that remaining parameters other than a transmission period of the DCI may still be dynamically signaled/indicated by the eNB with periodicity. As a result, the payload size of the DCI used for the SPS cannot but be set to be larger than the several-bits level and the payload is still unsuitable for application of communication with high reliability and minimized latency. Further, when a parameter configuration through the DCI is not changed, there is overhead in which the same DCI should be unnecessarily periodically transmitted.

Contrary to this, in the case of the present invention, parameters which may be configured through the higher layer signaling are pre-configured through the higher layer signaling as many as possible and the mDCI serves only to indicate only which parameter set(s) is to be applied at the current point of time. As a result, the mDCI may be transmitted in one shot only when there is a change in whether the SPS is activated or deactivated without periodically the specific parameter set(s) and is configured to a level to indicate only whether the SPS is activated or deactivated or indicate a specific state, and as a result, the mDCI is suitable for application of communication which has high reliability and minimized latency due to a very small payload size.

Hereinafter, an example of the pre-configurable higher layer parameter is determined/indicated to be activated or deactivated according to the mDCI according to an embodiment of the present invention will be described.

[Pre-Configurable Higher Layer Parameter Set(s)]

Hereinafter, at least one of the information/configuration/parameters to be described below may be defined/configured in advance in the UE as at least one higher layer parameter set (through the higher layer signaling) and it may be dynamically indicated whether at least one of the information/configuration/parameters are activated/applied through the mDCI. In this case, at least one of parameters to be described below may be separated and signaled in one separate scheme. For example, at least one of parameters to be described below may be signaled in association with specific RNTI or may interlock for each subframe set (e.g., separated into non-MBSFN SF or MBSFN SF, odd SF, or even SF). In the case of the latter case, the UE that receives the mDCI through the specific subframe may activate/apply a parameter(s) associated with/corresponding to the subframe. In addition/alternatively, parameter(s) associated for each mDCI format may be defined/configured and there may be parameter(s) associated for each specific control channel (e.g., PDCCH or Enhanced Physical Downlink Control Channel (EPDCCH)) and/or for each search space (e.g., for each common/UE-specific search space (SS)).

1. Carrier index related information/parameters/configurations (e.g. carrier indicator field (CIF))

Carrier index related information may be utilized for cross-carrier scheduling and is indicated in such a form in which the carrier index related information is pre-configured for each parameter set (through the higher layer signaling, etc) and the specific parameter set is activated by the mDCI rather than the existing form in which the parameter set is dynamically indicated through individual CIF fields within the DCI. One or a plurality of parameter sets may be configured. Therefore, a separate payload space for the carrier index related information is not required in the mDCI, and as a result, and the size of the mDCI may be reduced.

2. Resource allocation information/parameter/configuration (e.g., a resource allocation header, a resource allocation field, a distributed virtual resource block (DVRB)/localized virtual resource block (LVRB), multi-clustered RA information (for UL), a UL index, and/or a downlink assignment index (DAI) (for UL)

The resource allocation information may be indicated in a form that the resource allocation information is pre-configured for each parameter set (through the higher layer signaling, etc.) and activated by the mDCI unlike being indicated through the DCI in the related art. Therefore, a separate payload space for the resource allocation information is not required in the mDCI, and as a result, and the size of the mDCI may be reduced. When two or more parameter sets for the resource allocation information may be configured, the resource allocation information may be dynamically indicated in such a form in which two or more independent parameter sets are configured and a specific parameter set is selected/activated through the mDCI. Such an operation is one of differences differentiated from the existing SPS scheme.

3. DM-RS related information/parameter/configuration (e.g., antenna port configuration, scrambling ID, the number of layers, and/or OCC length)

The DM-RS related information may be indicated in a form that the DM-RS related information is pre-configured for each parameter set (through the higher layer signaling, etc.) and activated by the mDCI unlike being indicated in the DCI format 2C/2D through the DCI in the related art. Therefore, a separate payload space for the DM-RS related information is not required in the mDCI, and as a result, and the size of the mDCI may be reduced. When two or more parameter sets for the DM-RS related information may be configured, the DM-RS related information may be dynamically indicated in such a form in which two or more independent parameter sets are configured and a specific parameter set is selected/activated through the mDCI.

4. MCS, redundancy version (RV), and/or new data indicator (NDI) related information/configuration/parameter The MCS, redundancy version (RV), and/or new data indicator (NDI) related information may be indicated in a form that the MCS, redundancy version (RV), and/or new data indicator (NDI) related information is pre-configured for each parameter set (through the higher layer signaling, etc.) and activated by the mDCI unlike being dynamically indicated in the related art. Therefore, a separate payload space for the MCS, redundancy version RV, and/or NDI related information is not required in the mDCI, and as a result, and the size of the mDCI may be reduced. When two or more parameter sets for the MCS, redundancy version RV, and/or NDI related information may be configured, the MCS, redundancy version RV, and/or NDI related information may be dynamically indicated in such a form in which two or more independent parameter sets are configured and a specific parameter set is selected/activated through the mDCI.

In the case of the MCS, the MCS may be dynamically indicated within a predetermined MCS candidate pre-configured according to the mDCI payload size, but in particular, instead of abandoning a full-flexible MCS indication in an eV2X use case, an indication scheme of a form in which specific MCS is activated/deactivated by the mDCI may be effective as proposed in the present invention. However, the present invention is not limited thereto and an MCS level may be dynamically indicated in a conservative form or may be indicated according to an MCS adaptation scheme using fDCI to be described below.

5. HARQ related information/configuration/parameter

The HARQ related information may be indicated in a form in which the HARQ related information is pre-configured for each parameter set (through the higher layer signaling, etc.) and activated by the mDCI unlike being dynamically indicated in the related art. Therefore, a separate payload space for the HARQ related information is not required in the mDCI, and as a result, and the size of the mDCI may be reduced. When two or more parameter sets for the HARQ related information may be configured, the resource allocation information may be dynamically indicated in such a form in which two or more independent HARQ index related parameter sets are configured and a specific parameter set is selected/activated through the mDCI.

In the case of the HARQ ID, the HARQ ID may be dynamically indicated within a predetermined HARQ ID candidate pre-configured according to the mDCI payload size, but in particular, instead of abandoning a full-flexible HARQ ID indication in the eV2X use case, an indication scheme of a form in which a specific HARQ ID is activated/deactivated by the mDCI may be effective as proposed in the present invention.

6. Transmit power control (TPC) related information/configuration/parameter

The TPC related information may be indicated in a form in which the TPC related information is pre-configured for each parameter set (through the higher layer signaling, etc.) and activated by the mDCI unlike being dynamically indicated in the related art. Therefore, a separate payload space for the TPC related information is not required in the mDCI, and as a result, and the size of the mDCI may be reduced. When two or more parameter sets for the TPC related information may be configured, the resource allocation information may be dynamically indicated in such a form in which two or more independent TPC related parameter sets are configured and a specific parameter set is selected/activated through the mDCI.

However, since the TPC is used for the purpose of adjusting the uplink power, the TPC may be separated and dynamically indicated by a separate signaling scheme.

7. PDSCH rate matching and quasi-colocation indicator (PQI) related information/configuration/parameter (e.g., QCL information of RS and/or PDSCH RE mapping related information The PQI related information may be indicated in a form that the PQI related information is pre-configured for each parameter set (through the higher layer signaling, etc.) and activated by the mDCI unlike being indicated through the DCI format 2D in the related art. Therefore, a separate payload space for the PQI related information is not required in the mDCI, and as a result, and the size of the mDCI may be reduced. When two or more parameter sets for the PQI related information may be configured, the resource allocation information may be dynamically indicated in such a form in which two or more independent PQI related parameter sets are configured and a specific parameter set is selected/activated through the mDCI.

8. Various Information/Configurations/Parameters Required for V2X Operation 8-1. Cluster Information Information regarding which cluster a scheduled multicast/broadcast signal belongs to (in the case of a parameter set related configuration for a case where a signal is scheduled in a multicast/broadcast form) may be indicated in such a form in which the scheduled multicast/broadcast signal is pre-configured for each parameter set (through the higher layer signaling, etc.) and activated by the mDCI. For example, the parameter set may be configured in a form of ID/index set information of cell/TP which belongs to the corresponding cluster or when there is an identifier in the corresponding cluster itself (for example, an ID for identifying the MBSFN area in the case of an MBMS related transmission form), the parameter set may be configured in a form of identifier information of the cluster and/or the parameter set may be configured in a form of a specific identifier (for example, may be a temporary mobile group identity (TMGI) for identifying a specific service of a specific area) for distinguishing a packet/(service) type of data of the corresponding multicast/broadcast.

Such information may not only be activated by the mDCI, but may also be dynamically indicated directly, e.g., via the PDCCH/EPDCCH, at least in part, according to an embodiment. For example, such information may be included in a specific DCI as an additional field or may be included as contents of fDCI to be described below.

8-2. Location of reference signal (to be used for demodulating corresponding data), that is, location in time/frequency domain where reference signal (mapped) RE exists 8-3. Seed value for generating reference signal sequence 8-4. Length of cyclic prefix 8-5. Information (e.g., information indicating to which location another signal is mapped instead of data such as CSI-RS to indicate that data is not mapped to corresponding location) regarding location to which data RE is mapped 8-6. Service ID (or local channel ID to which data is mapped) of multicast/broadcast data The UE may determine whether scheduled data is data interested thereby based on the ID. When one UE receives a plurality of multicast/broadcast services, the corresponding UE may determine what a service corresponding to the received data is through the ID.

9. Precoding related information/configuration/parameter (e.g., Transmit Precoding Matrix Indication (TPMI) (for DL), precoding information (for UL), etc.)

The precoding related information may be indicated in a form in which the HARQ related information is pre-configured for each parameter set (through the higher layer signaling, etc.) and activated by the mDCI unlike being dynamically indicated through the DCI in the related art. Therefore, a separate payload space for the precoding related information is not required in the mDCI, and as a result, and the size of the mDCI may be reduced. When two or more parameter sets for the TPC related information may be configured, the precoding related information may be dynamically indicated in such a form in which two or more independent precoding related parameter sets are configured and a specific parameter set is selected/activated through the mDCI.

10. (Uplink) demodulation RS related configuration information/configuration/parameter (e.g., cyclic shift ($n^{(2)}_{DMRS}$), OCC, and/or comb)

The demodulation RS related configuration information may be indicated in a form that the demodulation RS related configuration information is pre-configured for each parameter set (through the higher layer signaling, etc.) and activated by the mDCI unlike being indicated through DCI formats 0 and 4 in the related art. Therefore, a separate payload space for the precoding related information is not required in the mDCI, and as a result, and the size of the mDCI may be reduced. When two or more parameter sets for the demodulation RS related configuration information may be configured, the demodulation RS related configuration information may be dynamically indicated in such a form in which two or more independent precoding related parameter sets are configured and a specific parameter set is selected/activated through the mDCI.

11. Aperiodic CSI request and/or aperiodic SRS request related information/configuration/parameter The aperiodic CSI request and/or aperiodic SRS request related information may be indicated in a form that the aperiodic CSI request and/or aperiodic SRS request related information is pre-configured for each parameter set (through the higher layer signaling, etc.) and activated by the mDCI unlike being dynamically indicated in the related art. Therefore, a separate payload space for the precoding related information is not required in the mDCI, and as a result, and the size of the mDCI may be reduced. When two or more parameter sets for the precoding related information may be configured, the aperiodic CSI request and/or aperiodic SRS request related information may be dynamically indicated in such a form in which two or more independent aperiodic CSI request and/or aperiodic SRS request related parameter sets are configured and a specific parameter set is selected/activated through the mDCI.

However, the present invention is not limited thereto and the aperiodic CSI request and/or aperiodic SRS request related information may be separated and signaled so as to be indicated in a separate scheme.

Hereinafter, an embodiment for each payload size of the mDCI will be described below.

[Payload Size of mDCI]

As an embodiment, the payload size of the mDCI may be defined/set only to 1 bit. In this case, the mDCI may indicate activation/deactivation (or application/non-application or ON/OFF) of (one) specific parameter set. That is, the mDCI may perform a function of notifying only whether the scheduling for the parameter set pre-configured at the current time is granted. That is, a recipient may receive an indication for whether the corresponding parameter set is scheduled/activated at the current time by the mDCI while receiving configuration of at least one of the pre-configurable higher layer information/configurations/parameters as the single higher layer parameter. When the corresponding single parameter set is activated by the received mDCI, the recipient may receive a data packet based on downlink control information indicated the single activated parameter set.

Alternatively, when the recipient does not receive the mDCI itself, the recipient may recognize that there is no scheduling (grant) for the pre-configured higher layer parameter set. On the contrary, the recipient may regard that a DL grant is already received (i.e., may recognize the scheduling grant for the pre-configured higher layer parameter set) when the mDCI itself is received. In this case, when the higher layer parameter set is configured by two different sets, a dynamic switching/indication between two sets may be provided via 1-bit mDCI. For example, when the higher layer parameter set is pre-configured in a form of first and second parameter sets, the recipient may recognize the activation of the first higher layer parameter set when the mDCI is set to '0' and recognize the activation of the second higher layer parameter set when the mDCI is set to '0'.

As another embodiment, the mDCI may be defined/set to 2 bits (i.e., N bits, where N is a natural number equal to or greater than 2) or more. In this case, a plurality of (2^N) higher layer parameter sets may be configured and the mDCI may be configured to indicate selective activation of a specific set of the plurality of higher layer parameter sets. That is, the mDCI may be defined/configured in a form to provide dynamic switching/indication among the plurality of higher layer parameter sets.

[Transmission Format of mDCI]

When the payload size of the mDCI is defined/set to N bits (N>1), the mDCI may be transmitted as a robust control channel indicator so as to apply a very low coding rate. In particular, the coding rate of the mDCI may be determined so that the target error rate of the mDCI is lower (more robust) than the target error rate of the data channel scheduled by the mDCI.

Alternatively, when the payload size of the mDCI is defined/set to a very small size such as 1 bit, a method may be defined/configured, in which the UE does not receive such mDCI through demodulation/decoding, but receives such mDCI through energy detection (for example, ON/OFF keying). For example, the UE performs energy detection for a specific time and/or frequency resource allocated in advance for the mDCI and when a signal of a specific threshold or more is detected, the UE may regard that the mDCI is transmitted and regard that the scheduling grant is transmitted at the current time. To this end, while the recipient receives configuration of at least one of the pre-configurable higher layer parameter/information/configuration as one higher layer parameter set, transmission based on energy detection (e.g., ON/OFF keying) may be performed in a form to receive the indication the scheduling (grant) of the higher layer parameter set by the mDCI. When energy above the threshold is detected through the resource area allocated for the mDCI and the scheduling grant (or activation) of the higher layer parameter set is recognized, the recipient may receive a (downlink) data packet based on the (downlink) control information indicated by the pre-configured higher layer parameter set.

Alternatively, when a plurality of higher layer parameter sets is configured, a specific higher layer among the plurality of higher layer parameter sets according to time and/or frequency resources in which the mDCI is transmitted (or energy for confirming whether the mDCI is received is detected). That is, each of the plurality of higher layer parameters may be independently associated with the time and/or frequency resource in which the mDCI is transmitted and based on the time and/or frequency resources in which the mDCI is transmitted, the specific higher layer parameter set among the plurality of higher layer parameter sets may be selected. For example, when the UE receives the mDCI by detecting energy of the threshold or more through a specific time and/or frequency resource, the UE may selectively activate the higher layer parameter set associated with the resource that receives the mDCI among the plurality of higher layer parameter sets and receive the data packet according to the activated higher layer parameter set.

According to such a transmission scheme, even when time/frequency synchronization is not completely guaranteed, such as multi-cell transmission or CoMP DPS transmission, when the channel variation is significant due to large mobility of the UE, the mDCI is received/detected in the form of the energy detection (e.g., ON/OFF keying), and as a result, more robust control signaling is available.

Further, when the energy detection (e.g., ON/OFF keying) scheme is used, a pre-configured sequence is mapped to RE(s) like PCFICH in the LTE and it may be determined which RRC configuration parameter (e.g., the higher layer parameter set, etc.) is used according to which sequence the recipient detects. To this end, the RE mapped sequence and/or RE mapping sequence related information (its RE mapping related information) (e.g., higher layer parameter set information associated with each sequence) may be fixedly defined in advance (e.g., depending on specific TM or in conjunction with a particular mode of operation) or may be configured in the UE as the higher layer signal (e.g., through RRC) (as configurable parameter(s)) by the eNB.

When the payload size is defined/set to 1 bit or the is intended to be designed for notifying only whether the scheduling grant is received only at a specific time in the form of the energy detection (e.g., ON/OFF keying), transmission of the mDCI itself may be omitted. In this case, the recipient may be defined/configured to detect a specific time and/or frequency area itself in which data may be transmitted based on the pre-configured higher layer parameter set through the energy detection, and as a result, a transmission payload of the mDCI itself may be omitted.

When the DM-RSs are densely arranged (in front of a data region (for example, a PDSCH)) for early decoding of the recipient (in a New RAT (NR) design or the like), the corresponding DM-RS may be defined/configured to serve as just the mDCI indicating uplink (DL) resource allocation (in the case of the UE-specific RS). That is, in other words, the DM-RS may be defined/configured to simultaneously serve as the mDCI. In this case, a detection criteria of the DM-RS detected as the mDCI may be limited to RS of first X symbol areas of the corresponding data region (here, X=1 or 2, etc.).

The mDCI may be applied only for scheduling purposes of broadcast data or unicast data. Alternatively, the mDCI may be applied for scheduling purposes of both the broadcast data and the unicast data.

[Fallback DCI or Multiple Types Related to mDCI]

To assist with the N-bit mDCI described above, an M-bit (fallback)-DCI other than the mDCI may be defined. This fallback-DCI may be referred to as 'MCI'. However, a name of the fallback-DCI proposed by the present invention is not limited to fDCI and may be defined as a new DCI format or may be referred to as a new name.

In this case, the recipient may be configured to detect fDCI together (or simultaneously) as well as mDCI. This is similar to an ability of a sender to selectively transmit the fallback DCI (e.g., DCI 1A) together with the TM-dependent DCI for each TM in the LTE system, the scheduling grant may be more stably transmitted for various ambiguous situations, etc. Therefore, to this end, whether a new TM (or a separate TM) for transmission of the mDCI may be defined or whether a legacy TM defined previously for transmission by the mDCI is applied is itself may be configured on the higher layer (higher-layer configurable).

In the form of M>N, the payload size of fDCI (M bits) may be designed/designed to be larger than mDCI (N bits), and as a result, primary control information that needs to be dynamically indicated may be transmitted via the fDCI. For example, 10 bits fDCI may be defined/configured together with 2 bits mDCI, in which case the recipient may continuously try to detect both types of DCIs at a specific time (e.g., a subframe). In most cases, the mDCI is preferably transmitted and the may be defined/configured to be transmitted only for transferring/adjusting at least some of "carrier index related, RA related, RS configuration for demodulation, MCS, RV, NDI, HARQ, TPC, and/or PQI related information elements". Further, when detecting the mDCI and/or the fDCI, the recipient may be defined/configured to perform an operation based on the detection.

For example, the fDCI may be (intermittently) transmitted for "MCS adaptation purpose" and the transmitted fDCI may serve to change the currently applied MCS to another MCS. That is, although the scheme is also available, in which the MCS is configured within the pre-configured higher layer parameter set and scheduling-granted by the mDCI as described above, the MCS activated by the mDCI needs to be supported so as to be dynamically adjusted by the fDCI in an environment that needs to support a more dynamic MCS indication. A form in which at least some of the information elements are adjusted/changed by the fDCI may be applied in such a scheme.

When the fDCI is received, the recipient may change and apply a parameter/information element (e.g., MCS) scheduling-granted (or activated) by the mDCI transmitted from that point in time (i.e., including the point in time) or after the point in time to a value indicated by fDCI.

Alternatively, a range (for example, t1=t2=0, t1=0 and t2>0, etc., t1 and t2 may be transmitted while being previously determined as a specific value or signaled) may be defined based on a reception time of the fDCI. In this case, when there is mDCI to be received within the range, the value of the parameter/information element (e.g., MCS) associated with the corresponding mDCI (in the higher layer parameter set) may be defined/configured to be changed/applied/over-ridden to the value of the parameter/information element (e.g., MCS) signaled/indicated by fDCI. As a result, the fDCI may serve to (dynamically) adjust/change a specific parameter value to be applied when the recipient receives the mDCI and the parameter change must be robust without an error. Therefore, the target error rate of the fDCI may be set to be lower (more robust) than the target error rate of the mDCI.

In addition/alternatively, the recipient may be defined/configured to feed back whether to successfully receive the fDCI and/or whether to successfully perform the parameter change by the fDCI to the sender. the receiver may feed back whether to receive the fDCI/whether to change the parameter through a specific uplink control channel or transmit ACK/NACK information transmission for reception of the fDCI at a predetermined time line.

When both the mDCI and the fDCI are detected at a specific time (e.g., subframe), an operation of the recipient who follows the fDCI (in preference to the mDCI) may be defined/configured. Such an operation may be restricted to be applied only when the simultaneously received mDCI and fDCI are of the same attribute (for example, the same UL grant or the same DL grant). In addition/alternatively, such an operation may be restricted to be applied only when the payload size of the fDCI is larger than the payload size of the mDCI. This has an effect of allowing the recipient to follow fDCI which has a larger payload size to indicate more/detailed information.

Alternatively, when both the mDCI and the fDCI are detected at a specific time (e.g., subframe), an operation of the recipient who follows the mDCI (in preference to the fDCI) may be defined/configured. Such an operation may be restricted to be applied only when the simultaneously received mDCI and fDCI are of the same attribute (for example, the same UL grant or the same DL grant). This has a purpose of eliminating ambiguity of the operation of the recipient, assuming that the fDCI is not transmitted together with the mDCI. That is, the sender has a restriction that the mDCI should not be transmitted at the same time (or a specific interval defined from the transmission time of the fDCI) as transmitting the fDCI and when both the mDCI and the fDCI are detected, the recipient regards the corresponding detection as an error case or regards that only the mDCI is valid and should thus follow the mDCI.

Figure 28:
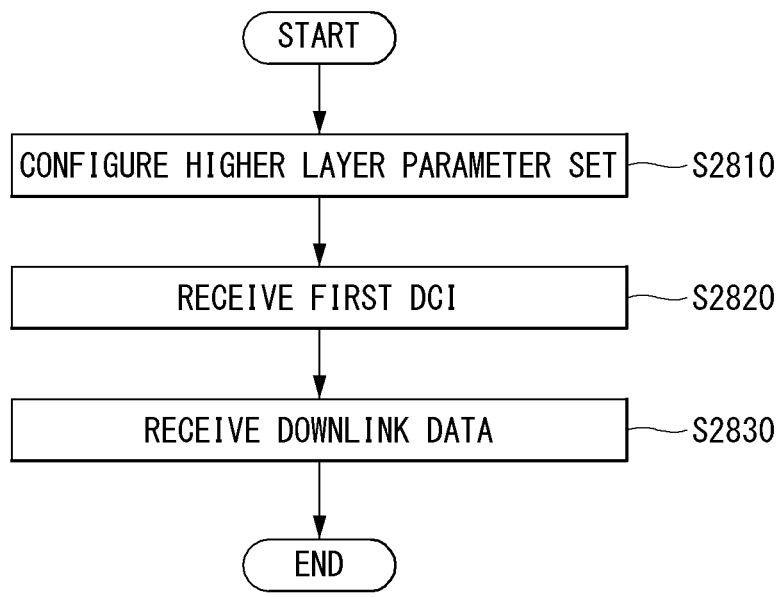
FIG. 28 is a flowchart illustrating a method for receiving downlink data based on downlink control information of a UE according to an embodiment of the present invention.

FIG. 28 is a flowchart illustrating a method for receiving downlink data based on downlink control information of a UE according to an embodiment of the present invention. The above-described embodiments may be applied in the same or similar manner with respect to this flowchart, and duplicated description will be omitted.

First, the UE may receive configuration of a higher layer parameter set for at least a part of control information for receiving downlink data from the eNB (S2810). The control information may include carrier index related information, resource allocation information, demodulation (DM)-reference signal (RS) related information, modulation and coding scheme (MCS) information, redundancy version (RV) information, new data indicator (NDI) information, hybrid automatic repeat request (HARQ) related information, transmit power control (TPC) related information, PDSCH rate matching and Quasi-colocation indicator (PQI) related information, cluster information, positional information of a reference signal, seed value information for generating a reference signal sequence, cyclic prefix length information, RE position information to which data is mapped, service ID information of multicast/broadcast data, precoding related information, demodulation RS related information, aperiodic channel state information (CSI) request information, and/or sounding reference signal (SRS) request information. The higher layer parameter set may be constituted by at least one parameter for the control information and may be configured as one set or configured as a plurality of sets.

Next, the UE may receive first downlink control information (DCI) including only an indicator indicating whether to grant scheduling for the higher layer parameter set (S2820). In this case, when energy of a threshold or more is detected by performing energy detection for a transmission resource previously allocated for the first DCI, the UE may regard that the first DCI indicating the scheduling grant for the higher layer parameter set is received. In the flowchart, the first DCI may correspond to the above-described mDCI.

Next, when the first DCI indicates a grant of scheduling for the higher layer parameter set, the UE may receive the downlink data on the basis of control information indicated by the higher layer parameter set (S2830).

When the higher layer parameter set is configured as one set, the first DCI may indicate only the scheduling grant of the one configured higher layer parameter by setting a payload size to 1 bit. Alternatively, when the higher layer parameter set is configured as the plurality of sets, the first DCI may optionally indicate only the scheduling grant of a specific set among the plurality of configured higher layer parameter sets by setting the payload size to 2 bits or more.

Alternatively, when the higher layer parameter set is constituted by the plurality of sets, the specific set among the plurality of higher layer parameter sets may be optionally scheduling-granted based on a subframe type in which the first DCI is transmitted, a format of the first DCI, a control channel in which the first DCI is transmitted, or a search space in which the first DCI is transmitted additionally with respect to the first DCI. More specifically, the specific set may be selected among the plurality of configured higher layer parameter sets according to the subframe type in which the first DCI is transmitted, the format of the first DCI, the control channel type in which the first DCI is transmitted or the search space type in which the first DCI is transmitted, and the scheduling grant of the selected specific higher layer parameter set may be determined according to the first DCI. Here, the subframe type may include a multicast-broadcast single-frequency network (MBSFN) subframe type or a non-MBSFN subframe type. Further, the control channel type includes a physical downlink control channel (PDDCH) and an enhanced physical downlink control channel (EPDCCH). In addition, the search space type in which the first DCI is transmitted may include a common search space and a UE-specific search space.

Further, when the higher layer parameter set is constituted by the plurality of sets, a specific higher layer parameter set may be optionally scheduling-granted among the plurality of configured higher layer parameter sets according to a sequence mapped to resource elements of the subframe in which the first DCI is transmitted.

Further, although not illustrated in the flowchart, the UE may additionally receive second DCI for assisting the first DCI. In this case, the payload size of the second DCI may be set to be larger than the payload size of the first DCI. The second DCI may include the control information not configured as the higher layer parameter set or include change information for changing at least a part of the control information indicated by the higher layer parameter set scheduling-granted by the first DCI.

Overview of Devices to which Present Invention is Applicable

Figure 29:
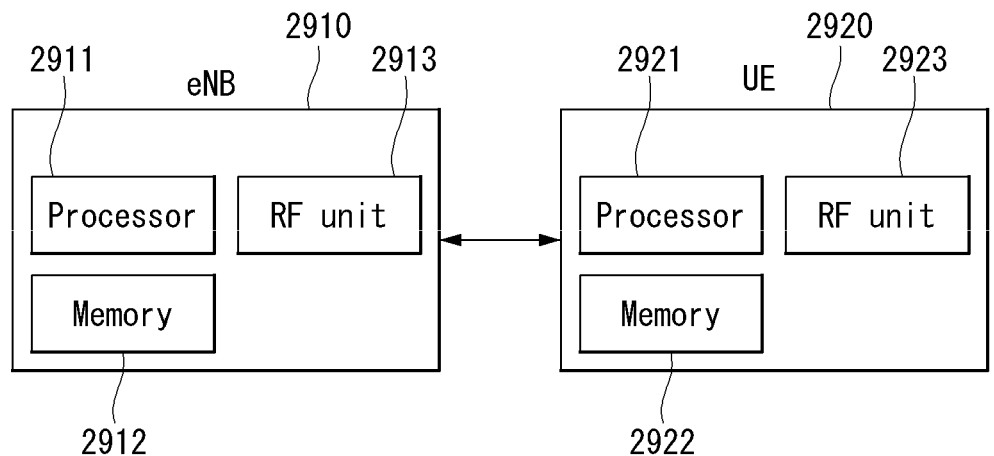
FIG. 29 illustrates a block diagram of a wireless communication apparatus according to an embodiment of the present invention.

FIG. 29 illustrates a block diagram of a wireless communication apparatus according to an embodiment of the present invention.

Referring to FIG. 29, a wireless communication system includes an eNB 2910 and multiple UEs 2920 positioned within an area of the eNB 2910.

The eNB 2910 includes a processor 2911, a memory 2912, and a radio frequency (RF) unit 2913. The processor 2911 implements a function, a process, and/or a method which are proposed in FIGS. 1 to 28 above. Layers of a radio interface protocol may be implemented by the processor 2911. The memory 2912 is connected with the processor 2911 to store various pieces of information for driving the processor 2911. The RF unit 2913 is connected with the processor 2911 to transmit and/or receive a radio signal.

The UE 2920 includes a processor 2921, a memory 2922, and an RF unit 2923. The processor 2921 implements the function, process, and/or method which are proposed in the above-described embodiments. Layers of a radio interface protocol may be implemented by the processor 2921. The memory 2922 is connected with the processor 2921 to store various pieces of information for driving the processor 2921. The RF unit 2923 is connected with the processor 2921 to transmit and/or receive a radio signal.

The memories 2912 and 2922 may be positioned inside or outside the processors 2911 and 2921 and connected with the processors 2911 and 2921 by various well-known means. Further, the eNB 2910 and/or the UE 2920 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems in addition to the 3GPP LTE/LTE-A system.

The invention claimed is:

1. A method for receiving downlink data in a wireless communication system, the method comprising:
    receiving configuration of a higher layer parameter set for at least a part of control information for receiving the downlink data from a base station;
    receiving first downlink control information (DCI) including only an indicator indicating whether to grant scheduling for the higher layer parameter set; and
    receiving the downlink data based on the control information indicated by the higher layer parameter set, based on the first DCI indicating a grant of scheduling for the higher layer parameter set,
    wherein the higher layer parameter set is configured as a plurality of sets, and
    wherein a specific set among the plurality of configured higher layer parameter sets is scheduling-granted based on at least one of (i) a control channel type in which the first DCI is transmitted or (ii) a search space type in which the first DCI is transmitted.

2. The method for receiving downlink data of claim 1, wherein each of the plurality of configured higher layer parameter sets is associated with at least one of a specific control channel type or a specific search space type.

3. The method for receiving downlink data of claim 2, wherein a payload size of the first DCI is set to 1 bit.

4. The method for receiving downlink data of claim 2, wherein the first DCI indicates only the scheduling grant of the specific set by setting a payload size of the first DCI to 2 bits or more.

5. The method for receiving downlink data of claim 1, wherein the specific set is selected among the plurality of configured higher layer parameter sets based on at least one of the control channel type or the search space type, and
    wherein the scheduling grant of the specific set is determined based on the first DCI.

6. The method for receiving downlink data of claim 2, wherein the specific control channel type is based on a physical downlink control channel (PDDCH) or an enhanced physical downlink control channel (EPDCCH).

7. The method for receiving downlink data of claim 2, wherein the specific search space type is based on a common search space or a UE-specific search space.

8. The method for receiving downlink data of claim 1, wherein in the receiving of the first DCI, based on energy of a threshold or more being detected by performing energy detection for a transmission resource previously allocated for the first DCI, it is regarded that the first DCI indicating the scheduling grant for the higher layer parameter set is received.

9. The method for receiving downlink data of claim 8, wherein the specific set is scheduling-granted based on a sequence mapped to resource elements of a subframe in which the first DCI is transmitted.

10. The method for receiving downlink data of claim 1, further comprising:
    receiving a second DCI for assisting the first DCI,
    wherein, a reception time of the first DCI being included in a specific duration related to a reception time of the second DCI: at least a part of the control information indicated by the higher layer parameter set which is scheduling-granted by the first DCI is changed based on the second DCI.

11. The method for receiving downlink data of claim 10, wherein a payload size of the second DCI is set to be larger than a payload size of the first DCI, and
    wherein the second DCI includes a control information not configured as the higher layer parameter set or includes change information for changing the at least a part of the control information.

12. The method for receiving downlink data of claim 1, wherein the control information includes carrier index related information, resource allocation information, demodulation (DM)-reference signal (RS) related information, modulation and coding scheme (MCS) information, redundancy version (RV) information, new data indicator (NDI) information, hybrid automatic repeat request (HARM) related information, transmit power control (TPC) related information, PDSCH rate matching and Quasi-colocation indicator (PQI) related information, cluster information, positional information of a reference signal, seed value information for generating a reference signal sequence, cyclic prefix length information, RE position information to which data is mapped, service ID information of multicast/broadcast data, precoding related information, demodulation RS related information, aperiodic channel state information (CSI) request information, and/or sounding reference signal (SRS) request information.

13. A user equipment (UE) configured to receive downlink data in a wireless communication system, the UE comprising:
    a radio frequency (RF) unit transmitting and receiving a radio signal; and
    a processor controlling the RF unit,
    wherein the UE is configured to
    receive configuration of a higher layer parameter set for at least a part of control information for receiving the downlink data from a base station, receive first downlink control information (DCI) including only an indicator indicating whether to grant scheduling for the higher layer parameter set, and receive the downlink data based on the control information indicated by the higher layer parameter set, based on the first DCI indicating a grant of scheduling for the higher layer parameter set, wherein the higher layer parameter set is configured as a plurality of sets, and wherein a specific set among the plurality of configured higher layer parameter sets is scheduling-granted based on at least one of (i) a control channel type in which the first DCI is transmitted or (ii) a search space type in which the first DCI is transmitted.

* * * * *